US012761454B2

(12) United States Patent
Son et al.

(10) Patent No.: US 12,761,454 B2
(45) Date of Patent: Oct. 13, 2026

(54) OPTICAL SYSTEM AND CAMERA MODULE COMPRISING SAME

(71) Applicant: LG INNOTEK CO., LTD., Seoul (KR)

(72) Inventors: Chang Gyun Son, Seoul (KR); Jun Young Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 244 days.

(21) Appl. No.: 18/719,682

(22) PCT Filed: Dec. 13, 2022

(86) PCT No.: PCT/KR2022/020286
§ 371 (c)(1),
(2) Date: Jun. 13, 2024

(87) PCT Pub. No.: WO2023/113446
PCT Pub. Date: Jun. 22, 2023

(65) Prior Publication Data

US 2025/0044560 A1 Feb. 6, 2025

(30) Foreign Application Priority Data

Dec. 13, 2021 (KR) ........................ 10-2021-0177903
Dec. 13, 2022 (KR) ........................ 10-2022-0173683

(51) Int. Cl.
*G02B 13/18* (2006.01)
*B60R 1/22* (2022.01)
(Continued)

(52) U.S. Cl.
CPC ................ *G02B 13/18* (2013.01); *B60R 1/22* (2022.01); *B60R 1/29* (2022.01); *G02B 1/041* (2013.01);
(Continued)

(58) Field of Classification Search
CPC .............................. G02B 13/0035; G02B 9/12
See application file for complete search history.

(56) References Cited

U.S. PATENT DOCUMENTS 6,804,067 B2 * 10/2004 Sato ......................... G02B 9/12 359/689
8,792,184 B2 7/2014 Matsui et al.
(Continued)

FOREIGN PATENT DOCUMENTS

CN 110568595 A * 12/2019 ........... G02B 13/005
CN 111061046 A 4/2020
(Continued)

OTHER PUBLICATIONS

Office Action dated Apr. 3, 2025 in Korean Application No. 10-2022-0173683.

(Continued)

*Primary Examiner* — Alexander P Gross
(74) *Attorney, Agent, or Firm* — SALIWANCHIK, LLOYD & EISENSCHENK

(57) ABSTRACT

The optical system disclosed in the embodiment includes first to third lenses disposed along an optical axis from an object side toward a sensor side, the optical system satisfies 40°≤FOV≤50°, an object-side surface and a sensor-side surface of the first lens are spherical, the first lens has a meniscus shape convex toward the object side, the first lens satisfies: 1.7≤nt_1≤2.3 and 0.15≤D_1/TTL≤0.3, TTL satisfies: ≤9 mm (nt_1 is the refractive index of the first lens, TTL is a distance in the optical axis from an object-side surface of the first lens to an image surface of the image sensor, D_1 is the thickness of the first lens at the optical axis, and FOV is the field of view of the optical system.).

20 Claims, 50 Drawing Sheets

(51) Int. Cl.

| | |
|---|---|
| ***B60R 1/29*** | (2022.01) |
| ***G02B 1/04*** | (2006.01) |
| ***G02B 9/12*** | (2006.01) |
| ***G02B 13/14*** | (2006.01) |
| ***G03B 9/02*** | (2021.01) |

(52) U.S. Cl.

CPC ............... *G02B 9/12* (2013.01); *G02B 13/14* (2013.01); *G03B 9/02* (2013.01); *B60R 2300/105* (2013.01)

(56) References Cited

U.S. PATENT DOCUMENTS

| | | | |
|---|---|---|---|
| 9,244,254 B2 | 1/2016 | Kubota et al. | |
| 2004/0061953 A1 | 4/2004 | Sato | |
| 2006/0043010 A1 | 3/2006 | Faram et al. | |
| 2008/0225411 A1 | 9/2008 | Kim et al. | |
| 2012/0229918 A1* | 9/2012 | Chen .................. | G02B 13/0045 359/715 |
| 2012/0293874 A1 | 11/2012 | Matsui et al. | |
| 2015/0029603 A1 | 1/2015 | Kubota et al. | |
| 2017/0371130 A1 | 12/2017 | Huang et al. | |
| 2019/0250379 A1 | 8/2019 | Kim et al. | |
| 2021/0048618 A1 | 2/2021 | Huang | |
| 2021/0124148 A1* | 4/2021 | Bao .................... | G02B 13/0035 |

FOREIGN PATENT DOCUMENTS

| | | |
|---|---|---|
| JP | 4-255814 A | 9/1992 |
| JP | 5-34591 A | 2/1993 |
| JP | 2003-22180 A | 1/2003 |
| JP | 2004-163849 A | 6/2004 |
| JP | 2004-163851 A | 6/2004 |
| JP | 2004-252312 A | 9/2004 |
| JP | 2010-145648 A | 7/2010 |
| JP | WO2011/092983 A1 | 5/2013 |
| JP | WO2012/114970 A | 7/2014 |
| JP | 2015-25998 A | 2/2015 |
| JP | WO2013/145989 A1 | 12/2015 |
| JP | 2018-84704 A | 5/2018 |
| KR | 2003-0008835 A | 1/2003 |
| KR | 10-2006-0050511 A | 5/2006 |
| KR | 10-2007-0010926 A | 1/2007 |
| KR | 10-2007-0025981 A | 3/2007 |
| KR | 10-0723220 B1 | 5/2007 |
| KR | 10-0843467 B1 | 7/2008 |
| KR | 10-2008-0072333 A | 8/2008 |
| KR | 10-2018-0070870 A | 6/2018 |
| KR | 10-2019-0128904 A | 11/2019 |

OTHER PUBLICATIONS

International Search Report dated May 17, 2022 in International Application No. PCT/KR2022/001987.

Office Action dated Feb. 8, 2024 in Korean Application No. 10-2022-0114332.

Supplementary European Search Report dated Dec. 9, 2024 in European Application No. 22752983.1.

Office Action dated Oct. 25, 2024 in Korean Application No. 10-2022-0114332.

Smith, W., "Modern Lens Design: a resource manual," Modern Lens Design, Jan. 1, 1992, pp. 1-5, McGraw-Hill, Inc.

International Search Report dated Mar. 23, 2023 in International Application No. PCT/KR2022/020286.

Supplementary European Search Report dated Dec. 2, 2025 in European Application No. 22907913.2.

Gross, H., et al., "Handbook of Optical Systems: vol. 3. Aberration Theory and Correction of Optical Systems, Chapter 31: Correction of Aberrations", Wiley-VCH, Jan. 1, 2007, pp. 1-34.

Gross, H., et al., "Handbook of Optical Systems: vol. 3. Aberration Theory and Correction of Optical Systems", Wiley-VCH, Jan. 1, 2007, pp. 1-6.

Smith, W.J., "Modern Optical Engineering: The Design of Optical Systems", McGraw-Hill, Inc., Jan. 1, 1990, pp. 1-4.

* cited by examiner

| Temperature (℃) | | Refractive index according to the wavelength of the first lens | | | | |
|---|---|---|---|---|---|---|
| | 656.3nm (C-line) | 632.8nm | 587.6nm (d-line) | 546.1nm (e-line) | 486.1nm (F-line) | 435.8nm (g-line) |
| -40 | 2.0396 | 2.043 | 2.0599 | 2.06 | 2.0784 | 2.102 |
| -20 | 2.0396 | 2.043 | 2.0599 | 2.06 | 2.0785 | 2.1021 |
| -10 | 2.0396 | 2.043 | 2.0600 | 2.0601 | 2.0786 | 2.1022 |
| 0 | 2.0397 | 2.0431 | 2.0600 | 2.0601 | 2.0787 | 2.1023 |
| 10 | 2.0397 | 2.0431 | 2.0600 | 2.0601 | 2.0787 | 2.1023 |
| 20 | 2.0397 | 2.0431 | 2.0601 | 2.0601 | 2.0787 | 2.1023 |
| 30 | 2.0397 | 2.0431 | 2.0601 | 2.0602 | 2.0788 | 2.1025 |
| 40 | 2.0397 | 2.0431 | 2.0602 | 2.0603 | 2.0789 | 2.1026 |
| 50 | 2.0398 | 2.0432 | 2.0603 | 2.0603 | 2.0789 | 2.1026 |
| 60 | 2.0398 | 2.0432 | 2.0604 | 2.0603 | 2.079 | 2.1027 |
| 70 | 2.0398 | 2.0432 | 2.0605 | 2.0604 | 2.079 | 2.1028 |
| 80 | 2.0398 | 2.0432 | 2.0605 | 2.0604 | 2.0791 | 2.1029 |
| 90 | 2.0398 | 2.0433 | 2.0606 | 2.0604 | 2.0791 | 2.1029 |

| Temperature (°C) | | Refractive index according to the wavelength of the second and third lenses | | | | |
|---|---|---|---|---|---|---|
| | 1014nm (t-line) | 643.8nm (C'-line) | 587.6nm (d-line) | 546.1nm (e-line) | 480nm (F'-line) | 435.8nm (g-line) |
| -40 | 1.6373 | 1.6584 | 1.6684 | 1.6740 | 1.6924 | 1.7121 |
| -20 | 1.6348 | 1.6557 | 1.6657 | 1.6711 | 1.6893 | 1.7088 |
| -10 | 1.6336 | 1.6544 | 1.6644 | 1.6696 | 1.6877 | 1.7072 |
| 20 | 1.6324 | 1.6530 | 1.6603 | 1.6662 | 1.6861 | 1.7056 |
| 30 | 1.6288 | 1.6489 | 1.6590 | 1.6637 | 1.6814 | 1.7006 |
| 40 | 1.6276 | 1.6476 | 1.6577 | 1.6623 | 1.6799 | 1.6990 |
| 50 | 1.6263 | 1.6462 | 1.6563 | 1.6606 | 1.6783 | 1.6973 |
| 60 | 1.6251 | 1.6449 | 1.6550 | 1.6593 | 1.6767 | 1.6957 |
| 70 | 1.6239 | 1.6435 | 1.6536 | 1.6578 | 1.6752 | 1.6940 |
| 80 | 1.6227 | 1.6422 | 1.6523 | 1.6564 | 1.6736 | 1.6924 |
| 90 | 1.6215 | 1.6408 | 1.6510 | 1.6549 | 1.6720 | 1.6907 |

Fig. 8

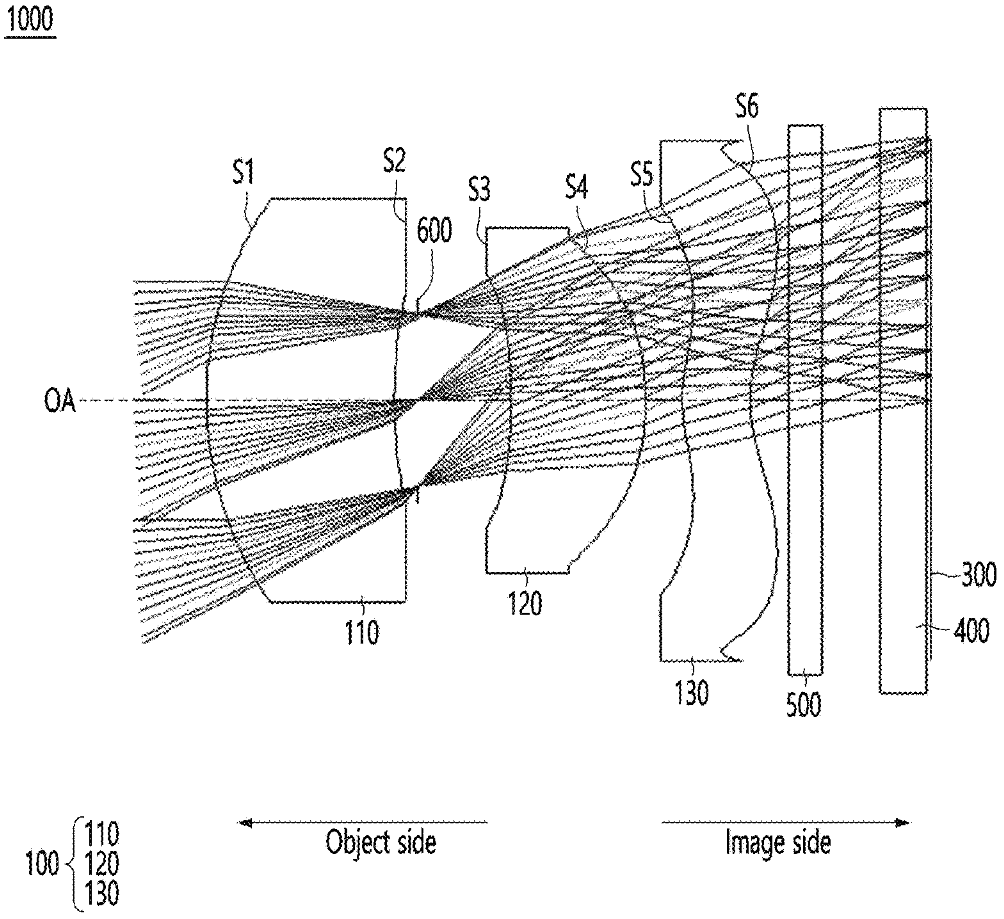

Fig. 9

| lens | surface | radius of curvature (mm) | thickness or interval (mm) | Refractive index | Abbe's number | clear aperture (mm) | focal length (mm) | effective focal length (mm) |
|---|---|---|---|---|---|---|---|---|
| first lens | first surface | 3.2234 | 1.6405 | 2.0508 | 26.9000 | 3.2434192 | 5.8914 | 4.3406 |
| | second surface | 5.1886 | 1.0226 | | | 1.8383809 | | |
| second lens | third surface | -5.5682 | 1.1625 | 1.6605 | 20.4000 | 2.1763927 | 11.6191 | |
| | fourth surface | -3.4295 | 0.3312 | | | 2.9165629 | | |
| third lens | fifth surface | 1.6080 | 0.5885 | 1.6605 | 20.4000 | 3.50 | 257.2516 | |
| | sixth surface | 1.3912 | 0.3332 | | | 4.04680634 | | |
| filter | seventh surface | 1.E+18 | 0.300 | 1.513 | 54.500 | 4.169 | | |
| | eighth surface | 1.E+18 | 0.500 | | | 4.275 | | |
| cover glass | ninth surface | 1.E+18 | 0.400 | 1.513 | 54.500 | 4.549 | | |
| | tenth surface | 1.E+18 | 0.045 | | | 4.689 | | |
| image sensor | eleventh surface | 1.E+18 | 0.000 | | | 4.529 | | |

Fig. 10

| Vertical height of the optical axis from the optical axis of the object-side surface of the first lens (mm) | Sag on the object-side surface of the first lens (mm) | Vertical height of the optical axis from the optical axis of the sensor-side surface of the first lens (mm) | Sag on the sensor-side surface of the first lens (mm) |
|---|---|---|---|
| 0 | 0 | 0 | 0 |
| 0.2 | 0.0062 | 0.2 | 0.0039 |
| 0.4 | 0.0249 | 0.4 | 0.0154 |
| 0.6 | 0.0563 | 0.6 | 0.0348 |
| 0.8 | 0.1000 | 0.8 | 0.0620 |
| 0.9 | 0.1282 | 0.9 | 0.0787 |
| 1.0 | 0.1500 | 1.0 | |
| 1.2 | 0.2317 | 1.2 | |
| 1.4 | 0.3199 | 1.4 | |
| 1.6 | 0.4251 | 1.6 | |
| 1.7 | 0.1847 | 1.7 | |

Fig. 11

| Vertical height of the optical axis from the optical axis (mm) | Thickness of the first lens in the optical axis direction (mm) |
|---|---|
| 0 | 1.6405 (D_1) |
| 0.2 | 1.6506 |
| 0.4 | 1.6808 |
| 0.6 | 1.7316 |
| 0.8 | 1.8034 |
| 1 | 1.8782 |
| 1.2 | 1.8722 |
| 1.4 | 1.2864 (D_1_ET) |
| 1.6 | 1.2864 |
| 1.8 | 1.2864 |

Fig. 12

| Vertical height of the optical axis from the optical axis of the object-side surface of the second lens (mm) | Sag on the object-side surface of the second lens (mm) | Vertical height of the optical axis from the optical axis of the sensor-side surface of the second lens (mm) | Sag on the sensor-side surface of the second lens (mm) |
|---|---|---|---|
| 0 | 0 | 0 | 0 |
| 0.2 | -0.0025 | 0.2 | -0.0055 |
| 0.4 | -0.0114 | 0.4 | -0.0256 |
| 0.6 | -0.0304 | 0.6 | -0.0678 |
| 0.8 | -0.0672 | 0.8 | -0.1399 |
| 1 | -0.0951 | 1 | -0.2479 |
| 1.2 | -0.0951 | 1.2 | -0.3928 |
| 1.3 | -0.0951 | 1.3 | -0.4733 |
| 1.5 | -0.0951 | 1.5 | -0.4733 |
| 1.7 | -0.0951 | 1.7 | -0.4733 |
| 1.9 | -0.0951 | 1.9 | -0.4733 |

Fig. 13

| Vertical height of the optical axis from the optical axis (mm) | Thickness of the second lens in the optical axis direction (mm) |
|---|---|
| 0 | 1.1625 (D_2) |
| 0.2 | 1.1526 |
| 0.4 | 1.1186 |
| 0.6 | 1.0503 |
| 0.8 | 0.9350 |
| 1 | 0.7581 |
| 1.2 | 0.7652 |
| 1.4 | 0.7228 (D_2_ET) |
| 1.6 | 0.7228 |
| 1.8 | 0.7228 |

Fig. 14

| Vertical height of the optical axis from the optical axis of the object-side surface of the third lens (mm) | Sag on the object-side surface of the third lens (mm) | Vertical height of the optical axis from the optical axis of the sensor-side surface of the third lens (mm) | Sag on the sensor-side surface of the third lens (mm) |
|---|---|---|---|
| 0 | 0 | 0 | 0 |
| 0.2 | 0.0109 | 0.2 | 0.0125 |
| 0.4 | 0.0377 | 0.4 | 0.0469 |
| 0.6 | 0.0663 | 0.6 | 0.0931 |
| 0.8 | 0.0771 | 0.8 | 0.1378 |
| 1 | 0.0641 | 1 | 0.1693 |
| 1.2 | -0.0089 | 1.2 | 0.1799 |
| 1.3 | -0.0535 | 1.3 | 0.1757 |
| 1.5 | -0.1632 | 1.5 | 0.1452 |
| 1.7 | -0.1632 | 1.7 | 0.0798 |
| 1.9 | -0.1632 | 1.9 | -0.0386 |

Fig. 15

| Vertical height of the optical axis from the optical axis (mm) | Thickness of the third lens in the optical axis direction (mm) |
|---|---|
| 0 | 0.5885 (D_3) |
| 0.2 | 0.6143 |
| 0.4 | 0.6812 |
| 0.6 | 0.7648 |
| 0.8 | 0.8368 |
| 1 | 0.8758 |
| 1.2 | 0.8703 |
| 1.4 | 0.8173 |
| 1.6 | 0.7102 |
| 1.8 | 0.7590 (D_3_ET) |

Fig. 16

| | First surface (S1) | Second surface (S2) | Third surface (S3) | Fourth surface (S4) | Fifth surface (S5) | Sixth surface (S6) |
|---|---|---|---|---|---|---|
| K | | | -85.3931311990 | 3.6004028966 | -16.2793930794 | -5.4540829504 |
| A | | | -0.1206052388 | -0.2149865821 | 0.0182397387 | -0.0366534479 |
| B | | | 0.1902561585 | 0.2864270818 | -0.3662777008 | -0.0838393786 |
| C | | | -0.6959289863 | -0.3208775537 | 0.5811675710 | 0.1242785413 |
| D | | | 1.6989017134 | 0.2633783869 | -0.5515633758 | -0.0935547388 |
| E | | | -2.7771058949 | -0.1432923078 | 0.3485318705 | 0.0437610559 |
| F | | | 2.9836717165 | 0.0467896755 | -0.1456026481 | -0.0131008994 |
| G | | | -2.0137511595 | -0.0067990207 | 0.0383835377 | 0.0024346328 |
| H | | | 0.7736532018 | -0.0003408374 | -0.0057628438 | -0.0002555038 |
| J | | | -0.1288902592 | 0.0001733965 | 0.0003742239 | 0.0000115499 |

Fig. 17

| Vertical height of the optical axis from the optical axis of the sensor-side surface of the first lens (mm) | Interval in the optical axis direction of the air gap (d12) (mm) (First interval) | Vertical height of the optical axis from the optical axis of the object-side surface of the second lens (mm) |
|---|---|---|
| 0 | 1.0226 | 0 |
| 0.2 | 1.01496 | 0.2 |
| 0.4 | 0.99146 | 0.4 |
| 0.6 | 0.94856 | 0.6 |
| 0.8 | 0.87956 | 0.8 |
| 1 (L1) | 0.79276 | 1(L1) |
| 1.2 | | 1.2 |
| 1.4 | | 1.4 |
| 1.6 | | 1.6 |
| 1.8 | | 1.8 |
| 2.0 | | 2.0 |

Fig. 18

| Vertical height of the optical axis from the optical axis of the sensor-side surface of the second lens (mm) | Interval in the optical axis direction of the air gap (d23) (mm) (Second interval) | Vertical height of the optical axis from the optical axis of the object-side surface of the third lens (mm) |
|---|---|---|
| 0 | 0.33117 | 0 |
| 0.2 | 0.34917 | 0.2 |
| 0.4 | 0.40027 | 0.4 |
| 0.6 | 0.47747 | 0.6 |
| 0.8 | 0.57087 | 0.8 |
| 1 | 0.67347 | 1 |
| 1.2 | 0.78447 | 1.2 |
| 1.4 (L2) | 0.90467 | 1.4 (L2) |
| 1.6 | 0.91367 | 1.6 |
| 1.8 | 0.75907 | 1.8 |
| 2.0 | | 2.0 |

Fig. 30

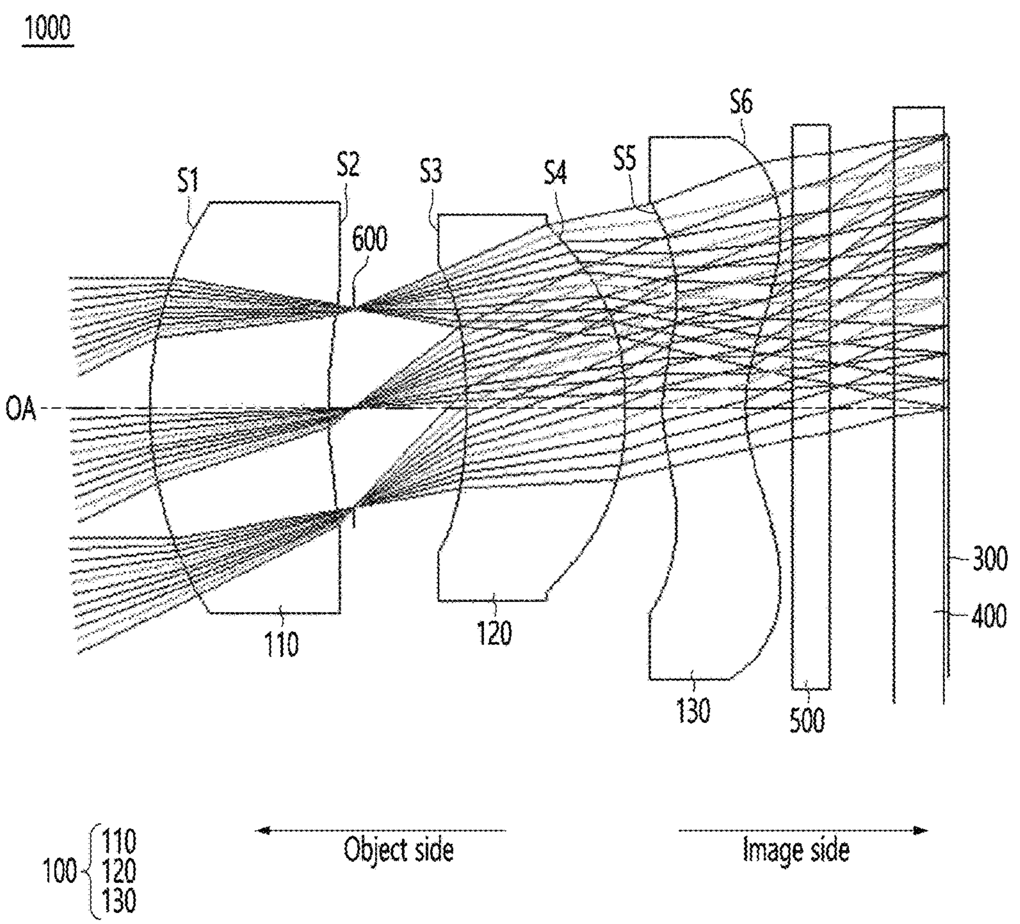

Fig. 31

| lens | surface | radius of curvature (mm) | thickness or interval (mm) | Refractive index | Abbe's number | clear aperture (mm) | focal length (mm) | effective focal length (mm) |
|---|---|---|---|---|---|---|---|---|
| first lens | first surface | 3.2482104 | 1.4188 | 2.0508 | 26.9000 | 3.2809 | 5.8403 | 4.3516 |
| | second surface | 5.5918743 | 1.0911 | | | 1.8573 | | |
| second lens | third surface | -5.9935087 | 1.2642 | 1.6605 | 20.4000 | 2.2120 | 18.5824 | |
| | fourth surface | -4.2991767 | 0.3043 | | | 2.9773 | | |
| third lens | fifth surface | 1.59149417 | 0.6552 | 1.6605 | 20.4000 | 3.5 | 32.3796 | |
| | sixth surface | 1.4493618 | 0.3648 | | | 4.2504 | | |
| filter | seventh surface | 1.E+18 | 0.300 | 1.513 | 54.500 | 4.206 | | |
| | eighth surface | 1.E+18 | 0.500 | | | 4.304 | | |
| cover glass | ninth surface | 1.E+18 | 0.400 | 1.513 | 54.500 | 4.558 | | |
| | tenth surface | 1.E+18 | 0.045 | | | 4.689 | | |
| image sensor | eleventh surface | 1.E+18 | 0.000 | | | 4.631 | | |

Fig. 32

| Vertical height of the optical axis from the optical axis of the object-side surface of the first lens (mm) | Sag on the object-side surface of the first lens (mm) | Vertical height of the optical axis from the optical axis of the sensor-side surface of the first lens (mm) | Sag on the sensor-side surface of the first lens (mm) |
|---|---|---|---|
| 0 | 0.0000 | 0 | 0.0000 |
| 0.2 | 0.00620 | 0.2 | 0.0360 |
| 0.4 | 0.02470 | 0.4 | 0.01430 |
| 0.6 | 0.05500 | 0.6 | 0.03230 |
| 0.8 | 0.10010 | 0.8 | 0.05750 |
| 1 | 0.15780 | 1 | 0.09010 |
| 1.2 | 0.22080 | 1.2 | |
| 1.4 | 0.31720 | 1.4 | |
| 1.6 | 0.42140 | 1.6 | |

Fig. 33

| Vertical height of the optical axis from the optical axis (mm) | Thickness of the first lens in the optical axis direction (mm) |
|---|---|
| 0 | 1.4198 (D_1) |
| 0.2 | 1.4286 |
| 0.4 | 1.4578 |
| 0.6 | 1.5070 |
| 0.8 | 1.5764 |
| 1 | 1.6667 |
| 1.2 | 1.7387 |
| 1.4 | 1.1140 (D_1_ET) |
| 1.6 | 1.1140 |

Fig. 34

| Vertical height of the optical axis from the optical axis of the object-side surface of the second lens (mm) | Sag on the object-side surface of the second lens (mm) | Vertical height of the optical axis from the optical axis of the sensor-side surface of the second lens (mm) | Sag on the sensor-side surface of the second lens (mm) |
|---|---|---|---|
| 0 | 0.0000 | 0 | 0.0000 |
| 0.2 | -0.00340 | 0.2 | -0.00500 |
| 0.4 | -0.01450 | 0.4 | -0.02380 |
| 0.6 | -0.03570 | 0.6 | -0.6350 |
| 0.8 | -0.07230 | 0.8 | -0.13010 |
| 1 | -0.13200 | 1 | -0.22730 |
| 1.2 | -0.22110 | 1.2 | -0.35750 |
| 1.4 | | 1.4 | -0.52000 |
| 1.6 | | 1.6 | -0.70090 |

Fig. 35

| Vertical height of the optical axis from the optical axis (mm) | Thickness of the second lens in the optical axis direction (mm) |
|---|---|
| 0 | 1.2843 (D_2) |
| 0.2 | 1.2550 |
| 0.4 | 1.226 |
| 0.6 | 1.1651 |
| 0.8 | 1.0619 |
| 1 | 0.9050 |
| 1.2 | 0.6857 |
| 1.4 | 0.8335 (D_2_ET) |
| 1.6 | 0.8335 |

Fig. 36

| Vertical height of the optical axis from the optical axis of the object-side surface of the third lens (mm) | Sag on the object-side surface of the third lens (mm) | Vertical height of the optical axis from the optical axis of the sensor-side surface of the third lens (mm) | Sag on the sensor-side surface of the third lens (mm) |
|---|---|---|---|
| 0 | 0.0000 | 0 | 0.0000 |
| 0.2 | 0.01200 | 0.2 | 0.01350 |
| 0.4 | 0.04250 | 0.4 | 0.05000 |
| 0.6 | 0.07860 | 0.6 | 0.10360 |
| 0.8 | 0.10480 | 0.8 | 0.15990 |
| 1 | 0.10870 | 1 | 0.20970 |
| 1.2 | 0.08430 | 1.2 | 0.24610 |
| 1.4 | 0.03130 | 1.4 | 0.26410 |
| 1.6 | -0.06230 | 1.6 | 0.25790 |
| 1.7 | -0.11240 | 1.7 | 0.24320 |
| 1.9 | | 1.9 | 0.18020 |
| 2.1 | | 2.1 | 0.04370 |

Fig. 37

| Vertical height of the optical axis from the optical axis (mm) | Thickness of the third lens in the optical axis direction (mm) |
|---|---|
| 0 | 0.6556 (D_3) |
| 0.2 | 0.6808 |
| 0.4 | 0.7487 |
| 0.6 | 0.8375 |
| 0.8 | 0.9200 |
| 1 | 0.9737 |
| 1.2 | 0.9857 |
| 1.4 | 0.9507 |
| 1.6 | 0.8609 |
| 1.8 | 0.6721 (D_3_ET) |

Fig. 38

| | First surface (S1) | Second surface (S2) | Third surface (S3) | Fourth surface (S4) | Fifth surface (S5) | Sixth surface (S6) |
|---|---|---|---|---|---|---|
| K | | | -98.7902577110 | 5.7144888821 | -12.3632077479 | -0.6121663902 |
| A | | | -0.1078616604 | -0.2311646429 | -0.0060540469 | -0.1862966213 |
| B | | | 0.1718597318 | 0.3048025675 | -0.2453602947 | 0.0210854841 |
| C | | | -0.5575725984 | -0.3566291064 | 0.3470183601 | 0.0323485829 |
| D | | | 1.2324931963 | 0.3286000818 | -0.2860397873 | -0.0302636566 |
| E | | | -1.8151910133 | -0.2168993420 | 0.1563241471 | 0.0132200670 |
| F | | | 1.7486024173 | 0.1002006335 | -0.0563954556 | -0.0033978224 |
| G | | | -1.0533230369 | -0.0294409842 | 0.0127922346 | 0.0005134975 |
| H | | | 0.3594045465 | 0.0049525300 | -0.0016428934 | -0.0000415632 |
| J | | | -0.0529167634 | -0.0003563266 | 0.0000903158 | 0.0000013338 |

Fig. 39

| Vertical height of the optical axis from the optical axis of the sensor-side surface of the first lens (mm) | Interval in the optical axis direction of the air gap (d12) (mm) (First interval) | Vertical height of the optical axis from the optical axis of the object-side surface of the second lens (mm) |
|---|---|---|
| 0 | 1.09114 | 0 |
| 0.2 | 1.08414 | 0.2 |
| 0.4 | 1.06234 | 0.4 |
| 0.6 | 1.02314 | 0.6 |
| 0.8 (L1) | 0.96134 | 0.8 (L1) |
| 1 | 0.86904 | 1 |
| 1.2 | 0.77994 | 1.2 |
| 1.4 | | 1.4 |
| 1.6 | | 1.6 |

Fig. 40

| Vertical height of the optical axis from the optical axis of the sensor-side surface of the second lens (mm) | Interval in the optical axis direction of the air gap (d23) (mm) (Second interval) | Vertical height of the optical axis from the optical axis of the object-side surface of the third lens (mm) |
|---|---|---|
| 0 | 0.30482 | 0 |
| 0.2 | 0.32182 | 0.2 |
| 0.4 | 0.37112 | 0.4 |
| 0.6 | 0.44692 | 0.6 |
| 0.8 | 0.53972 | 0.8 |
| 1 | 0.64082 | 1 |
| 1.2 | 0.74662 | 1.2 |
| 1.4 | 0.85612 | 1.4 |
| 1.6 (L2) | 0.96342 | 1.6 (L2) |
| 1.7 | 0.89332 | 1.7 |
| 2.0 | | 2.0 |

Fig. 52

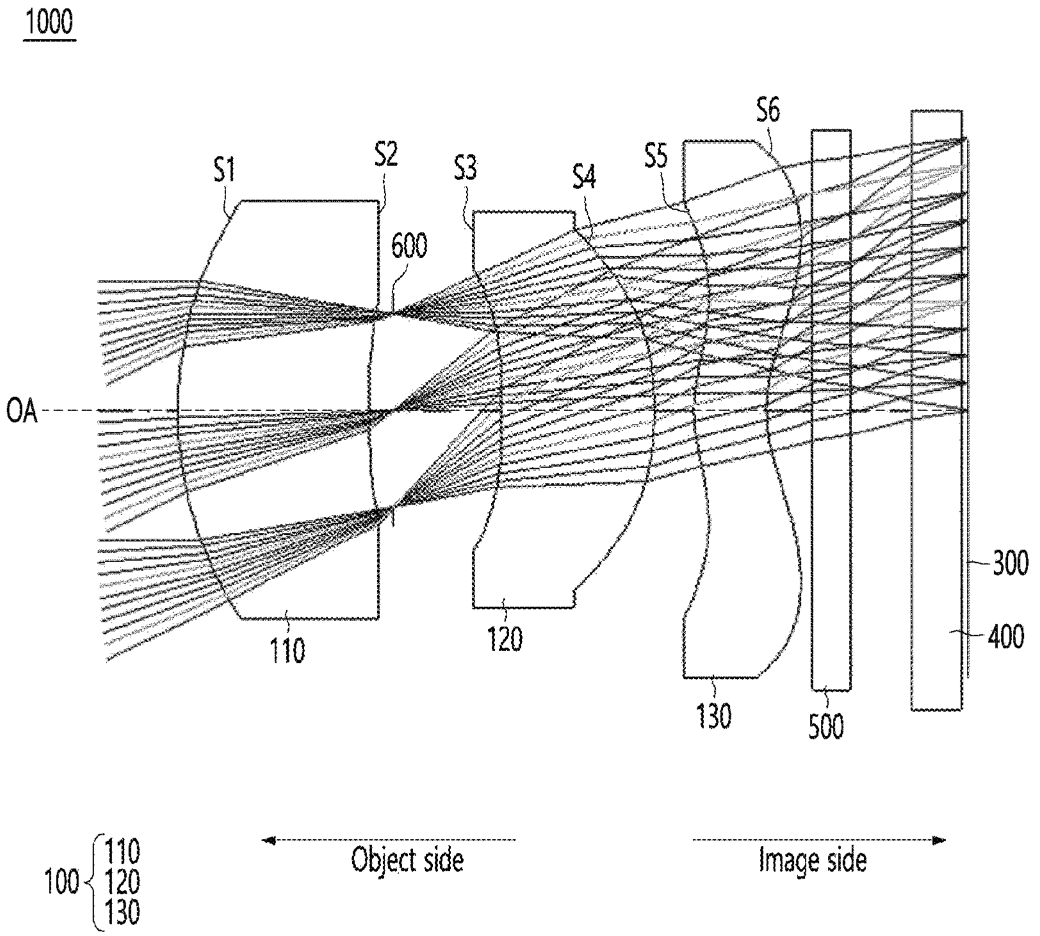

Fig. 53

| lens | surface | radius of curvature (mm) | thickness or interval (mm) | Refractive index | Abbe's number | clear aperture (mm) | focal length (mm) | effective focal length (mm) |
|---|---|---|---|---|---|---|---|---|
| first lens | first surface | 3.2293 | 1.5265 | 2.0508 | 26.9000 | 3.1702 | 5.8770 | 4.3437 |
| | second surface | 5.3525 | 1.0679 | | | 1.8901 | | |
| second lens | third surface | −5.6250 | 1.2245 | 1.6605 | 20.4000 | 2.2400 | 13.2166 | |
| | fourth surface | −3.6516 | 0.3231 | | | 2.9940 | | |
| third lens | fifth surface | 1.5162 | 0.5764 | 1.6605 | 20.4000 | 3.4655 | 74.1328 | |
| | sixth surface | 1.3354 | 0.3666 | | | 4.0561 | | |
| filter | seventh surface | 1.E+18 | 0.300 | 1.513 | 54.500 | 4.205 | | |
| | eighth surface | 1.E+18 | 0.500 | | | 4.304 | | |
| cover glass | ninth surface | 1.E+18 | 0.400 | 1.513 | 54.500 | 4.558 | | |
| | tenth surface | 1.E+18 | 0.045 | | | 4.689 | | |
| image sensor | eleventh surface | 1.E+18 | 0.000 | | | 4.531 | | |

Fig. 54

| Vertical height of the optical axis from the optical axis of the object-side surface of the first lens (mm) | Sag on the object-side surface of the first lens (mm) | Vertical height of the optical axis from the optical axis of the sensor-side surface of the first lens (mm) | Sag on the sensor-side surface of the first lens (mm) |
|---|---|---|---|
| 0 | 0.0000 | 0 | 0.0000 |
| 0.2 | 0.00620 | 0.2 | 0.00370 |
| 0.4 | 0.02490 | 0.4 | 0.01500 |
| 0.6 | 0.05620 | 0.6 | 0.03370 |
| 0.8 | 0.10070 | 0.8 | 0.06010 |
| 1 | 0.15870 | 1 | 0.09420 |
| 1.2 | 0.23120 | 1.2 | |
| 1.4 | 0.31930 | 1.4 | |
| 1.6 | 0.42420 | 1.6 | |

Fig. 55

| Vertical height of the optical axis from the optical axis (mm) | Thickness of the first lens in the optical axis direction (mm) |
|---|---|
| 0 | 1.5265 (D_1) |
| 0.2 | 1.5364 |
| 0.4 | 1.5664 |
| 0.6 | 1.6164 |
| 0.8 | 1.6873 |
| 1 | 1.7794 |
| 1.2 | 1.8610 |
| 1.4 | 1.1948 (D_1_ET) |
| 1.6 | 1.1940 |

Fig. 56

| Vertical height of the optical axis from the optical axis of the object-side surface of the second lens (mm) | Sag on the object-side surface of the second lens (mm) | Vertical height of the optical axis from the optical axis of the sensor-side surface of the second lens (mm) | Sag on the sensor-side surface of the second lens (mm) |
|---|---|---|---|
| 0 | 0.0000 | 0 | 0.0000 |
| 0.2 | -0.00360 | 0.2 | -0.00560 |
| 0.4 | -0.01550 | 0.4 | -0.02600 |
| 0.6 | -0.03850 | 0.6 | -0.06990 |
| 0.8 | -0.07830 | 0.8 | -0.14050 |
| 1 | -0.14340 | 1 | -0.24240 |
| 1.2 | -0.24000 | 1.2 | -0.37810 |
| 1.4 | | 1.4 | -0.54400 |
| 1.5 | | 1.5 | -0.63320 |

Fig. 57

| Vertical height of the optical axis from the optical axis (mm) | Thickness of the second lens in the optical axis direction (mm) |
|---|---|
| 0 | 1.2246 (0_2) |
| 0.2 | 1.2152 |
| 0.4 | 1.1821 |
| 0.6 | 1.1161 |
| 0.8 | 1.0057 |
| 1 | 0.8387 |
| 1.2 | 0.6055 |
| 1.4 | 0.7917 (0_2_ET) |
| 1.6 | 0.7917 |

Fig. 58

| Vertical height of the optical axis from the optical axis of the object-side surface of the third lens (mm) | Sag on the object-side surface of the third lens (mm) | Vertical height of the optical axis from the optical axis of the sensor-side surface of the third lens (mm) | Sag on the sensor-side surface of the third lens (mm) |
|---|---|---|---|
| 0 | 0.0000 | 0 | 0.0000 |
| 0.2 | 0.01260 | 0.2 | 0.01460 |
| 0.4 | 0.04440 | 0.4 | 0.05440 |
| 0.6 | 0.08170 | 0.6 | 0.10930 |
| 0.8 | 0.10880 | 0.8 | 0.16670 |
| 1 | 0.11350 | 1 | 0.21610 |
| 1.2 | 0.09070 | 1.2 | 0.25090 |
| 1.4 | 0.04230 | 1.4 | 0.26630 |
| 1.6 | -0.02860 | 1.6 | 0.25750 |
| 1.8 | -0.13460 | 1.8 | 0.21570 |
| 2.0 | | 2.0 | 0.12150 |
| 2.1 | | 2.1 | 0.04210 |

Fig. 59

| Vertical height of the optical axis from the optical axis (mm) | Thickness of the third lens in the optical axis direction (mm) |
|---|---|
| 0 | 0.5764 (P_3) |
| 0.2 | 0.6036 |
| 0.4 | 0.6752 |
| 0.6 | 0.7674 |
| 0.8 | 0.8519 |
| 1 | 0.9060 |
| 1.2 | 0.9180 |
| 1.4 | 0.8850 |
| 1.6 | 0.8053 |
| 1.8 | 0.6575 |
| 2.0 | 0.7749 (P_3_ET) |

Fig. 60

| | First surface (S1) | Second surface (S2) | Third surface (S3) | Fourth surface (S4) | Fifth surface (S5) | Sixth surface (S6) |
|---|---|---|---|---|---|---|
| K | | | -99.0000000000 | 3.8563096028 | -12.3024364384 | -5.1334267693 |
| A | | | -0.1336221263 | -0.2210886481 | 0.0091831334 | -0.0151926684 |
| B | | | 0.2923871644 | 0.2993630334 | -0.3061146604 | -0.1087915987 |
| C | | | -1.1141230579 | -0.3320458963 | 0.4586771987 | 0.1383517982 |
| D | | | 2.8375024522 | 0.2665059365 | -0.4060320638 | -0.0950914360 |
| E | | | -4.7224925963 | -0.1416266406 | 0.2381428532 | 0.0410199646 |
| F | | | 5.0477884158 | 0.0461628290 | -0.0920415417 | -0.0113541549 |
| G | | | -3.3250641177 | -0.0076077050 | 0.0224114799 | 0.0019550289 |
| H | | | 1.2266946025 | 0.0001939823 | -0.0031084530 | -0.0001906466 |
| J | | | -0.1936851359 | 0.0000783884 | 0.0001868853 | 0.0000080407 |

Fig. 61

| Vertical height of the optical axis from the optical axis of the sensor-side surface of the first lens (mm) | Interval in the optical axis direction of the air gap (d12) (mm) (First interval) | Vertical height of the optical axis from the optical axis of the object-side surface of the second lens (mm) |
|---|---|---|
| 0 | 1.06795 | 0 |
| 0.2 | 1.06065 | 0.2 |
| 0.4 | 1.03745 | 0.4 |
| 0.6 | 0.99575 | 0.6 |
| 0.8 (L1) | 0.92065 | 0.8 (L1) |
| 1 | 0.83035 | 1 |
| 1.2 | 0.73285 | 1.2 |
| 1.4 | | 1.4 |

Fig. 62

| Vertical height of the optical axis from the optical axis of the sensor-side surface of the second lens (mm) | Interval in the optical axis direction of the air gap (d23) (mm) (Second interval) | Vertical height of the optical axis from the optical axis of the object-side surface of the third lens (mm) |
|---|---|---|
| 0 | 0.38312 | 0 |
| 0.2 | 0.34152 | 0.2 |
| 0.4 | 0.39442 | 0.4 |
| 0.6 | 0.47472 | 0.6 |
| 0.8 | 0.57242 | 0.8 |
| 1 | 0.67902 | 1 |
| 1.2 | 0.79192 | 1.2 |
| 1.4 | 0.91032 | 1.4 (L2) |
| 1.6 (L2) | 0.92772 | 1.6 (L2)4 |
| 1.8 | 0.82712 | 1.8 |
| 2.0 | | 2.0 |

Fig. 74

| lens | surface | radius of curvature (mm) | thickness or interval (mm) | Refractive index | Abbe's number | clear aperture (mm) | focal length (mm) | effective focal length (mm) |
|---|---|---|---|---|---|---|---|---|
| first lens | first surface | 3.2234 | 1.6405 | 2.0508 | 26.9000 | 3.2434192 | 5.8914 | 4.3406 |
| | second surface | 5.1886 | 1.0146 | | | 1.8388809 | | |
| second lens | third surface | −5.5682 | 1.1625 | 1.6605 | 20.4000 | 2.1763927 | 11.6191 | |
| | fourth surface | −3.4295 | 0.3392 | | | 2.9165629 | | |
| third lens | fifth surface | 1.6060 | 0.5885 | 1.6605 | 20.4000 | 3.50 | 257.2516 | |
| | sixth surface | 1.3912 | 0.3332 | | | 4.04680534 | | |
| filter | seventh surface | 1.E+18 | 0.300 | 1.513 | 54.500 | 4.169 | | |
| | eighth surface | 1.E+18 | 0.500 | | | 4.275 | | |
| cover glass | ninth surface | 1.E+18 | 0.400 | 1.513 | 54.500 | 4.548 | | |
| | tenth surface | 1.E+18 | 0.045 | | | 4.689 | | |
| image sensor | eleventh surface | 1.E+18 | 0.000 | | | 4.529 | | |

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/020286, filed Dec. 13, 2022, which claims the benefit under 35 U.S.C. § 119 of Korean Application Nos. 10-2021-0177903, filed Dec. 13, 2021; and 10-2022-0173683, filed Dec. 13, 2022; the disclosures of each of which are incorporated herein by reference in their entirety.

TECHNICAL FIELD

An embodiment relates to an optical system having improved optical performance and a camera module including the same.

BACKGROUND ART

ADAS (Advanced Driving Assistance System) is an advanced driver assistance system to assist the driver. The ADAS senses a situation ahead, determines the situation based on the sensed result, and controls the behavior of the vehicle based on the situation judgment. For example, the ADAS detects a vehicle ahead and recognizes a lane. Subsequently, when a target lane, target speed, or forward target is determined, the vehicle's Electrical Stability Control (ESC), EMS (Engine Management System), MDPS (Motor Driven Power Steering), and the like are controlled. Typically, the ADAS may be implemented as an automatic parking system, a low-speed city driving assistance system, a blind spot warning system, and the like.

In the ADAS, a sensor device for detecting the situation ahead may include a GPS sensor, a laser scanner, a forward radar, and a lidar. Typically, the sensor device is a camera for photographing the front, rear and side of the vehicle.

The camera is disposed outside or inside the vehicle and detect the surroundings of the vehicle. In addition, the camera may be disposed inside the vehicle to detect situations of the driver and passengers. For example, the camera may photograph the driver from a location adjacent to the driver. Accordingly, it is possible to detect the driver's state of health, whether he is drowsy or not, whether he is drunk or not. Also, the camera may photograph the passenger at a location adjacent to the passenger. Accordingly, it is possible to detect whether or not the passenger is sleeping or not, the health condition, and the like. In addition, information on the passenger may be provided to the driver.

The most important element to obtain an image in the camera is an imaging lens that forms an image. Recently, interest in high-definition or high-resolution is increasing. To this end, research on an optical system including a plurality of lenses is being conducted. However, when the camera is exposed to harsh environments (e.g., high temperature, low temperature, moisture, high humidity) outside or inside a vehicle, the characteristics of the optical system may change. Accordingly, optical characteristics or aberration characteristics of the camera may be reduced.

Therefore, a new optical system and camera capable of solving the above problems are required.

DISCLOSURE

Technical Problem

An embodiment is to provide an optical system and a camera module with improved optical characteristics.

In addition, the embodiment is to provide the optical system and the camera module capable of providing excellent optical characteristics in a low or high temperature environment.

In addition, the embodiment is to provide the optical system and the camera module capable of inhibiting or minimizing changes in optical characteristics in various temperature ranges.

Technical Solution

The optical system according to the embodiment includes first to third lenses disposed along an optical axis from the object side toward the sensor side, the optical system satisfies 40°≤Field Of View (FOV) ≤50°, an object-side surface and a sensor-side surface of the first lens are spherical, the first lens has a meniscus shape convex toward the object side, the first lens satisfies the following equations:

$$1.7 \le nt\_1 \le 2.3, \text{ and}$$

$$0.15 \le D\_1/TTL \le 0.3,$$

the TTL satisfies: TTL≤9 mm.

(nt_1 is the refractive index of the first lens, TTL is a distance in the optical axis from an object-side surface of the first lens to an image surface of the image sensor, D_1 is the thickness of the first lens at the optical axis, and FOV is the field of view of the optical system.)

Advantageous Effects

The optical system and the camera module according to the embodiment have improved optical characteristics. In detail, since the plurality of lenses of the optical system according to the embodiment have set shapes, refractive powers, focal lengths, and thicknesses, they have improved distortion characteristics and aberration characteristics. Accordingly, the optical system and the camera module according to the embodiment provide a high-resolution image and a high-definition image within a set view angle range.

In addition, the optical system and the camera module according to the embodiment operate in various temperature ranges. In detail, the optical system includes a first lens made of glass and second and third lenses made of plastic. At this time, the first lens, the second lens and the third lens have a set refractive power. Accordingly, even if the focal length of the lenses changes due to the change in refractive power of the lenses due to the change in temperature, the first lens, the second lens, and the third lens may compensate each other. That is, the optical system may effectively distribute refractive power in a temperature range from low temperature (−40° C.) to high temperature (90° C.). In addition, it is possible to inhibit optical characteristics from changing in a temperature range from low temperature (−40° C.) to high temperature (90° C.). Therefore, the optical system and the camera module according to the embodiment may maintain improved optical characteristics in various temperature ranges.

In addition, the optical system and the camera module according to the embodiment may satisfy the field of view set with the minimum number of lenses and have excellent optical characteristics. Accordingly, the optical system may have a slim and compact structure. Accordingly, the optical system and the camera module may be provided for various applications and devices. In addition, the optical system and the camera module may have excellent optical characteristics even in a harsh temperature environment (e.g., inside a high-temperature vehicle in summer).

DESCRIPTION OF DRAWINGS

FIG. 8 is a configuration diagram of the optical system according to a first embodiment.

FIG. 9 is a table of first to third lenses of the optical system according to the first embodiment.

FIG. 10 is a table of sag values of the first lens of the optical system according to the first embodiment.

FIG. 11 is a table of thicknesses of the first lens of the optical system according to the first embodiment.

FIG. 12 is a table of sag values of the second lens of the optical system according to the first embodiment.

FIG. 13 is a table of the thickness of the second lens of the optical system according to the first embodiment.

FIG. 14 is a table of sag values of the third lens of the optical system according to the first embodiment.

FIG. 15 is a table of thicknesses of the third lens of the optical system according to the first embodiment.

FIG. 16 is a table of aspheric coefficients of the lens of the optical system according to the first embodiment.

FIGS. 17 and 18 are tables of intervals between lenses of the optical system according to the first embodiment.

FIG. 30 is a configuration diagram of an optical system according to a second embodiment.

FIG. 31 is a table of first to third lenses of the optical system according to the second embodiment.

FIG. 32 is a table of sag values of the first lens of the optical system according to the second embodiment.

FIG. 33 is a table of thicknesses of the first lens of the optical system according to the second embodiment.

FIG. 34 is a table of sag values of the second lens of the optical system according to the second embodiment.

FIG. 35 is a table of thicknesses of the second lens of the optical system according to the second embodiment.

FIG. 36 is a table of sag values of the third lens of the optical system according to the second embodiment.

FIG. 37 is a table of thicknesses of the third lens of the optical system according to the second embodiment.

FIG. 38 is a table of aspheric coefficients of the lens of the optical system according to the second embodiment.

FIGS. 39 and 40 are tables of intervals between lenses of the optical system according to the second embodiment.

FIG. 52 is a configuration diagram of an optical system according to a third embodiment.

FIG. 53 is a table of first to third lenses of the optical system according to the third embodiment.

FIG. 54 is a table of sag values of the first lens of the optical system according to the third embodiment.

FIG. 55 is a table of thicknesses of the first lens of the optical system according to the third embodiment.

FIG. 56 is a table of sag values of the second lens of the optical system according to the third embodiment.

FIG. 57 is a table of thicknesses of the second lens of the optical system according to the third embodiment.

FIG. 58 is a table of sag values of the third lens of the optical system according to the third embodiment.

FIG. 59 is a table of thicknesses of the third lens of the optical system according to the third embodiment.

FIG. 60 is a table of aspheric coefficients of the lens of the optical system according to the third embodiment.

FIGS. 61 and 62 are tables of intervals between lenses of the optical system according to the third embodiment.

FIG. 74 is a table of the first to third lenses of an optical system according to a fourth embodiment.

MODES OF THE INVENTION

Figure 1:
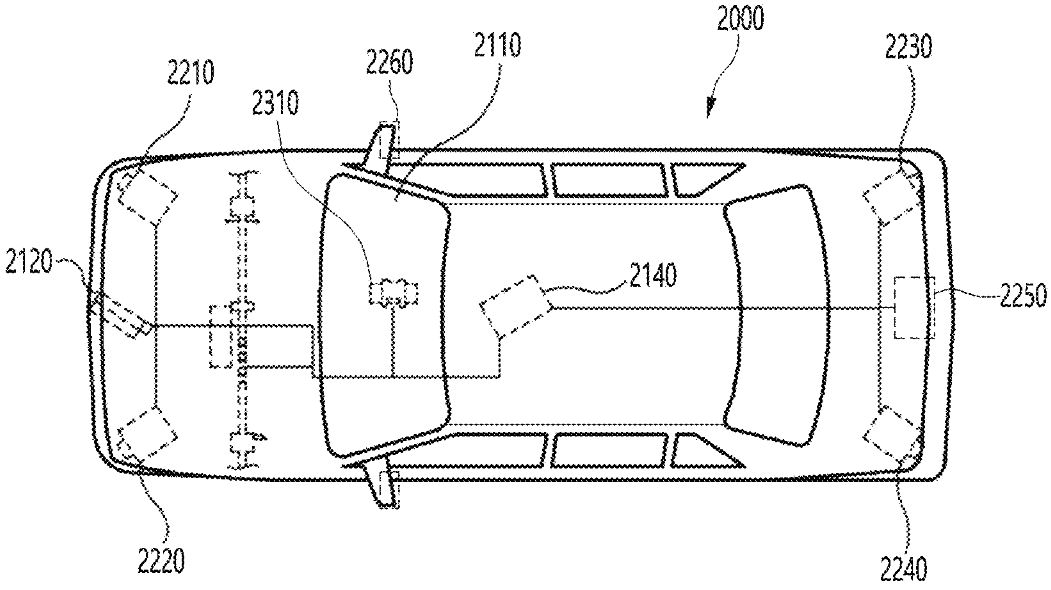
FIG. 1 is a plan view of a vehicle to which a camera module or an optical system according to an embodiment is applied.

Hereinafter, preferred embodiments of the invention will be described in detail with reference to the accompanying drawings.

A technical spirit of the invention is not limited to some embodiments to be described, and may be implemented in various other forms, and one or more of the components may be selectively combined and substituted for use within the scope of the technical spirit of the invention.

In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C.

In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component.

In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

In addition, the convex surface of the lens means that the lens surface of the region corresponding on the optical axis has a convex shape. And the concave lens surface means that the lens surface of the region corresponding on the optical axis has a concave shape.

In addition, "object-side surface" means the surface of the lens facing the object side with respect to the optical axis. And "image-side surface" means the surface of the lens toward the image sensor with respect to the optical axis.

In addition, the vertical direction means a direction perpendicular to the optical axis. And the end of the lens or the lens surface mean the end of the effective region of the lens through which the incident light passes.

In addition, the center thickness of the lens means a length in the optical axis direction between the object side and the sensor side on the optical axis of the lens.

In addition, the size of the effective diameter of the lens surface may have a measurement error of up to +0.4 mm depending on a measurement method.

For example, the effective diameter may be 2 mm or less, or 1 mm or less, or 0.3 mm or less with respect to the inner diameter of the flange portion.

In addition, in an embodiment, low temperature may mean a specific temperature (−40° C.). Or, the low temperature may mean a temperature range of about −40° C. to about 30° C.

Also, in an embodiment, room temperature may mean a specific temperature (22° C.). Or, the room temperature may mean a temperature range of about 20° C. to about 30° C.

Also, in an embodiment, high temperature may mean a specific temperature (99° C.). Or, the high temperature may mean range of about 85° C. to about 105° C.

Figure 2:
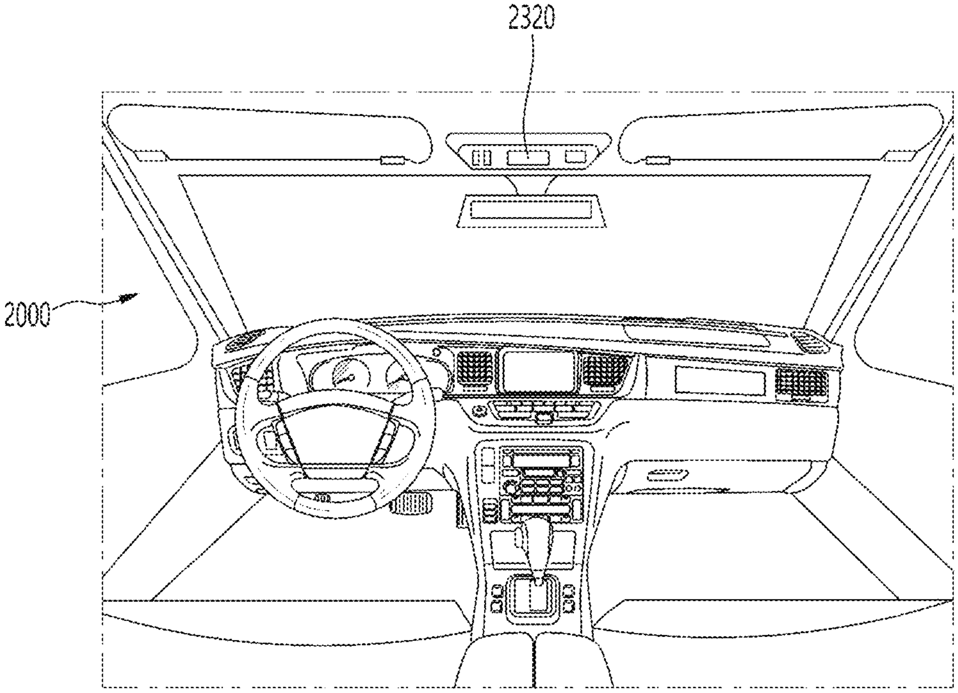
FIGS. 2 and 3 are internal views of a vehicle to which the camera module or the optical system according to the embodiment is applied.
Figures 3, 4:
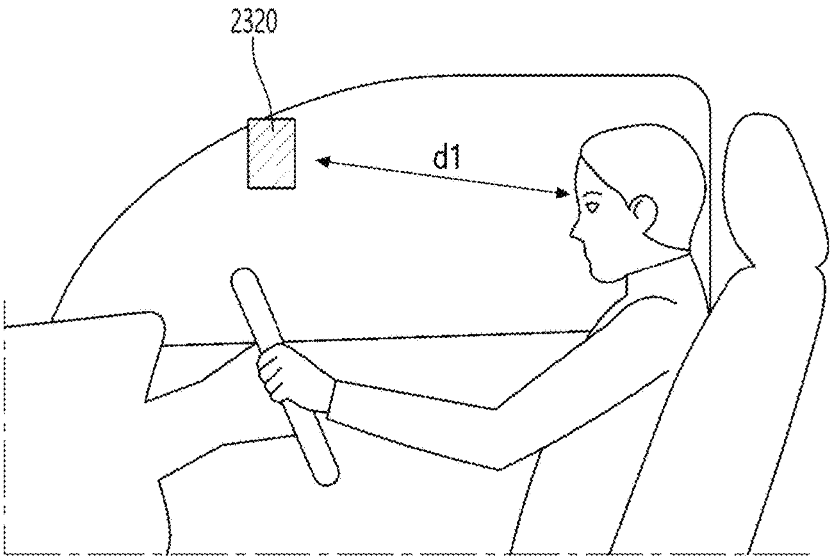
FIG. 4 is a table of refractive index data of a first lens for light of various wavelengths in various temperature ranges of the optical system according to the embodiment.

FIG. 1 is a plan view of a vehicle to which a camera module or an optical system according to an embodiment is applied. And, FIGS. 2 and 3 are internal views of a vehicle to which the camera module or the optical system according to the embodiment is applied.

Referring to FIG. 1, a vehicle camera system according to an embodiment includes an image generating unit 2110, a first information generating unit 2120, a second information generating units 2210, 2220, 2230, 2240, 2250, and 2260, and a control unit. 2140.

The image generating unit 2110 includes at least one first camera module 2310 disposed outside or inside the vehicle 2000. Also, the image generating unit 2110 generates a front image of the vehicle 2000. Also, the image generating unit 2110 photographs the front of the vehicle 2000 using the first camera module 2310. Also, the image generating unit 2110 photographs the surroundings of the vehicle 2000 in one or more directions. Accordingly, the image generating unit 2110 generates an image around the vehicle 2000. Here, the front image and the surrounding image may be digital images, and may include color images, black and white images, or infrared images. Also, the front image and the surrounding image may include a still image and a moving image. The image generating unit 2110 provides the front image and the surrounding image to the control unit 2140.

The first information generating unit 2120 includes at least one radar or/and camera disposed in the vehicle 2000. The first information generating unit 2120 detects the front of the vehicle 2000 and generates first detection information. In detail, the first information generating unit 2120 is disposed in the vehicle 2000. The first information generation unit 2120 may generate first detection information by detecting the location and speed of other vehicles located in front of the vehicle 2000 and the existence and location of pedestrians.

Control is performed to maintain a constant distance between the vehicle 2000 and the preceding vehicle using the first detection information. In addition, driving stability of the vehicle 2000 may be improved when the driver wants to change the driving lane of the vehicle 2000 or when parking the vehicle 2000 in reverse. The first information generating unit 2120 provides the first detection information to the control unit 2140.

The second information generating units 2210, 2220, 2230, 2240, 2250, and 2260 detect each side of the vehicle 2000 based on the front image and the first detection information. Accordingly, the second information generating units 2210, 2220, 2230, 2240, 2250, and 2260 generate second detection information. In detail, the second information generating units 2210, 2220, 2230, 2240, 2250, and 2260 include at least one radar or/and camera disposed in the vehicle 2000. The second information generating units 2210, 2220, 2230, 2240, 2250, and 2260 may detect the positions and speeds of vehicles located on the side of the vehicle 2000 or photograph images. The second information generating units 2210, 2220, 2230, 2240, 2250, and 2260 may be respectively disposed at both front corners, side mirrors, rear center and rear corners of the vehicle 2000.

Referring to FIGS. 2 and 3, the image generating unit 2110 includes at least one second camera module 2320 disposed inside the vehicle 2000. The second camera module 2320 is disposed adjacent to the driver and passenger. For example, the second camera module 2320 may be disposed at a location spaced apart from the driver and passengers by a first distance d1 and generate an internal image of the vehicle 2000. In this case, the first distance d1 may be about 500 mm or more. In detail, the first distance d1 may be about 600 mm or more. Also, the second camera module 2320 may have a field of view (FOV) of about 55° or greater.

The image generating unit 2110 may generate an internal image of the vehicle 2000 by photographing the driver and/or the passenger inside the vehicle 2000 using the second camera module 2320. The interior image of the vehicle may be a digital image, and may include a color image, a black and white image, and an infrared image. Also, the internal image may include a still image and a moving image. The image generating unit 2110 provides the inside image of the vehicle 2000 to the control unit 2140.

The control unit 2140 provides information to the occupants of the vehicle 2000 based on the information provided from the image generating unit 2110. For example, based on the information provided from the image generating unit 2110, the driver's state of health, drowsiness, and drinking may be detected. In addition, guidance information or warning information may be provided to the driver. Also, based on the information provided from the image generating unit 2110, it is possible to detect whether or not a passenger is sleeping or a health condition. In addition, this information may be provided to the driver and/or passenger.

This vehicle camera system includes a camera module including an optical system 1000 to be described below. The vehicle camera system provides information acquired through the front, rear, side, or corner regions of the vehicle 2000 to the user. Thereby, the vehicle 2000 and the object are protected from autonomous driving or surrounding safety. In addition, the vehicle camera system is also disposed inside the vehicle 2000 to provide various information to the driver and passengers. That is, at least one of the first camera module 2310 and the second camera module 2320 may include the optical system 1000 described below.

A plurality of optical systems of the camera module according to the embodiment may be mounted in the vehicle to regulate safety, enhance autonomous driving functions, and increase convenience. The optical system of the camera module is a component for controlling a lane keeping assistance system (LKAS), a lane departure warning system (LDWS), and a driver monitoring system (DMS), and is applied to vehicles. The camera module according to the embodiment may implement stable optical performance even when the ambient temperature changes. In addition, the camera module according to the embodiment may secure the reliability of vehicle components by providing a module having a competitive price.

The optical system according to the embodiment will be described in detail below.

The optical system 1000 according to the embodiment includes a plurality of lenses 100 and an image sensor 300. In detail, the optical system 1000 according to the embodiment includes two or more lenses. For example, the optical system 1000 may include three lenses. The optical system 1000 includes a first lens 110, a second lens 120, a third lens 130, and an image sensor 300 sequentially disposed from the object side to the sensor side. The lenses 110, 120, and 130 are sequentially disposed along the optical axis OA of the optical system 1000.

Accordingly, light corresponding to object information passes through the first lens 110, the second lens 120, and the third lens 130 and is incident on the image sensor 300.

Each of the plurality of lenses 100 includes an effective region and an ineffective region. The effective region is defined as a region through which light incident on each of the lenses 110, 120, and 130 passes. That is, the effective region is a region where the incident light is refracted to realize optical characteristics.

The ineffective region is disposed around the effective region. The ineffective region is a region in which the light is not incident. That is, the ineffective region is a region unrelated to the optical characteristics. Also, the ineffective region is a region fixed to a barrel (not shown) accommodating the lens.

The image sensor 300 detects light. In detail, the image sensor 300 detects light sequentially passing through the plurality of lenses 100. For example, the image sensor 300 may include a charge coupled device (CCD) or a complementary metal oxide semiconductor (CMOS).

The image sensor 300 includes a plurality of pixels having a set size. For example, the pixel size of the image sensor 300 may be about 3 μm.

The image sensor 300 detects light of a set wavelength. For example, the image sensor 300 may detect infrared (IR) light. For example, the image sensor 300 may detect near infrared ray light of about 1500 nm or less. For example, the image sensor may detect light in a wavelength band of about 880 nm to about 1000 nm.

The optical system 1000 according to the embodiment further includes a cover glass 400 and a filter 500.

The cover glass 400 is disposed between the plurality of lenses 100 and the image sensor 300. The cover glass 400 is disposed adjacent to the image sensor 300. The cover glass 400 has a shape corresponding to that of the image sensor 300. The cover glass 400 has a size equal to or greater than that of the image sensor 300. Accordingly, the cover glass 400 may protect the upper portion of the image sensor 300.

Also, the filter 500 is disposed between the plurality of lenses 100 and the image sensor 300. The filter 500 is disposed between the image sensor 300 and the last lens (third lens 130) closest to the image sensor 300. In detail, the filter 500 is disposed between the last lens (third lens 130) and the cover glass 400.

Light of a set wavelength band passes through the filter 500. In addition, light outside the set wavelength band is filtered by the filter 500. That is, light of a wavelength band corresponding to light received by the image sensor 300 passes through the filter 500. In addition, light in a wavelength band that does not correspond to light received by the image sensor 300 is blocked by the filter 500. In detail, light in the infrared wavelength band passes through the filter 500, and light in the ultraviolet and visible ray bands is blocked by the filter 500. For example, the filter 500 may include at least one of an IR pass filter and an IR cut-off filter.

In addition, the optical system 1000 according to the embodiment includes an aperture stop (not shown). The aperture stop controls the amount of light incident on the optical system 1000.

The aperture stop is disposed at a set position. For example, the aperture stop may be located in front of the first lens 110. Alternatively, the aperture stop may be disposed between two lenses among the lenses 110, 120, and 130. For example, the aperture stop may be located behind the first lens 110.

In addition, at least one of the lenses 110, 120, and 130 may function as the aperture stop. In detail, an object-side surface or a sensor-side surface of at least one of the lenses 110, 120, and 130 may serve as the aperture stop. For example, the sensor-side surface (second surface S2) of the first lens 110 may function as the aperture stop.

Hereinafter, the plurality of lenses 100 according to the embodiment will be described in detail.

The first lens 110 has positive (+) refractive power on the optical axis OA. The first lens 110 includes a glass material.

The first lens 110 includes a first surface S1 defined as the object-side surface and a second surface S2 defined as the sensor-side surface. The first surface S1 is convex at the optical axis OA. The second surface S2 is concave on the optical axis OA. That is, the first lens 110 has a meniscus shape convex on the optical axis OA toward the object side.

At least one surface of the first surface S1 and the second surface S2 is a sphere. For example, both the first surface S1 and the second surface S2 may be spheres.

The second lens 120 has positive (+) refractive power on the optical axis OA. The material of the second lens 120 is different from that of the first lens 110. For example, the second lens 120 includes a plastic material.

The second lens 120 includes a third surface S3 defined as the object-side surface and a fourth surface S4 defined as the sensor-side surface. The third surface S3 is concave on the optical axis OA. The fourth surface S4 is convex on the optical axis OA. That is, the second lens 120 has a meniscus shape convex on the optical axis OA toward the sensor.

At least one of the third and fourth surfaces S3 and S4 is an aspherical surface. For example, both the third surface S3 and the fourth surface S4 may be aspheric surfaces.

The third lens 130 has positive (+) refractive power on the optical axis OA. The material of the third lens 130 is different from that of the first lens 110. Also, the material of the third lens 130 is the same as that of the second lens 120. For example, the third lens 130 may include a plastic material.

The third lens 130 includes a fifth surface S5 defined as the object-side surface and a sixth surface S6 defined as the sensor-side surface. The fifth surface S5 is convex on the optical axis OA. The sixth surface S6 is concave on the optical axis OA. That is, the third lens 130 has a meniscus shape convex on the optical axis OA toward the object side.

At least one surface of the fifth surface S5 and the sixth surface S6 is an aspheric surface. For example, both the fifth surface S5 and the sixth surface S6 may be aspheric surfaces.

The optical system 1000 according to the embodiment satisfies at least one of equations described below. Accordingly, the optical system 1000 according to the embodiment may inhibit a change in optical characteristics due to temperature in a low to high temperature range. Therefore, the optical system 1000 according to the embodiment has improved optical characteristics at various temperatures. In addition, the optical system 1000 according to the embodiment has improved distortion characteristics and aberration characteristics at various temperatures.

Figure 79:
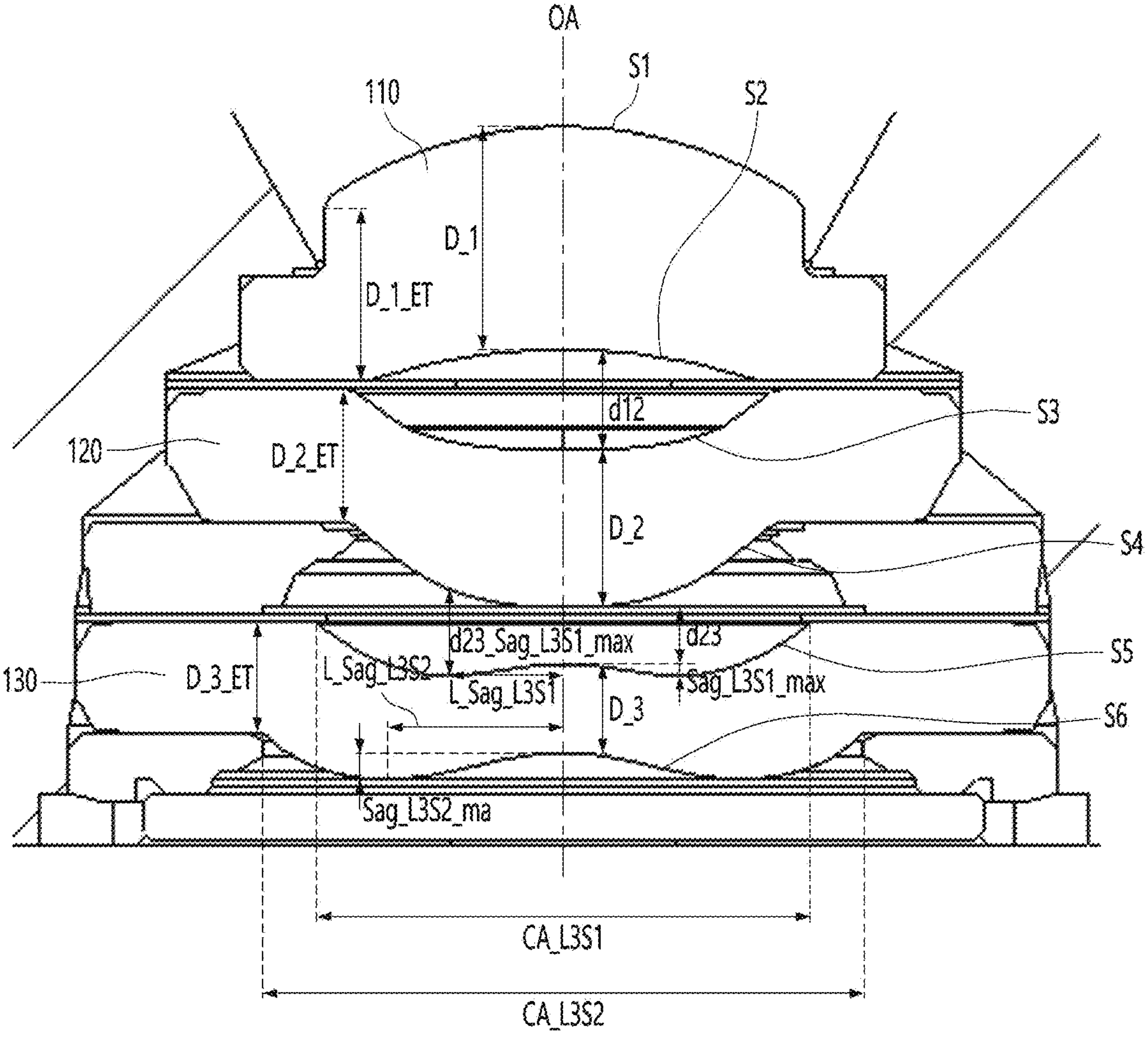
FIG. 79 is a configuration diagram for explaining some terms in an optical system according to the embodiment.

Equations will be described below. Also, terms expressed in some equations will be described with reference to FIG. 79.

$$1.7 \leq nt\_1 \leq 2.3 \quad \text{[Equation 1]}$$

(The nt_1 is a refractive index for the light in the wavelength band of the t-line (1013.98 nm) or d-line (587.6 nm) of the first lens 110.)

$$nt\_2 < nt\_1 \quad \text{[Equation 2]}$$

$$nt\_3 < nt\_1$$

(The nt_1 is a refractive index for the light in the wavelength band of the t-line or d-line of the first lens 110. The nt_2 is a refractive index for the light in the wavelength band of the t-line or d-line of the second lens 120. The nt_3 is a refractive index for the light in the wavelength band of the t-line or d-line of the third lens 130.)

$$dnt\_1/dt \geq 0 \quad \text{[Equation 3]}$$

$$dnt\_2/dt < 0$$

$$dnt\_3/dt < 0$$

$$|dnt\_2/dt|/|dnt\_1/dt| > 20$$

(The dt means a temperature change amount (° C.). The dnt_1 is a refractive index change of the first lens 110 in the entire wavelength band (especially the d-line wavelength band). That is, the dnt_1/dt is a refractive index change of the first lens 110 according to the temperature change amount in the entire wavelength band (especially the d-line wavelength band). In addition, the dnt_2 is a refractive index change of the second lens 120 in the entire wavelength band (especially the d-line wavelength band). That is, the dnt_2/dt is a refractive index change of the second lens 120 according to the temperature change amount in the entire wavelength band (especially the d-line wavelength band). In addition, the dnt_3 is a refractive index change of the third lens 130 in the entire wavelength band (especially the d-line wavelength band). That is, the dnt_3/dt is a refractive index change of the third lens 130 according to the temperature change amount in the entire wavelength band (especially the d-line wavelength band). The dt is a temperature change from −40° C. to 90° C.)

When the optical system 1000 according to the embodiment satisfies at least one of the Equation 1 to Equation 3, the optical system 1000 has excellent optical performance in the temperature range of low or high temperature.

$$1 \leq |v1 - v2| \leq 10 \quad \text{[Equation 4]}$$

$$1 \leq |v1 - v3| \leq 10$$

$$50 \leq v1 + v2 + v3 \leq 200$$

(The v1 is Abbe's number of the first lens 110. The v2 is Abbe's number of the second lens 120. The v3 is Abbe's number of the third lens 130.)

When the optical system 1000 according to the embodiment satisfies Equation 4, the optical system 1000 has excellent chromatic aberration characteristics.

In detail, the Equation 4 may satisfy $50 \leq v1+v2+v3 \leq 150$ for improved incident light control characteristics and aberration control characteristics in the set wavelength band. In more detail, the Equation 4 may satisfy $50 \leq v1+v2+v3 \leq 70$ for improved incident light control characteristics and aberration control characteristics in the set wavelength band.

$$1\text{mm} \leq TTL \leq 9\text{mm} \quad \text{[Equation 5]}$$

(The TTL is a distance (mm) in the optical axis OA from an object-side surface of the first lens 110 to an image surface of the image sensor 300 at room temperature (about 22° C.).)

In detail, the Equation 5 may be 2 mm≤TTL≤8 mm. In more detail, the Equation 5 may be 3 mm≤TTL≤7 mm.

$$|Diop\_L1| > |Diop\_L2| > |Diop\_L3| \quad \text{[Equation 6]}$$

(The Diop_L1 is the diopter value of the first lens 110 at room temperature (about 22° C.). The Diop_L2 is the diopter value of the second lens 120 at room temperature (about 22° C.). The Diop_L3 is the diopter value of the third lens 130 at room temperature (about 22° C.).)

$$1.5 < |Diop\_L1|/|Diop\_L2| < 2.5 \quad \text{[Equation 7]}$$

(The Diop_L1 is the diopter value of the first lens 110 at room temperature (about 22° C.). The Diop_L2 is the diopter value of the second lens 120 at room temperature (about 22° C.).)

$$10 < Diop\_L1/Diop\_L3 < 100 \quad \text{[Equation 8]}$$

(The Diop_L1 is the diopter value of the first lens 110 at room temperature (about 22° C.). The Diop_L3 is the diopter value of the third lens 130 at room temperature (about 22° C.).)

When the optical system 1000 according to the embodiment satisfies at least one of the Equation 6 to Equation 8, the plurality of lenses 100 of the optical system 1000 may have excellent optical performance in the center and peripherals of the field of view (FOV). In addition, the plurality of lenses 100 of the optical system 1000 may have excellent optical performance in the temperature range of low or high temperature.

$$1.8 \leq F\# \leq 2.22 \quad \text{[Equation 9]}$$

(The F# is a F-number of the optical system 1000 at room temperature (about 22° C.), low temperature (about −40° C.) and high temperature (about 90° C.).

$$1\text{mm} \leq D\_1 \leq 1.9\text{mm} \quad \text{[Equation 10]}$$

(The D_1 is the central thickness of the first lens 110 at room temperature (about 22° C.). That is, the D_1 is the thickness (mm) of the first lens 110 at the optical axis OA.)

In detail, the Equation 10 may be 1.2 mm≤D_1≤1.8 mm. In more detail, the Equation 10 may be 1.4 mm≤D_1≤1.7 mm.

When the optical system 1000 according to the embodiment satisfies Equation 10, the optical system 1000 may be easily manufactured with excellent optical performance. For example, if the center thickness of the first lens 110 is less than about 1 mm, the focal length of the first lens 110 is longer. Therefore, the manufacture of glass lenses may be difficult. In addition, if the center thickness of the first lens 110 exceeds 1.9 mm, the focal length of the first lens 110 is reduced. Accordingly, the optical performance of the optical system 1000 may be reduced.

$$0.15 \leq D\_1/TTL \leq 0.3 \quad \text{[Equation 11]}$$

(The D_1 is the central thickness of the first lens 110 at room temperature (about 22° C.). That is, the D_1 is the thickness (mm) of the first lens 110 at the optical axis OA. In addition, the TTL is a distance (mm) in the optical axis OA from an object-side surface of the first lens 110 to an image surface of the image sensor 300 at room temperature (about 22° C.).)

When the optical system 1000 according to the embodiment satisfies Equation 11, the optical performance change due to the change in the room temperature (about 22° C.) to the high temperature (about 90° C.) may be inhibited. In detail, the Equation 11 may satisfy 0.20≤D_1/TTL≤0.3 for excellent optical performance in various temperature ranges.

$$1 < D\_1/D\_2 < 1.6 \quad \text{[Equation 12]}$$

(The D_1 is the central thickness of the first lens 110 at room temperature (about 22° C.). That is, the D_1 is the thickness (mm) of the first lens 110 at the optical axis OA. In addition, the D_2 is the central thickness of the second lens 120 at room temperature (about 22° C.). That is, the D_2 is the thickness (mm) of the second lens 120 at the optical axis OA.)

When the optical system 1000 according to the embodiment satisfies Equation 12, the aberration characteristics of the optical system 1000 may be improved.

$$2.2 < D\_1/D\_3 < 3.0 \quad \text{[Equation 13]}$$

(The D_1 is the central thickness of the first lens 110 at room temperature (about 22° C.). That is, the D_1 is the thickness (mm) of the first lens 110 at the optical axis OA. In addition, the D_3 is the central thickness of the third lens 130 at room temperature (about 22° C.). That is, the D_3 is the thickness (mm) of the third lens 130 at the optical axis OA.)

When the optical system 1000 according to the embodiment satisfies Equation 13, the aberration characteristics of the optical system 1000 may be improved.

$$|f1| < |f2| < |f3| \quad \text{[Equation 14]}$$

(The f1 is a focal length (mm) of the first lens 110 at room temperature (about 22° C.). The f2 is a focal length (mm) of the second lens 120 at room temperature (about 22° C.). The f3 is a focal length (mm) of the third lens 130 at room temperature (about 22° C.).)

The focal length F1 of the first lens 110 may be greater than 4 mm and may be less than 7 mm at room temperature (about 22° C.). In addition, the focal length F2 of the second lens 120 may be greater than 7 mm and may be less than 13 mm at room temperature (about 22° C.). The focal length F3 of the third lens 130 may be greater than 200 mm and may be less than 300 mm at room temperature (about 22° C.).

When the optical system 1000 according to the embodiment satisfies Equation 14, the plurality of lenses 100 may have excellent optical performance in the center and periphery of the field of view (FOV).

$$0.3 < |f1/f2| < 0.8 \quad \text{[Equation 15]}$$

(The f1 is a focal length (mm) of the first lens 110 at room temperature (about 22° C.). The f2 is a focal length (mm) of the second lens 120 at room temperature (about 22° C.).)

When the optical system 1000 according to the embodiment satisfies Equation 15, the first lens 110 and the second lens 120 may have the appropriate refraction for controlling the path of the light incident. Accordingly, the optical system 1000 may have an improved resolution.

$$10 < |f3/f1| < 300 \quad \text{[Equation 16]}$$

(The f1 is a focal length (mm) of the first lens 110 at room temperature (about 22° C.). The f3 is a focal length (mm) of the third lens 130 at room temperature (about 22° C.).)

When the optical system 1000 according to the embodiment satisfies Equation 16, the refractive power of the first lens 110 and the third lens 130 is properly controlled. Accordingly, the optical system 1000 may have an improved resolution.

$$0.4 < |L1R1|/|L1R2| < 0.8 \quad \text{[Equation 17]}$$

(The L1R1 is a curvature radius of the object-side surface of the first lens 110 at room temperature (about 22° C.). The L1R2 is a curvature radius of the sensor-side surface of the first lens 110 at room temperature (about 22° C.).)

When the optical system 1000 according to the embodiment satisfies Equation 17, the optical system 1000 may control the incident light and may have an improved aberration control characteristic.

$$1.0 < |L2R1|/|L2R2| < 2.0 \quad \text{[Equation 18]}$$

(The L2R1 is a curvature radius of the object-side surface of the second lens 120 at room temperature (about 22° C.). The L2R2 is a curvature radius of the sensor-side surface of the second lens 120 at room temperature (about 22° C.).)

When the optical system 1000 according to the embodiment satisfies Equation 18, the optical system 1000 may have excellent aberration control characteristic.

$$1 < |L3R1|/|L3R2| < 1.3 \quad \text{[Equation 19]}$$

(The L3R1 is a curvature radius of the object-side surface of the third lens 130 at room temperature (about 22° C.). The L3R2 is a curvature radius of the sensor-side surface of the third lens 130 at room temperature (about 22° C.).)

When the optical system 1000 according to the embodiment satisfies Equation 19, the optical system 1000 may have good optical performance in the periphery of the field of view (FOV).

$$0.5 < CA\_L1S1/CA\_L3S2 < 1.0 \quad \text{[Equation 20]}$$

(The CA_L1S1 is a clear aperture (CA) of the object-side surface of the first lens 110 at room temperature (about 22° C.). The CA_L3S2 is a clear aperture of the sensor-side surface of the third lens 130 at room temperature (about 22° C.).)

When the optical system 1000 according to the embodiment satisfies Equation 20, the optical system 1000 may control the incident light. In addition, the optical system 1000 may have slim and compact size while maintaining optical performance.

[Equation 21]

$$CA\_L1S2 \le CA\_L2S2 \le CA\_L3S2$$

$$CA\_L1S2 \le CA\_L2S1 \le CA\_L3S1$$

$$CA\_L1S2 \le CA\_L2S1 \le CA\_L2S2 \le CA\_L3S1 \le CA\_L3S2$$

(The CA_L1S2 is a clear aperture of the surface where the aperture stop is disposed at room temperature (about 22° C.). That is, the CA_L1S2 is the clear aperture of the sensor-side surface of the first lens 110. The CA_L2S1 is the clear aperture of the object-side surface of the second lens 120 at room temperature (about 22° C.). The CA_L2S2 is the clear aperture of the sensor-side surface of the second lens 120 at room temperature (about 22° C.). The CA_L3S1 is the clear aperture of the object-side surface of the third lens 130 at room temperature (about 22° C.). The CA_L3S2 is the clear aperture of the sensor-side surface of the third lens 130 at room temperature (about 22° C.).

When the optical system 1000 according to the embodiment satisfies Equation 21, the optical system 1000 may control the incident light. In addition, the optical system 1000 may have slim and compact size while maintaining optical performance.

$$0.4 < d12/D\_1 < 0.9 \quad \text{[Equation 22]}$$

(The d12 is an interval between the first lens and the second lens at room temperature (about 22° C.). The d12 is the interval at the optical axis. The D_1 is the central thickness of the first lens 110 at room temperature (about 22° C.). That is, the D_1 is the thickness (mm) of the first lens 110 at the optical axis OA.)

When the optical system 1000 according to the embodiment satisfies Equation 22, the optical system 1000 may control the incident light and may have excellent aberration control characteristic.

$$0.2 \leq \text{CA\_Smax}/ImgH \leq 0.7 \quad \text{[Equation 23]}$$

(The CA_Smax is a clear aperture of the lens surface having the largest clear aperture at room temperature (about 22° C.) among the lens surfaces of the plurality of lenses 100. In addition, the image surface center of the image sensor 300, which overlaps with the optical axis OA at room temperature (about 22° C.), may be defined as the 0-field region. The ImgH means twice the vertical distance of the optical axis OA from the 0-field region to the 1.0-field region. That is, the ImgH means the entire diagonal length (mm) of the image sensor 300 at room temperature (about 22° C.).)

When the optical system 1000 according to the embodiment satisfies Equation 23, the optical system 1000 has excellent optical performance in the center and periphery of the field of view (FOV), and may have a slim and compact size.

$$3 \leq EFL \leq 5 \quad \text{[Equation 24]}$$

(The Effective Focal Length (EFL) means the effective focal length (mm) of the optical system 1000 at room temperature (about 22° C.).)

$$40° \leq FOV \leq 50° \quad \text{[Equation 25]}$$

(The FOV means a field of view of the optical system 1000 at room temperature (about 22° C.), low temperature (about −40° C.) and high temperature (about902° C.).)

$$1.2 < TTL/ImgH < 1.6 \quad \text{[Equation 26]}$$

(The TTL is a distance (mm) in the optical axis OA from an object-side surface of the first lens 110 to an image surface of the image sensor 300 at room temperature (about 22° C.). In addition, the image surface center of the image sensor 300, which overlaps with the optical axis OA at room temperature (about 22° C.), may be defined as the 0-field region. The ImgH means twice the vertical distance of the optical axis OA from the 0-field region to the 1.0-field region. That is, the ImgH means the entire diagonal length (mm) of the image sensor 300 at room temperature (about 22° C.).)

When the optical system 1000 according to the embodiment satisfies Equation 26, the optical system 1000 may secure a Back Focal Length (BFL) for a large image sensor 300. For example, the Back Focal Length (BFL) for the large image sensor 300 of about 1 inch may be secured and may have a small TTL. Therefore, it may have a high-definition and slim structure.

$$0.2 < BFL/ImgH < 0.5 \quad \text{[Equation 27]}$$

(The Back Focal Length (BFL) is the distance (mm) in the optical axis OA from the apex of the sensor side surface of the lens closest to the image sensor 300 at room temperature (about 22° C.) to the image surface of the image sensor 300. In addition, the image surface center of the image sensor 300, which overlaps with the optical axis OA at room temperature (about 22° C.), may be defined as the 0-field region. The ImgH means twice the vertical distance of the optical axis OA from the 0-field region to the 1.0-field region. That is, the ImgH means the entire diagonal length (mm) of the image sensor 300 at room temperature (about 22° C.).)

When the optical system 1000 according to the embodiment satisfies Equation 27, the optical system 1000 may secure a Back Focal Length (BFL) for a large image sensor 300. For example, the Back Focal Length (BFL) for the large image sensor 300 of about 1 inch may be secured. In addition, the interval between the last lens and the image sensor 300 may be minimized. Thus, it may have excellent optical properties in the center and periphery of the field of view (FOV).

$$3 < TTL/BFL < 5 \quad \text{[Equation 28]}$$

(The TTL is a distance (mm) in the optical axis OA from an object-side surface of the first lens 110 to an image surface of the image sensor 300 at room temperature (about 22° C.). In addition, the Back Focal Length (BFL) is the distance (mm) in the optical axis OA from the apex of the sensor side surface of the lens closest to the image sensor 300 at room temperature (about 22° C.) to the image surface of the image sensor 300.)

When the optical system 1000 according to the embodiment satisfies Equation 28, the optical system 1000 may have a slim and compact size while securing the BFL.

$$0.4 < EFL/TTL < 0.8 \quad \text{[Equation 29]}$$

(The Effective Focal Length (EFL) means the effective focal length (mm) of the optical system 1000 at room temperature (about 22° C.). The TTL is a distance (mm) in the optical axis OA from an object-side surface (first surface, S1) of the first lens 110 to an image surface of the image sensor 300 at room temperature (about 22° C.).

When the optical system 1000 according to the embodiment satisfies Equation 29, the optical system 1000 may have a slim and compact size.

$$2 < EFL/BFL < 3 \quad \text{[Equation 30]}$$

(The Effective Focal Length (EFL) means the effective focal length (mm) of the optical system 1000 at room temperature (about 22° C.). In addition, the Back Focal Length (BFL) is the distance (mm) in the optical axis OA from the apex of the sensor side surface of the lens closest to the image sensor 300 at room temperature (about 22° C.) to the image surface of the image sensor 300.)

When the optical system 1000 according to the embodiment satisfies Equation 30, the optical system 1000 may have an appropriate focal length while having a set field of view. In addition, the optical system 1000 may have a slim and compact size. In addition, the optical system 1000 may minimize the interval between the last lens and the image sensor 300. Thus, it may have excellent optical properties in the periphery of the field of view (FOV).

$$0.7 < EFL/ImghH < 1.2 \quad \text{[Equation 31]}$$

(The Effective Focal Length (EFL) means the effective focal length (mm) of the optical system 1000 at room temperature (about 22° C.). In addition, the image surface center of the image sensor 300, which overlaps with the optical axis OA at room temperature (about 22° C.), may be defined as the 0-field region. The ImgH means twice the vertical distance of the optical axis OA from the 0-field region to the 1.0-field region. That is, the ImgH means the entire diagonal length (mm) of the image sensor 300 at room temperature (about 22° C.).)

When the optical system 1000 according to the embodiment satisfies Equation 31, the optical system 1000 may apply the image sensor 300 having a large size. For example, the large image sensor 300 of about 1 inch may be applied, and may have improved aberration characteristics.

$$0.2 < D\_1\_ET/D\_1 < 1.7 \quad \text{[Equation 32]}$$

(The D_1 is the central thickness of the first lens 110 at room temperature (about 22° C.). That is, the D_1 is the thickness (mm) of the first lens 110 at the optical axis OA. The D_1_ET is the thickness (mm) in the optical axis OA direction at the end of the effective region of the first lens 110. The D_1_ET is the distance (mm) between the end of the effective region on the object-side surface of the first lens 110 and the end of the effective region on the sensor-side surface of the first lens 110 in the optical axis OA direction. The D_1_ET may be the thickness of the flange portion outside the clear aperture of the first lens 110.)

When the optical system 1000 according to the embodiment satisfies Equation 32, the optical system 1000 may control incident light. In addition, it may have excellent aberration control characteristics in a low to high temperature range.

In detail, Equation 32 may satisfy 0.4<D_1_ET/D_1<1.5 for excellent incident light control characteristics and aberration control characteristics in a low to high temperature range. In more detail, Equation 32 may satisfy 0.6<D_1_ET/D_1<1.0 for excellent incident light control characteristics and aberration control characteristics in a low to high temperature range.

$$0.3 < D\_2\_ET/D\_2 < 1.7 \quad \text{[Equation 33]}$$

(The D_2 is the central thickness of the second lens 120 at room temperature (about 22° C.). That is, the D_2 is the thickness (mm) of the second lens 120 at the optical axis OA. The D_2_ET is the thickness (mm) in the optical axis OA direction at the end of the effective region of the second lens 120. The D_2_ET is the distance (mm) between the end of the effective region on the object-side surface of the second lens 120 and the end of the effective region on the sensor-side surface of the second lens 120 in the optical axis OA direction. The D_2_ET may be the thickness of the flange portion outside the clear aperture of the second lens 120.)

When the optical system 1000 according to the embodiment satisfies Equation 33, the optical system 1000 may have excellent chromatic aberration control characteristics in a low to high temperature range.

In detail, Equation 33 may satisfy 0.4<D_2_ET/D_2<1.5 for excellent chromatic aberration control characteristics in a low to high temperature range. In more detail, Equation 33 may satisfy 0.5≤D_2_ET/D_2≤1.0 for excellent chromatic aberration control characteristics in a low to high temperature range.

$$0.3 < D\_3\_ET/D\_3 < 1.7 \quad \text{[Equation 34]}$$

(The D_3 is the central thickness of the third lens 130 at room temperature (about 22° C.). That is, the D_3 is the thickness (mm) of the third lens 130 at the optical axis OA. The D_3_ET is the thickness (mm) in the optical axis OA direction at the end of the effective region of the third lens 130. The D_3_ET is the distance (mm) between the end of the effective region on the object-side surface of the third lens 130 and the end of the effective region on the sensor-side surface of the third lens 130 in the optical axis OA direction. The D_3_ET may be the thickness of the flange portion outside the clear aperture of the third lens 130.)

When the optical system 1000 according to the embodiment satisfies Equation 34, the optical system 1000 may have improved distortion control characteristics in a temperature range of low to high temperatures. In addition, it may have excellent optical performance in the periphery of the field of view (FOV).

In detail, Equation 34 may satisfy 0.5<D_3_ET/D_3<1.6 for excellent distortion control characteristics in various temperature ranges. In more detail, Equation 34 may satisfy 1.0<D_3_ET/D_3<1.5 for excellent distortion control characteristics in various temperature ranges.

$$0.1 < d23/d23\_max < 1 \quad \text{[Equation 35]}$$

(The d23 is an interval (mm) between the second lens 120 and the third lens 130 at room temperature (about 22° C.). The d23 is the interval at the optical axis OA. The d23_max is the maximum interval (mm) among intervals in the optical axis OA direction between the sensor-side surface of the second lens 120 and the object-side surface of the third lens 130 at room temperature (about 22° C.).

When the optical system 1000 according to the embodiment satisfies Equation 35, the optical system 1000 may improve chromatic aberration and distortion aberration characteristics of the periphery of the field of view (FOV) in a low to high temperature range.

In detail, Equation 35 may satisfy 0.2<d23/d23_max<0.9 to improve the optical performance of the periphery of the field of view (FOV) in various temperature ranges. In more detail, Equation 35 may satisfy 0.25<d23/d23_max<0.8 in order to improve the optical performance of the periphery of the field of view (FOV) in various temperature ranges.

$$1 < d23\_Sag\_L3S1\_max/d23 < 5 \quad \text{[Equation 36]}$$

(The d23 is the interval (mm) between the second lens 120 and the third lens 130 at room temperature (about 22° C.).

The d23 is the interval at the optical axis OA. In addition, the second lens 120 includes a sensor-side surface facing the maximum sag of the object-side surface of the third lens 130 in the direction of the optical axis OA. The d23_Sag_L3S1_max is the interval (mm) in the optical axis OA direction from the maximum sag of the object-side surface of the third lens to the sensor-side surface facing the maximum sag.

When the optical system 1000 according to the embodiment satisfies Equation 36, the optical system 1000 may improve optical performance of the periphery of the field of view (FOV) in a low to high temperature range.

In detail, Equation 36 may satisfy 1.3<d23_Sag_L3S1_max/d23<4 to improve the optical performance of the periphery of the field of view (FOV) in various temperature ranges. In more detail, Equation 36 may satisfy 1.5<d23_Sag_L3S1_max/d23<3 to improve the optical performance of the periphery of the field of view (FOV) in various temperature ranges.

$$0.2 < L\_Sag\_L3S1/CA\_L3S1 < 0.8 \quad \text{[Equation 37]}$$

(The L_Sag_L3S1 is a distance in a direction perpendicular to the optical axis OA from the optical axis OA to the maximum |Sag| of the object-side surface of the third lens 130 at room temperature (about 22° C.). The CA_L3S1 means a clear aperture of the object-side surface of the third lens 130 at room temperature (about 22° C.).)

When the optical system 1000 according to the embodiment satisfies Equation 37, the optical system 1000 may improve optical performance of the periphery of the field of view (FOV) in a low to high temperature range.

In detail, Equation 37 may satisfy 0.3<L_Sag_L3S1/CA_L3S1<0.7 to improve the optical performance of the periphery of the field of view (FOV) in various temperature ranges. In more detail, Equation 37 may satisfy 0.4<L_Sag_L3S1/CA_L3S1<0.5 in order to further improve the optical performance of the periphery of the field of view (FOV) in various temperature ranges.

$$0.5 < |Sag\_L3S1\_max| < 1.5 \quad \text{[Equation 38]}$$

(The Sag_L3S1_max is a difference between the Sag of the object-side surface of the third lens 130 and the maximum Sag of the object-side surface of the third lens 130 in the optical axis OA at room temperature (about 22° C.).)

When the optical system 1000 according to the embodiment satisfies Equation 38, the optical system 1000 may improve optical performance of the periphery of the field of view (FOV) in a low to high temperature range.

In detail, Equation 38 may satisfy 0.7<|Sag_L3S1_max|<1.3 to improve the optical performance of the periphery of the field of view (FOV) in various temperature ranges. In more detail, Equation 38 may satisfy 0.9<|Sag_L3S1_max|<1.1 in order to further improve the optical performance of the periphery of the field of view (FOV) in various temperature ranges.

$$0.1 < L\_Sag\_L3S2/CA\_L3S2 < 1.2 \quad \text{[Equation 39]}$$

(The L_Sag_L3S2 is a distance in a direction perpendicular to the optical axis OA from the optical axis OA to the maximum |Sag| of the sensor-side surface of the third lens 130 at room temperature (about 22° C.). The CA_L3S2 means a clear aperture of the sensor-side surface of the third lens 130 at room temperature (about 22° C.).)

In detail, Equation 39 may satisfy 0.3<L_Sag_L3S2/CA_L3S2<1.0 to improve the optical performance of the periphery of the field of view (FOV) in various temperature ranges. In more detail, Equation 39 may satisfy 0.5<L_Sag_L3S2/CA_L3S2<0.8 in order to further improve the optical performance of the periphery of the field of view (FOV) in various temperature ranges.

When the optical system 1000 according to the embodiment satisfies at least one of Equations 38 and 39, the optical system 1000 may improve chromatic aberration and aberration characteristics in a temperature range of low to high temperatures. In addition, it may have excellent optical performance in the periphery as well as the center of the field of view (FOV).

$$0.1 < |Sag\_L3S2\_max| < 0.4 \quad \text{[Equation 40]}$$

(The |Sag_L3S2_max| is a difference between the Sag of the sensor-side surface of the third lens 130 and the maximum Sag of the sensor-side surface of the third lens 130 in the optical axis OA at room temperature (about 22° C.).)

When the optical system 1000 according to the embodiment satisfies Equation 40, the optical system 1000 may improve optical performance of the periphery of the field of view (FOV) in a low to high temperature range.

In detail, Equation 40 may satisfy 0.15<|Sag_L3S2_max|<0.35 to improve the optical performance of the periphery of the field of view (FOV) in various temperature ranges. In more detail, Equation 40 may satisfy 0.2<|Sag_L3S2_max|<0.3 in order to further improve the optical performance of the periphery of the field of view (FOV) in various temperature ranges.

$$0.2 < L3S2\_max\_sag \text{ to } Sensor/BFL < 1 \quad \text{[Equation 41]}$$

(The Back Focal Length (BFL) is the distance (mm) in the optical axis OA from the apex of the sensor side surface of the lens closest to the image sensor 300 at room temperature (about 22° C.) to the image surface of the image sensor 300. The L3S2_max_sag to sensor is a distance (mm) in the optical axis OA direction from the maximum Sag of the sensor-side surface of the third lens 130 to the image sensor 300 at room temperature (about 22° C.).

When the optical system 1000 according to the embodiment satisfies Equation 41, the distortion aberration characteristics of the optical system 1000 may be improved. In addition, it may have excellent optical performance in the periphery of the field of view (FOV). In addition, assembly may be easy.

In detail, Equation 41 may satisfy 0.3<L3S2_max_sag to Sensor/BFL<0.95 in order to have excellent characteristics in various temperature ranges. In more detail, Equation 41 may satisfy 0.4<L3S2_max_sag to Sensor/BFL<0.9 in order to have excellent characteristics in various temperature ranges.

$$3 < \sum \text{Index} < 10 \quad \text{[Equation 42]}$$

(The ΣIndex is the sum of the refractive indices at the d-line of each of the lenses 110, 120, and 130 at room temperature (about 22° C.).)

When the optical system 1000 according to the embodiment satisfies Equation 42, the TTL of the optical system 1000 may be controlled in a temperature range of low to high temperature. In addition, it may have improved chromatic aberration and resolution.

$$10 < \sum Abb / \sum < 50 \quad \text{[Equation 43]}$$

(The ΣIndex is the sum of the refractive indices at the d-line of each of the lenses 110, 120, and 130 at room temperature (about 22° C.). The ΣAbb is the sum of the Abbe's numbers of the lenses 110, 120, and 130 at room temperature (about 22° C.).)

When the optical system 1000 according to the embodiment satisfies Equation 43, the optical system 1000 may have improved aberration characteristics and resolution in a low to high temperature range.

$$1 < \text{CA\_Smax}/\text{CA\_Smin} < 3 \quad \text{[Equation 44]}$$

(The CA_Smax is the clear aperture of the lens surface having the largest clear aperture at room temperature (about 22° C.) among the lens surfaces of the plurality of lenses 100. The CA_Smin is the clear aperture of the lens surface having the smallest clear aperture at room temperature (about 22° C.) among the lens surfaces of the plurality of lenses 100.)

When the optical system 1000 according to the embodiment satisfies Equation 44, the optical system 1000 may have a slim and compact size. Accordingly, it may have an appropriate size for excellent optical performance in a low to high temperature range.

$$1 < \text{CA\_Smax}/\text{CA\_Aver} < 3 \quad \text{[Equation 45]}$$

(The CA_Smax is the clear aperture of the lens surface having the largest clear aperture at room temperature (about 22° C.) among the lens surfaces of the plurality of lenses 100. The CA_Aver is an average (mm) of the clear aperture of the lens surfaces (object-side surface, sensor-side surface) of the plurality of lenses 100 at room temperature (about 22° C.).)

When the optical system 1000 according to the embodiment satisfies Equation 45, the optical system 1000 may have a slim and compact size. Accordingly, it may have an appropriate size for excellent optical performance in a low to high temperature range.

$$0.1 < \text{CA\_Smin}/\text{CA\_Aver} < 1 \quad \text{[Equation 46]}$$

(The CA_Smin is the clear aperture of the lens surface having the smallest clear aperture at room temperature (about 22° C.) among the lens surfaces of the plurality of lenses 100. The CA_Aver is an average (mm) of the clear aperture of the lens surfaces (object-side surface, sensor-side surface) of the plurality of lenses 100 at room temperature (about 22° C.).)

When the optical system 1000 according to the embodiment satisfies Equation 46, the optical system 1000 may have a slim and compact size. Accordingly, it may have an appropriate size for excellent optical performance in a low to high temperature range.

$$0.1 < \text{CA\_Smax}/ImgH < 1 \quad \text{[Equation 47]}$$

(The CA_Smax is the clear aperture of the lens surface having the largest clear aperture at room temperature (about 22° C.) among the lens surfaces of the plurality of lenses 100. In addition, the image surface center of the image sensor 300, which overlaps with the optical axis OA at room temperature (about 22° C.), may be defined as the 0-field region. The ImgH means twice the vertical distance of the optical axis OA from the 0-field region to the 1.0-field region. That is, the ImgH means the entire diagonal length (mm) of the image sensor 300 at room temperature (about 22° C.).)

When the optical system 1000 according to the embodiment satisfies Equation 47, the optical system 1000 has excellent optical performance in the center and periphery of the field of view (FOV) in a low to high temperature range. In addition, it may have a slim and compact size.

$$0.5 < \text{CA\_L1S2}/\text{CA\_L2S1} < 1 \quad \text{[Equation 48]}$$

(The CA_L1S2 means the clear aperture (mm) of the sensor-side surface of the first lens 110 at room temperature (about 22° C.). The CA_L2S2 means the clear aperture (mm) of the sensor-side surface of the second lens 120 at room temperature (about 22° C.).)

When the optical system 1000 according to the embodiment satisfies Equation 48, the optical system 1000 has improved chromatic aberration control characteristics in a low to high temperature range.

$$Z = \frac{cY^2}{1 + \sqrt{1 - (1+K)c^2Y^2}} + AY^4 + BY^6 + CY^8 + DY^{10} + EY^{12} + FY^{14} + \ldots \quad \text{[Equation 49]}$$

(The Z is Sag. That is, the Z is the distance in the optical axis direction from an arbitrary position on the aspherical surface to the vertex of the aspherical surface. The Y is the distance in the direction perpendicular to the optical axis from an arbitrary position on the aspherical surface to the optical axis. The c is the curvature of the lens. The K is the conic constant. In addition, A, B, C, D, . . . are aspheric constants.)

$$0 < d1Ap < 0.2 \quad \text{[Equation 50]}$$

(The d1Ap is the distance in the optical axis direction from the end of the clear aperture on the sensor-side surface (second surface, S2) of the first lens 110 to the aperture stop at room temperature (about 22° C.).)

$$0.8 < CA\_L1S2/CA\_Ap < 1.8 \quad \text{[Equation 51]}$$

(The CA_L1S2 means the clear aperture (mm) of the sensor-side surface of the first lens 110 at room temperature (about 22° C.). The CA_Ap is a clear aperture of the aperture stop at room temperature (about 22° C.).)

When the optical system 1000 according to the embodiment satisfies Equations 50 and 51, the optical system 1000 may control incident light. In addition, it may have improved aberration control characteristics.

$$0.95 \leq EFL\_R/EFL\_H \leq 1.05 \quad \text{[Equation 52]}$$

(The EFL_R is an effective focal length (mm) of the optical system 1000 at room temperature (about 22° C.). The EFL_H is an effective focal length (mm) of the optical system 1000 at high temperature (about 90° C.).)

$$0.95 \leq EFL\_R/EFL\_L \leq 1.05 \quad \text{[Equation 53]}$$

(The EFL_R is an effective focal length (mm) of the optical system 1000 at room temperature (about 22° C.). The EFL_L is an effective focal length (mm) of the optical system 1000 at low temperature (about −40° C.).)

$$0.95 \leq FOV\_R/FOV\_H \leq 1.05 \quad \text{[Equation 54]}$$

(The FOV_R is the field of view) (° of the optical system 1000 at room temperature (about 22° C.). The FOV_H is the field of view) (° of the optical system 1000 at high temperature (about 90° C.).)

$$0.95 \leq FOV\_R/FOV\_L \leq 1.05 \quad \text{[Equation 55]}$$

(The FOV_R is the field of view) (° of the optical system 1000 at room temperature (about 22° C.). The FOV_L is the field of view) (° of the optical system 1000 at low temperature (about-40° C.).)

When the optical system 1000 according to the embodiment satisfies Equations 52 to 55, the optical system 1000 may have excellent optical performance in a low to high temperature range.

In addition, a chief ray angle (CRA) of the optical system 1000 according to the embodiment may be about 20° to about 30°. In detail, the chief ray angle (CRA) of the optical system 1000 may be about 24° to about 26° in a 1.0-field. In addition, optical distortion of the optical system 1000 may be ±4% or less in a 1.0-field.

In particular, the first lens 110 may include a material different from that of the second lens 120 and the third lens 130. For example, the first lens 110 may be made of a glass material, and the second lens 120 and the third lens 130 may be made of the same plastic material.

Figure 5:
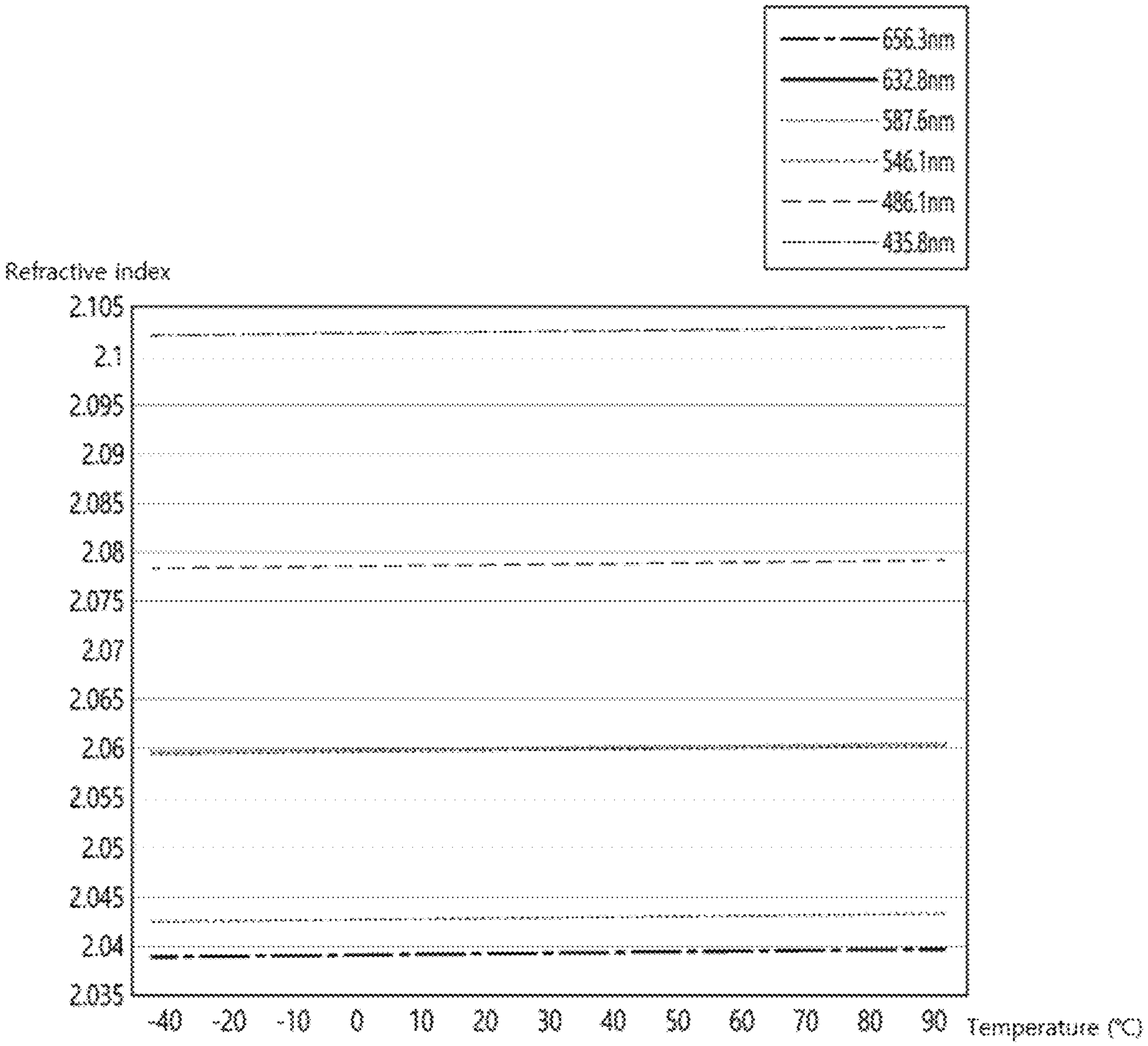
FIG. 5 is a graph of a change in refractive index according to a change in temperature of a first lens in the optical system according to the embodiment.

FIG. 4 is a data on the refractive index of the first lens 110 for light of various wavelengths in a temperature range from low temperature (−40° C.) to high temperature (90° C.). FIG. 5 is a graph of a change in refractive index of the first lens 110 according to a change in temperature.

Figures 6, 7:
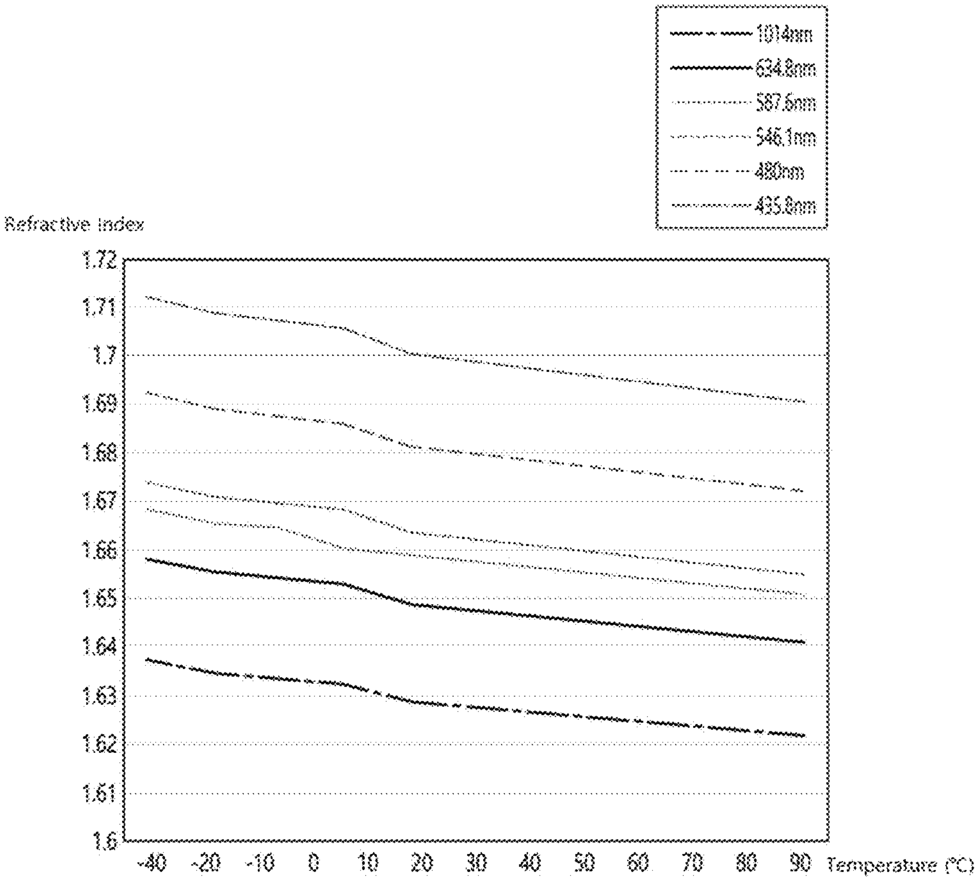
FIG. 6 is a table of refractive index data of a second lens and a third lens for light of various wavelengths in various temperature ranges of the optical system according to the embodiment.
FIG. 7 is a graph of a change in refractive index according to a change in temperature of a second lens and a third lens in the optical system according to the embodiment.

FIG. 6 is a data on the refractive index of the second and third lenses 120 and 130 for light of various wavelengths in a temperature range from low temperature (−40° C.) to high temperature (90° C.). FIG. 7 is a graph of a change in refractive index of the second and third lenses 120 and 130 according to a change in temperature.

Referring to FIGS. 4 to 7, the first lens 110, the second lens 120, and the third lens 130 have different refractive index change characteristics according to temperature changes.

Referring to FIGS. 4 and 5, the first lens 110 has a very small change in refractive index according to temperature in a temperature range from a low temperature (about −40° C.) to a high temperature (about 90° C.). In particular, the refractive index change (dnt_1/dt) according to the temperature change of the first lens 110 has a positive number as shown in Equation 3. Also, as shown in FIG. 5, it has a positive slope.

Meanwhile, referring to FIGS. 6 and 7, the second lens 120 has a large change in refractive index according to temperature in a temperature range from a low temperature (about −40° C.) to a high temperature (about 90° C.). In particular, the refractive index change (dnt_2/dt, dnt_3/dt) according to the temperature change of the second and third lenses 120 and 130 has a negative number as shown in Equation 3. Also, as shown in FIG. 7, it has a negative slope.

The first lens 110 has a higher refractive index than the second lens 120 and the third lens 130. In detail, the first lens 110 has a refractive index greater than that of the second lens 120 and the third lens 130 to compensate for the second lens 120 and the third lens 130 having a large refractive index change due to a temperature change.

In addition, the first lens 110 has a diopter larger than the second lens 120 and the third lens 130 to compensate for the second lens 120 and the third lens 130. Accordingly, the first lens 110 may effectively distribute the refractive power of the optical system in a temperature range of low (about −40° C.) or high temperature (about 90° C.). Accordingly, the optical system according to the embodiment may have improved optical performance in various temperature ranges.

That is, the first lens 110 has a material different from that of the second lens 120 and the third lens 130. Also, the optical system 1000 satisfies at least one of Equations 1 to 55. Accordingly, the optical system 1000 may inhibit a change in optical characteristics due to temperature. In addition, it has improved optical properties in various temperature ranges.

In addition, the optical system 1000 according to the embodiment satisfies at least one of Equations 1 to 55. Therefore, it is possible to inhibit distortion and aberration characteristics from changing in various temperature ranges. Accordingly, it may have improved optical properties.

In addition, the intervals between the plurality of lenses 100 has a value set according to the region.

The first lens 110 and the second lens 120 are spaced apart by a first interval. The first interval is a distance between the first lens 110 and the second lens 120 in the direction of the optical axis OA.

The first interval varies according to a position between the first lens 110 and the second lens 120. In detail, when the optical axis OA is the starting point and the end of the effective region on the sensor-side surface of the first lens 110 is defined as the end point, the first interval changes while extending from the optical axis OA in a direction perpendicular to the optical axis OA. That is, the first interval varies while extending from the optical axis OA to the end of the clear aperture of the second surface S2.

The first interval decreases from the optical axis OA to the first point L1 located on the second surface S2. Here, the first point L1 is the end of the effective region of the second surface S2.

The first interval has a maximum value at the optical axis OA. Also, the first interval has a minimum value at the first point L1. The maximum value of the first interval may be greater than or equal to about 1.1 times the minimum value. In detail, the maximum value of the first interval may be about 1.1 times to about 3 times the minimum value.

The second lens 120 and the third lens 130 are spaced apart by a second interval. The second interval is a distance between the second lens 120 and the third lens 130 in the direction of the optical axis OA.

The second interval varies according to a position between the second lens 120 and the third lens 130. In detail, when the optical axis OA is the starting point and the end of the effective region on the sensor-side surface of the second lens 120 is defined as the end point, the second interval changes while extending from the optical axis OA in a direction perpendicular to the optical axis OA. That is, the second interval varies while extending from the optical axis OA to the end of the clear aperture of the fourth surface S4.

The second interval decreases from the optical axis OA to the second point L2 located on the fourth surface S4. Here, the second point L2 is the end of the effective region of the fourth surface S4.

The second interval has a maximum value at the second point L2. Also, the first interval has a minimum value at the optical axis OA. The maximum value of the second interval may be greater than or equal to about 2 times the minimum value. In detail, the maximum value of the second interval may be about 2 times to about 4 times the minimum value.

Accordingly, the optical system 1000 has improved optical characteristics. In detail, the interval between the first lens 110 and the second lens 120 and the interval between the second lens 120 and the third lens 130 have intervals set according to positions. Accordingly, the optical system 1000 may inhibit optical characteristics from changing in a temperature range from low to high. Therefore, the optical system and the camera module according to the embodiment may maintain improved optical characteristics in various temperature ranges.

The optical system 1000 according to the first embodiment will be described in detail with reference to FIGS. 8 to 29.

Referring to FIGS. 8 to 29, the optical system 1000 according to the first embodiment includes a first lens 110, a second lens 120, a third lens 130, and an image sensor 300 sequentially disposed from the object side to the sensor side. The lenses 110, 120, and 130 are sequentially disposed along the optical axis OA of the optical system 1000.

In addition, an aperture stop 600 is disposed between the sensor-side surface (second surface, S2) of the first lens 110 and the object-side surface (third surface, S3) of the second lens 120.

In detail, the aperture stop 600 is spaced apart from the sensor-side surface (second surface, S2) of the first lens 110 at between the sensor-side surface (second surface, S2) of the first lens 110 and the object-side surface (third surface, S3) of the second lens 120.

For example, the aperture stop 600 may be spaced apart from the sensor-side surface (second surface, S2) of the first lens 110 as shown in Equations 50 and 51.

In addition, a filter 500 is disposed between the plurality of lenses 100 and the image sensor 300. A cover glass 400 is disposed between the filter 500 and the image sensor 300.

FIG. 9 shows data of a radius of curvature of the lenses 110, 120, and 130, a thickness of each lens at the optical axis OA, a distance between each lens at the optical axis OA, a refractive index for light in the t-line (1013.98 nm) wavelength band, Abbe's Number, a clear aperture (CA) and a focal length according to the first embodiment. In detail, FIG. 9 is data at room temperature (about 22° C.).

Referring to FIGS. 8 and 9, the first lens 110 has a glass material. Also, the first lens 110 has positive (+) refractive power on the optical axis OA. In addition, the first surface S1 of the first lens 110 is convex on the optical axis OA. Also, the second surface S2 is concave on the optical axis OA. The first lens 110 may have a meniscus shape convex from the optical axis OA toward the object side. The first surface S1 may be a sphere, and the second surface S2 may be a sphere.

FIG. 10 is Sag data according to vertical heights (0.2 mm interval) of the optical axis OA of the object-side surface (first surface, S1) and the sensor-side surface (second surface, S2) of the first lens 110 at room temperature (about 22° C.).

In addition, FIG. 11 is data of lens thickness according to heights (0.2 mm intervals) in the vertical direction of the optical axis OA at room temperature (about 22° C.). In detail, D_1 of FIG. 11 is the center thickness of the first lens 110. That is, D_1 is the thickness (mm) of the first lens 110 at the optical axis OA. Also, D_1_ET of FIG. 11 is the thickness (mm) in the optical axis OA direction at the end of the effective region of the first lens 110. In detail, D_1_ET is the distance (mm) between the end of the effective region on the object-side surface (first surface, S1) of the first lens 110 and the end of the effective region on the sensor-side surface (second surface, S2) of the first lens 110 in the direction of the optical axis OA.

Referring to FIGS. 9 to 11, the thickness in the direction of the optical axis OA of the first lens 110 increases while extending from the optical axis OA toward the end of the clear aperture of the first lens 110.

Accordingly, the first lens 110 may have improved aberration control characteristics by controlling incident light.

The second lens 120 has a plastic material. Also, the second lens 120 has positive (+) refractive power on the optical axis OA. In addition, the third surface S3 of the second lens 120 is concave on the optical axis OA. Also, the fourth surface S4 is convex on the optical axis OA. The second lens 120 may have a meniscus shape convex from the optical axis OA toward the sensor side. The third surface S3 may be aspherical, and the fourth surface S4 may be aspherical.

FIG. 12 is Sag data according to vertical heights (0.2 mm interval) of the optical axis OA of the object-side surface (third surface, S3) and the sensor-side surface (fourth surface, S4) of the second lens 120 at room temperature (about 22° C.).

In addition, FIG. 13 is data of lens thickness according to heights (0.2 mm intervals) in the vertical direction of the optical axis OA at room temperature (about 22° C.). In detail, D_2 of FIG. 13 is the center thickness of the second lens 120. That is, D_2 is the thickness (mm) of the second lens 120 at the optical axis OA. Also, D_2_ET of FIG. 13 is the thickness (mm) in the optical axis OA direction at the end of the effective region of the second lens 120. In detail, D_2_ET is the distance (mm) between the end of the effective region on the object-side surface (third surface, S3) of the second lens 120 and the end of the effective region on the sensor-side surface (fourth surface, S4) of the second lens 120 in the direction of the optical axis OA.

Referring to FIGS. 9, 12 and 13, the thickness of the second lens 120 in the direction of the optical axis OA becomes thinner while extending from the optical axis OA toward the end of the clear aperture of the second lens 120. In detail, the thickness in the direction of the optical axis OA of the second lens 120 in the range from the optical axis OA to the end of the clear aperture of the third surface S3 has a maximum value at the optical axis OA. In addition, it has a minimum value at the end of the clear aperture of the third surface S3.

Accordingly, the second lens 120 may inhibit a change in optical characteristics due to temperature in a low to high temperature range.

The third lens 130 has a plastic material. Also, the third lens 130 has positive (+) refractive power on the optical axis OA. In addition, the fifth surface S5 of the third lens 130 is convex on the optical axis OA. Also, the sixth surface S6 is concave on the optical axis OA. The third lens 130 may have a meniscus shape convex from the optical axis OA toward the object side. The fifth surface S5 may be aspherical, and the sixth surface S6 may be aspherical.

FIG. 14 is Sag data according to vertical heights (0.2 mm interval) of the optical axis OA of the object-side surface (fifth surface, S5) and the sensor-side surface (sixth surface, S6) of the third lens 130 at room temperature (about 22° C.).

In addition, FIG. 15 is data of lens thickness according to heights (0.2 mm intervals) in the vertical direction of the optical axis OA at room temperature (about 22° C.). In detail, D_3 of FIG. 15 is the center thickness of the third lens 130. That is, D_3 is the thickness (mm) of the third lens 130 at the optical axis OA. Also, D_3_ET of FIG. 15 is the thickness (mm) in the optical axis OA direction at the end of the effective region of the third lens 130. In detail, D_3_ET is the distance (mm) between the end of the effective region on the object-side surface (fifth surface, S5) of the third lens 130 and the end of the effective region on the sensor-side surface (sixth surface, S6) of the third lens 130 in the direction of the optical axis OA.

Referring to FIGS. 9, 14 and 15, the thickness of the third lens 130 in the direction of the optical axis OA becomes thick while extending from the optical axis OA toward the end of the clear aperture of the third lens 130. In detail, the thickness in the direction of the optical axis OA of the third lens 130 in the range from the optical axis OA to the end of the clear aperture of the fifth surface S5 has a maximum value at the end of the clear aperture of the fifth surface S5. In addition, it has a minimum value at the optical axis OA.

Accordingly, the third lens 130 may inhibit a change in optical characteristics due to temperature in a low to high temperature range.

The refractive power of the first lens 110 is different from those of the second lens 120 and the third lens 130. For example, the refractive power of the first lens 110 may be about 1.2 times greater than the refractive powers of the second lens 120 and the third lens 130. In detail, the refractive power of the first lens 110 may be about 1.5 times greater than the refractive powers of the second lens 120 and the third lens 130. In more detail, the refractive power of the first lens 110 may be about 1.8 times or more than the refractive powers of the second lens 120 and the third lens 130.

Also, the refractive power of the second lens 120 is different from that of the third lens 130. For example, the refractive power of the second lens 120 may be about 10 times or more than the refractive power of the third lens 130. In detail, the refractive power of the second lens 120 may be about 15 times or more than the refractive power of the third lens 130. In more detail, the refractive power of the second lens 120 may be about 20 times or more than the refractive power of the third lens 130.

In addition, the Abbe's number of the first lens 110 is different from that of the second lens 120 and the third lens 130. For example, the difference between the Abbe's number of the first lens 110 and the Abbe's numbers of the second and third lenses 120 and 130 may be 10 or less. In detail, the Abbe's number of the first lens 110 may be greater than the Abbe's numbers of the second lens 120 and the third lens 130 within the above range.

In the optical system 1000 according to the first embodiment, values of aspheric coefficients of each lens surface are shown in FIG. 16.

Also, in the optical system 1000 according to the first embodiment, the distance (first interval) between the first lens 110 and the second lens 120 is as shown in FIG. 17 at room temperature (about 22° C.). In addition, the distance (second interval) between the second lens 120 and the third lens 130 is as shown in FIG. 18 at room temperature (about 22° C.).

Referring to FIG. 17, the first interval decreases from the optical axis OA toward the first point L1, which is the end of the clear aperture of the second surface S2. The first point L1 is an approximate value of the effective radius of the second surface S2 facing each other and having a smaller clear aperture. That is, the first point L1 is an approximate value of ½ of the clear aperture of the second surface S2 described in FIG. 9.

The first interval has a maximum value at the optical axis OA. Also, the first interval has a minimum value at the first point L1. The maximum value of the first interval may be about 1.1 times to about 3 times the minimum value. For example, the maximum value of the first interval may be about 1.2 times the minimum value.

Referring to FIG. 18, the second interval increases from the optical axis OA toward the second point L2, which is the end of the clear aperture of the fourth surface S4. The second point L2 is an approximate value of the effective radius of the fifth surface S4 having a smaller clear aperture. That is, the second point L2 is an approximate value of ½ of the clear aperture of the fourth surface S4 described in FIG. 9.

The second interval has a maximum value at the second point L2. Also, the second interval has a minimum value at the optical axis OA. The maximum value of the second interval may be about 2 times to about 4 times the minimum value. For example, the maximum value of the second interval may be about 2.6 times the minimum value.

Accordingly, the optical system 1000 has improved optical characteristics. In detail, the interval between the first lens 110 and the second lens 120 and the interval between the second lens 120 and the third lens 130 are spaced at intervals (first interval, second interval) set according to positions. Accordingly, the optical system 1000 may inhibit optical characteristics from changing in a temperature range from low to high. Therefore, the optical system and the camera module according to the first embodiment may maintain improved optical characteristics in various temperature ranges.

Figure 19:
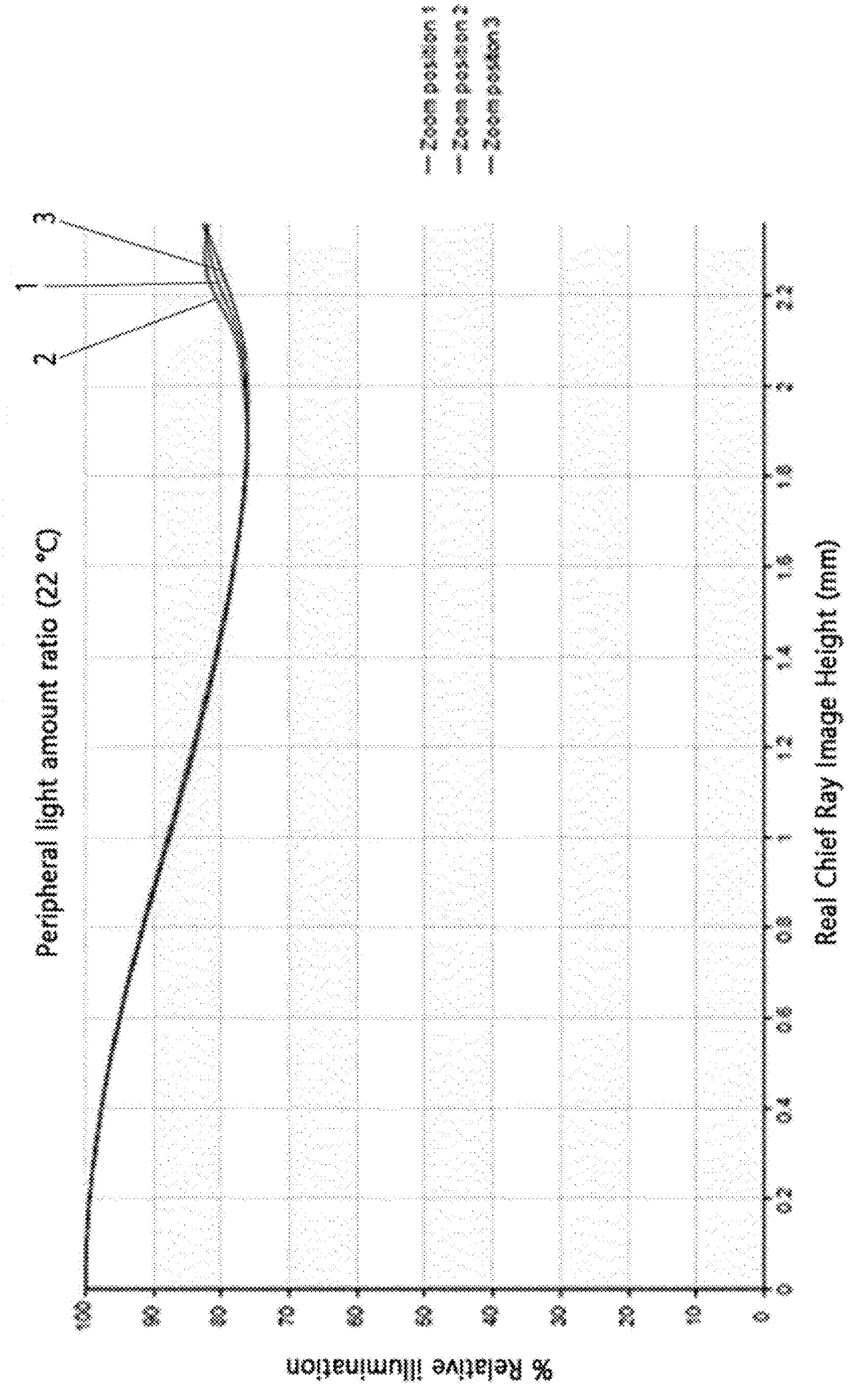
FIG. 19 is a graph of relative illumination for each field of the optical system according to the first embodiment.

FIG. 19 is a graph of relative illumination for each field of the optical system according to the first embodiment. FIG.

Figure 20:
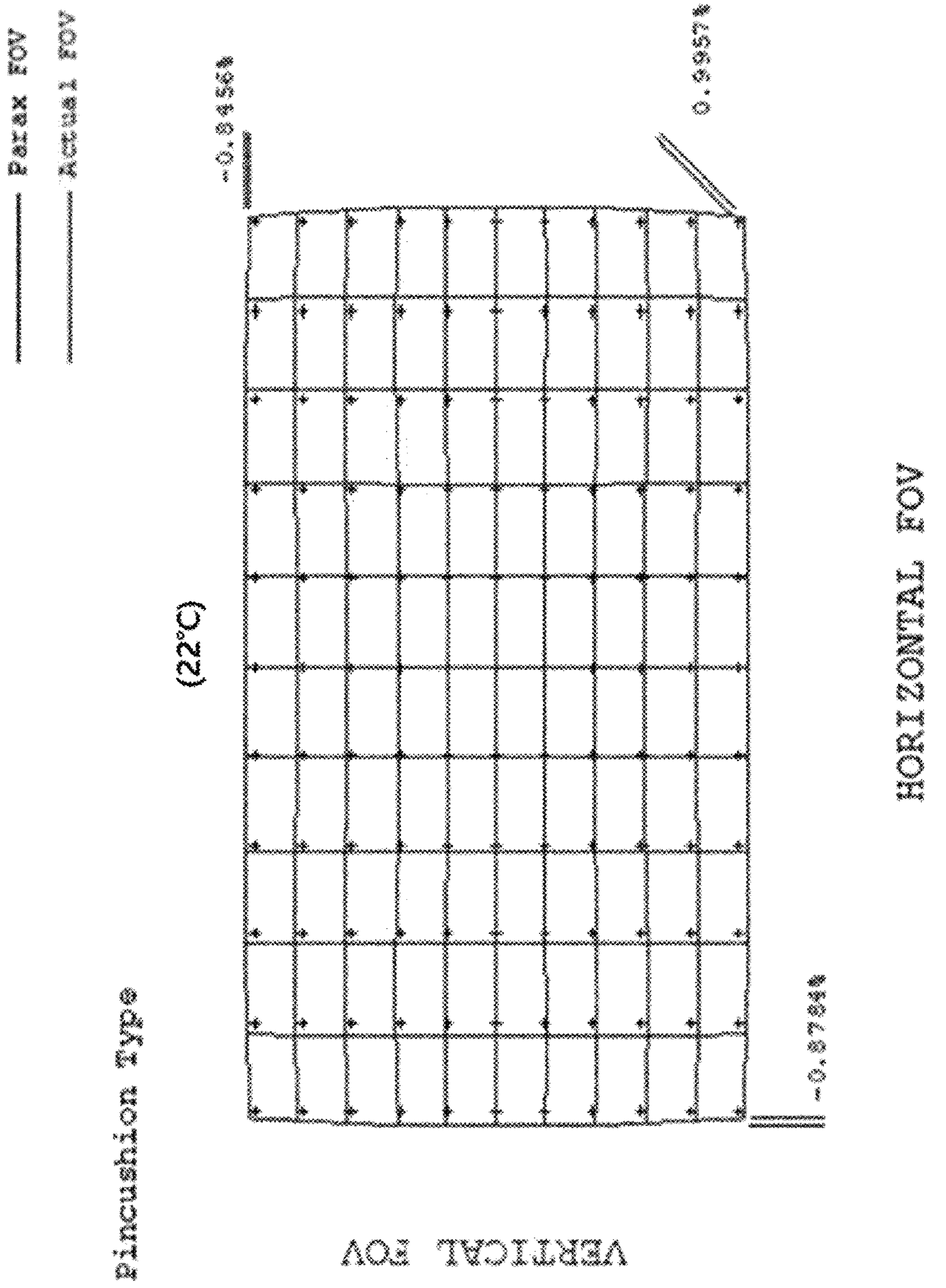
FIG. 20 is data on distortion characteristics of the optical system according to the first embodiment.

20 is data on distortion characteristics of the optical system according to the first embodiment. FIGS. 19 and 20 are data at room temperature (about 22° C.).

Referring to FIG. 19, the optical system 1000 according to the first embodiment has excellent light ratio characteristics in the 0-field region (center region) to 1.0-field region (edge region) of the image sensor 300. For example, the optical system 1000 may have a peripheral light amount ratio of about 70% or more. In detail, in the optical system 1000, when the light amount ratio of the 0-field region is 100%, the light amount ratio of the 0.5 field region may be about 80% or more, and the light amount ratio of the 1.0-field region may be about 70% or more.

Also, referring to FIG. 20, the optical system 1000 according to the first embodiment may have a barrel distortion shape in which an edge portion of an image is bent outward. Also, it may have a distortion of about 1.1179% and a TV-distortion of about −0.7453%.

FIGS. 21 to 29 are graphs of diffraction MTF characteristics and aberration diagrams according to temperature of the optical system 1000.

Figure 21:
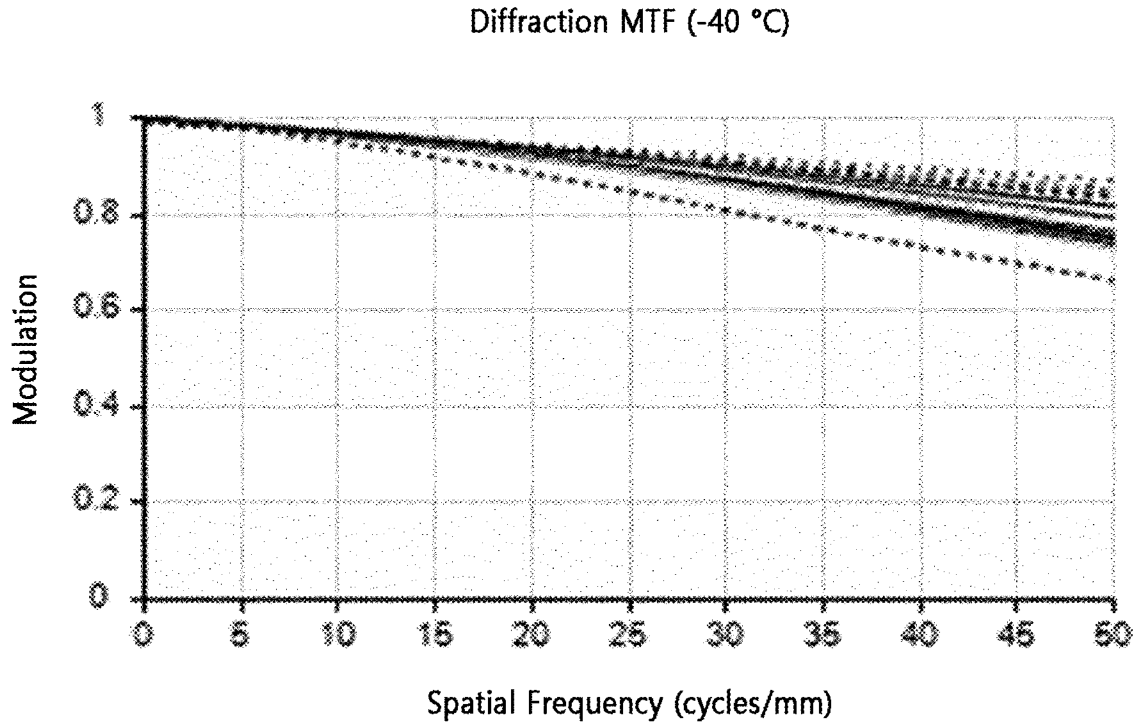
FIGS. 21 to 29 are graphs of diffraction MTF and aberration for each temperature of the optical system according to the first embodiment.
Figure 22:
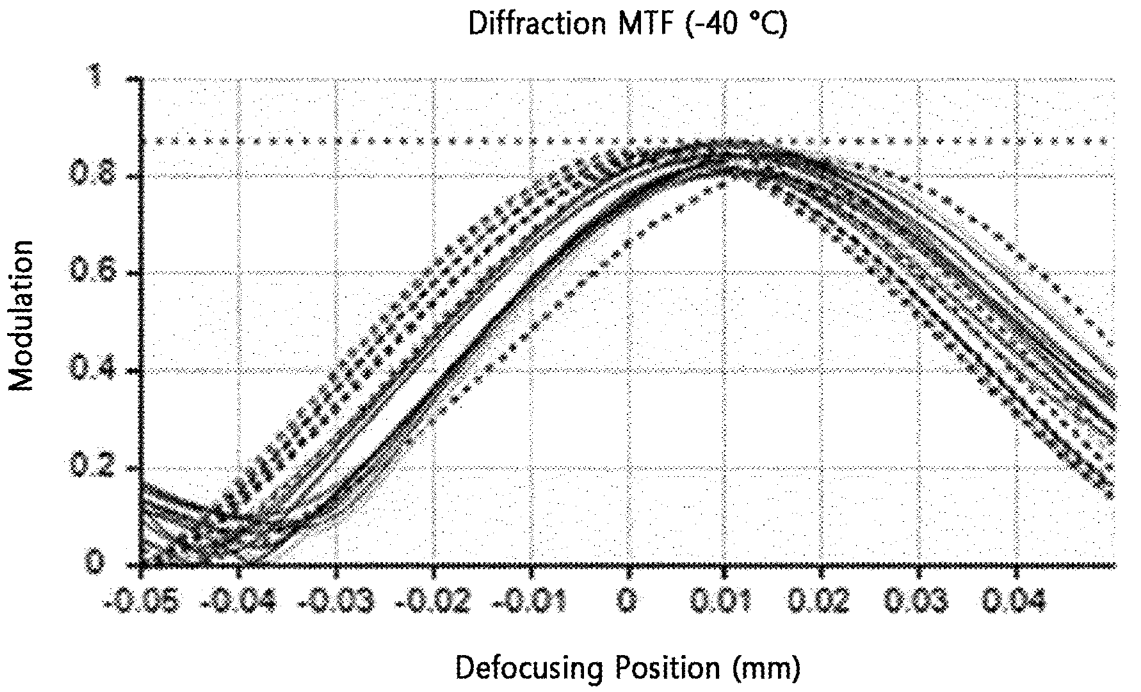
Figure 24:
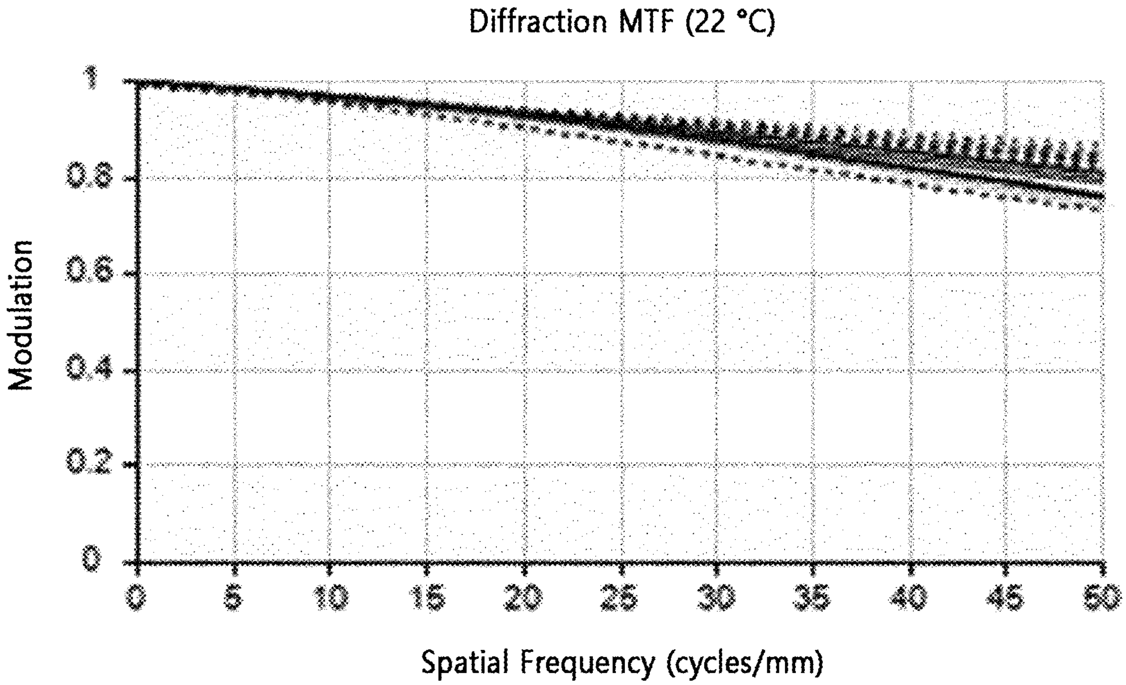
Figure 25:
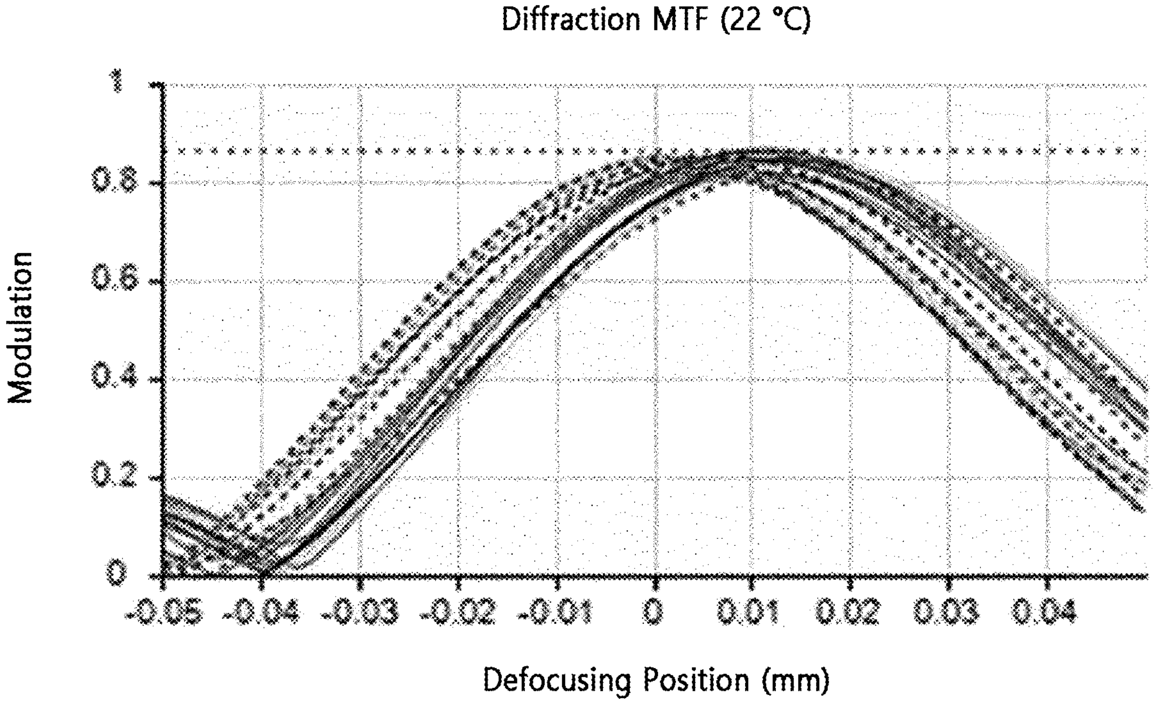
Figure 27:
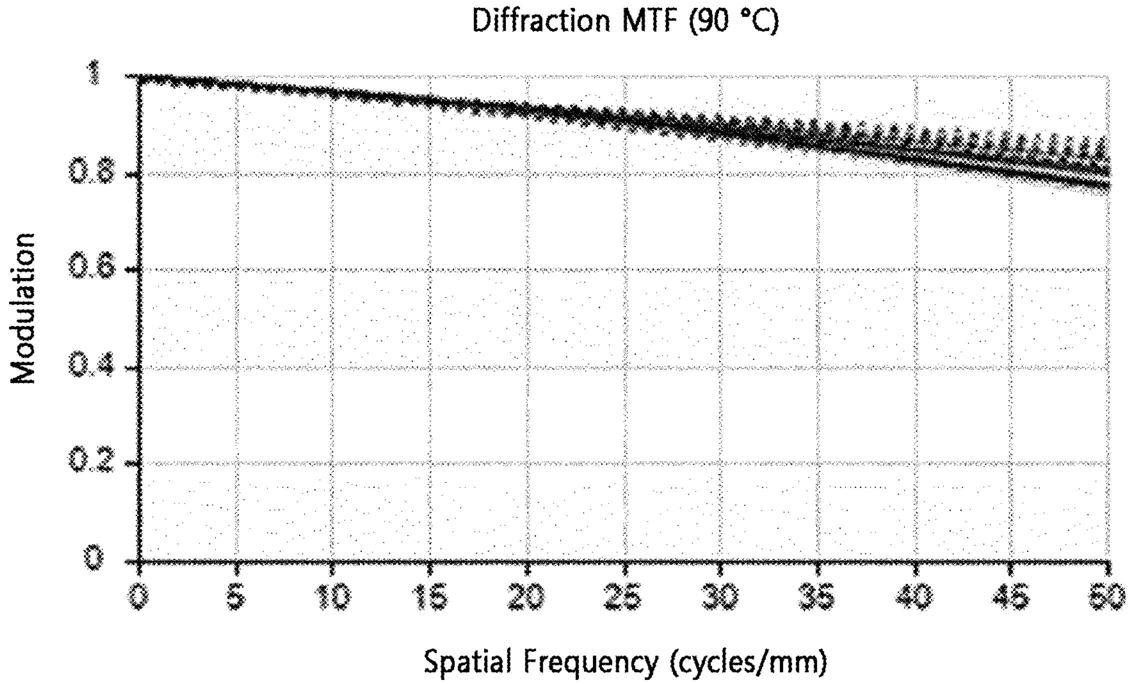
Figure 28:
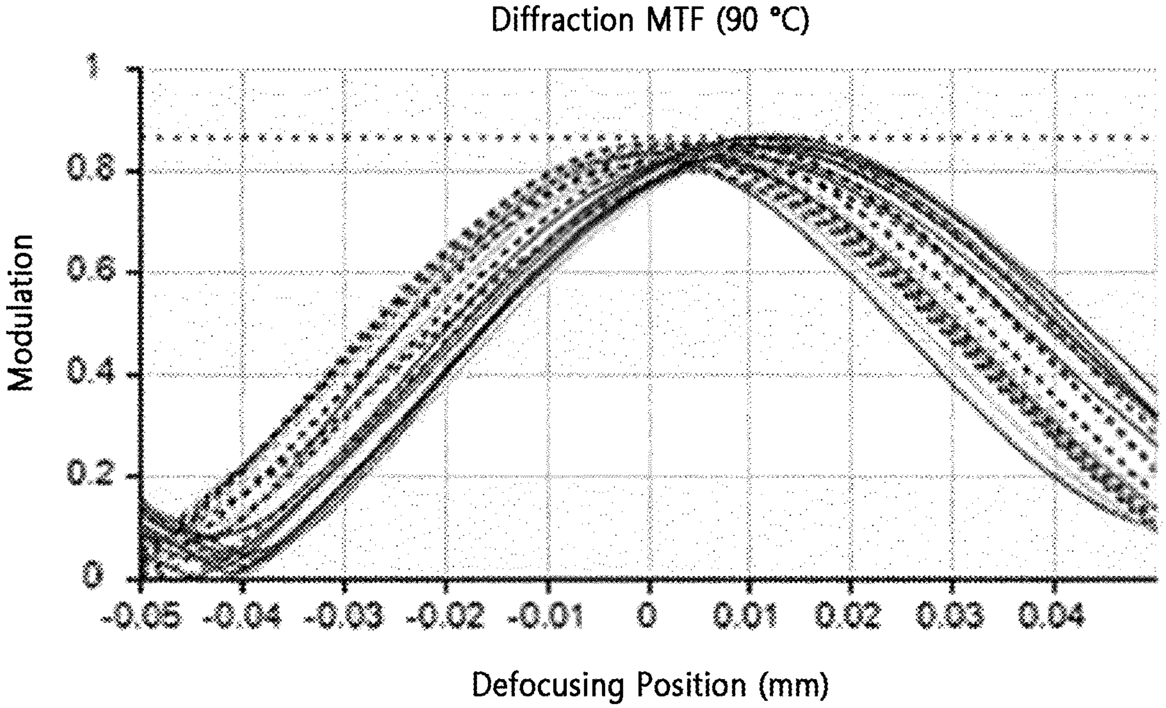

FIGS. 21 and 22 are graphs of diffraction MTF characteristics of the optical system 1000 at the low temperature (−40° C.). FIGS. 24 and 25 are graphs of diffraction MTF characteristics of the optical system 1000 at room temperature (22° C.). FIGS. 27 and 28 are graphs of diffraction MTF characteristics of the optical system 1000 at the high temperature (90° C.).

Figure 23:
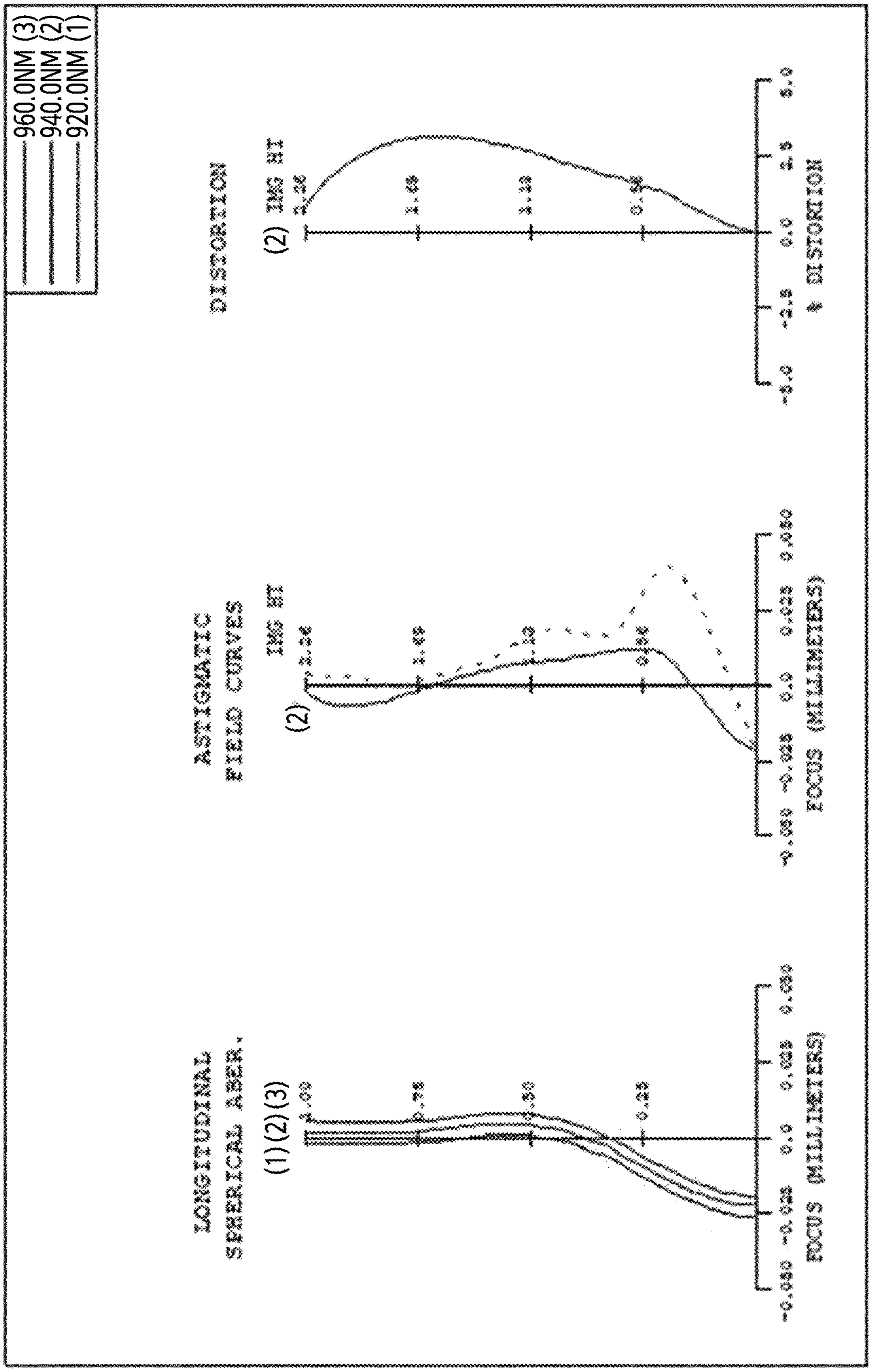
Figure 26:
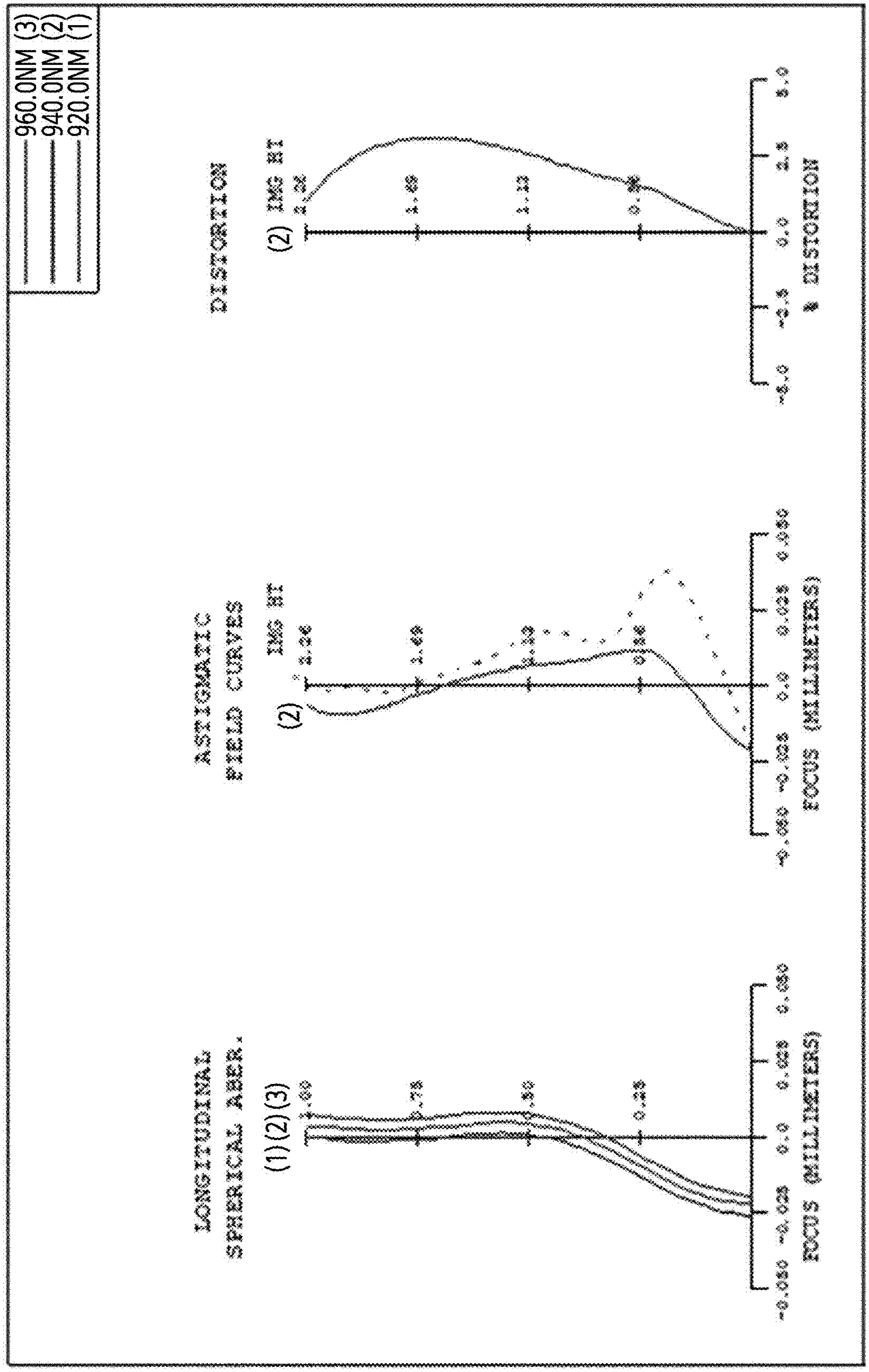
Figure 29:
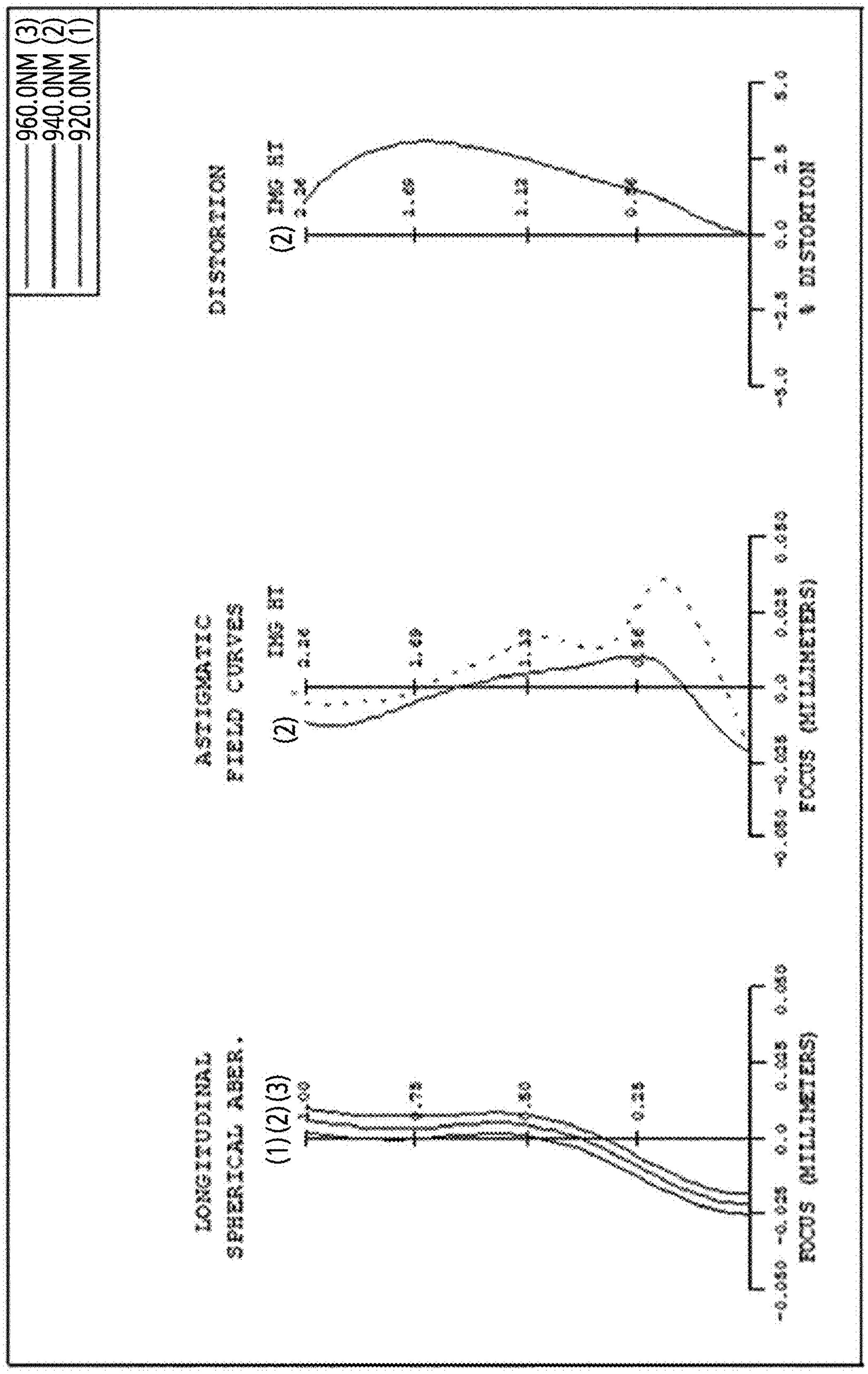

FIGS. 23, 26, and 29 are graphs of aberration diagrams of the optical system 1000 at low temperature (−40° C.), room temperature (22° C.), and high temperature (90° C.). That is, in the graphs of FIGS. 23, 26 and 29, the left graph is a longitudinal spherical aberration graph, the center graph is an astigmatic field curve graph, and the right graph is a distortion graph. In FIGS. 23, 26, and 29, the X-axis means focal length (mm) or distortion (%). Also, the Y axis means the height of the image. In addition, the spherical aberration graph is a graph for light in a wavelength band of about 920 nm, about 940 nm, and about 960 nm. Also, the astigmatic field curve graph and the distortion graph are graphs for light in a 940 nm wavelength band.

In the aberration diagram of FIGS. 23, 26, and 29, it may be interpreted that the aberration correction function is better as each curve approaches the Y axis. Referring to FIGS. 23, 26, and 29, in the optical system 1000 according to the first embodiment, measured values in most regions are adjacent to the Y axis.

Referring to FIGS. 21 to 29, the optical system according to the first embodiment has small changes in MTF characteristics and aberration characteristics even when the temperature changes in the range of low temperature (−40° C.) to high temperature (90° C.). In detail, the MTF properties at low temperature (−40° C.) and high temperature (90° C.) are less than 10% of room temperature (22° C.).

That is, the optical system 1000 according to the first embodiment may maintain excellent optical characteristics in various temperature ranges. In detail, the first lens 110 has a material different from that of the second lens 120 and the third lens 130. For example, the first lens 110 includes a glass material. In addition, the second lens 120 and the third lens 130 include a plastic material. Accordingly, when the temperature increases, the refractive index of the first lens 110 increases. Also, the refractive indices of the second lens 120 and the third lens 130 decrease.

The lenses 110, 120, and 130 according to the first embodiment have set refractive indices, shapes, and thicknesses. Therefore, it is possible to mutually compensate for a change in focal length caused by a change in refractive index due to a change in temperature. Accordingly, the optical system 1000 may inhibit optical characteristics from changing in a temperature range from low temperature (−40° C.) to high temperature (90° C.). In addition, improved optical properties may be maintained.

The optical system 1000 according to the second embodiment will be described in detail with reference to FIGS. 30 to 51.

Referring to FIG. 30, the optical system 1000 according to the second embodiment includes a first lens 110, a second lens 120, a third lens 130, and an image sensor 300 sequentially disposed from the object side to the sensor side. The lenses 110, 120, and 130 are sequentially disposed along the optical axis OA of the optical system 1000.

In addition, in the optical system 1000 according to the second embodiment, an aperture stop 600 is disposed between the sensor-side surface (second surface, S2) of the first lens 110 and the object-side surface (third surface, S3) of the second lens 120.

In detail, the aperture stop 600 is spaced apart from the sensor-side surface (second surface, S2) of the first lens 110 at between the sensor-side surface (second surface, S2) of the first lens 110 and the object-side surface (third surface, S3) of the second lens 120.

For example, the aperture stop 600 may be spaced apart from the sensor-side surface (second surface, S2) of the first lens 110 as shown in Equations 50 and 51.

In addition, a filter 500 is disposed between the plurality of lenses 100 and the image sensor 300. A cover glass 400 is disposed between the filter 500 and the image sensor 300.

FIG. 31 shows data of a radius of curvature of the lenses 110, 120, and 130, a thickness of each lens at the optical axis OA, a distance between each lens at the optical axis OA, a refractive index for light in the t-line (1013.98 nm) wavelength band, Abbe's Number, a clear aperture (CA) and a focal length according to the second embodiment. In detail, FIG. 31 is data at room temperature (about 22° C.).

Referring to FIGS. 30 and 31, the first lens 110 has a glass material. Also, the first lens 110 has positive (+) refractive power on the optical axis OA. The first surface S1 of the first lens 110 is convex on the optical axis OA. Also, the second surface S2 is concave on the optical axis OA. The first lens 110 may have a meniscus shape convex from the optical axis OA toward the object side. The first surface S1 may be a sphere, and the second surface S2 may be a sphere.

FIG. 32 is Sag data according to vertical heights (0.2 mm interval) of the optical axis OA of the object-side surface (first surface, S1) and the sensor-side surface (second surface, S2) of the first lens 110 at room temperature (about 22° C.).

In addition, FIG. 33 is data of lens thickness according to heights (0.2 mm intervals) in the vertical direction of the optical axis OA at room temperature (about 22° C.). In detail, D_1 of FIG. 33 is the center thickness of the first lens 110. That is, D_1 is the thickness (mm) of the first lens 110 at the optical axis OA. Also, D_1_ET of FIG. 33 is the thickness (mm) in the optical axis OA direction at the end of the effective region of the first lens 110. In detail, D_1_ET is the distance (mm) between the end of the effective region on the object-side surface (first surface, S1) of the first lens 110 and the end of the effective region on the sensor-side surface (second surface, S2) of the first lens 110 in the direction of the optical axis OA.

Referring to FIGS. 31 to 33, the thickness in the direction of the optical axis OA of the first lens 110 increases while extending from the optical axis OA toward the end of the clear aperture of the first lens 110.

Accordingly, the first lens 110 may have improved aberration control characteristics by controlling incident light.

The second lens 120 has a plastic material. Also, the second lens 120 has positive (+) refractive power on the optical axis OA. In addition, the third surface S3 of the second lens 120 is concave on the optical axis OA. Also, the fourth surface S4 is convex on the optical axis OA. The second lens 120 may have a meniscus shape convex from the optical axis OA toward the sensor side. The third surface S3 may be aspherical, and the fourth surface S4 may be aspherical.

FIG. 34 is Sag data according to vertical heights (0.2 mm interval) of the optical axis OA of the object-side surface (third surface, S3) and the sensor-side surface (fourth surface, S4) of the second lens 120 at room temperature (about 22° C.).

In addition, FIG. 35 is data of lens thickness according to heights (0.2 mm intervals) in the vertical direction of the optical axis OA at room temperature (about 22° C.). In detail, D_2 of FIG. 35 is the center thickness of the second lens 120. That is, D_2 is the thickness (mm) of the second lens 120 at the optical axis OA. Also, D_2_ET of FIG. 35 is the thickness (mm) in the optical axis OA direction at the end of the effective region of the second lens 120. In detail, D_2_ET is the distance (mm) between the end of the effective region on the object-side surface (third surface, S3) of the second lens 120 and the end of the effective region on the sensor-side surface (fourth surface, S4) of the second lens 120 in the direction of the optical axis OA.

Referring to FIGS. 31, 35 and 36, the thickness of the second lens 120 in the direction of the optical axis OA becomes thinner while extending from the optical axis OA toward the end of the clear aperture of the second lens 120. In detail, the thickness in the direction of the optical axis OA of the second lens 120 in the range from the optical axis OA to the end of the clear aperture of the third surface S3 has a maximum value at the optical axis OA.

Accordingly, the second lens 120 may inhibit a change in optical characteristics due to temperature in a low to high temperature range.

The third lens 130 has a plastic material. Also, the third lens 130 has positive (+) refractive power on the optical axis OA. In addition, the fifth surface S5 of the third lens 130 is convex on the optical axis OA. Also, the sixth surface S6 is concave on the optical axis OA. The third lens 130 may have a meniscus shape convex from the optical axis OA toward the object side. The fifth surface S5 may be aspherical, and the sixth surface S6 may be aspherical.

FIG. 36 is Sag data according to vertical heights (0.2 mm interval) of the optical axis OA of the object-side surface (fifth surface, S5) and the sensor-side surface (sixth surface, S6) of the third lens 130 at room temperature (about 22° C.).

In addition, FIG. 37 is data of lens thickness according to heights (0.2 mm intervals) in the vertical direction of the optical axis OA at room temperature (about 22° C.). In detail, D_3 of FIG. 37 is the center thickness of the third lens 130. That is, D_3 is the thickness (mm) of the third lens 130 at the optical axis OA. Also, D_3_ET of FIG. 37 is the thickness (mm) in the optical axis OA direction at the end of the effective region of the third lens 130. In detail, D_3_ET is the distance (mm) between the end of the effective region on the object-side surface (fifth surface, S5) of the third lens 130 and the end of the effective region on the sensor-side surface (sixth surface, S6) of the third lens 130 in the direction of the optical axis OA.

Referring to FIGS. 31, 36 and 37, the thickness of the third lens 130 in the direction of the optical axis OA becomes thick while extending from the optical axis OA toward the end of the clear aperture of the third lens 130.

Accordingly, the third lens 130 may inhibit a change in optical characteristics due to temperature in a low to high temperature range.

The refractive power of the first lens 110 is different from those of the second lens 120 and the third lens 130. For example, the refractive power of the first lens 110 may be about 2 times greater than the refractive powers of the second lens 120 and the third lens 130. In detail, the refractive power of the first lens 110 may be about 2.5 times greater than the refractive powers of the second lens 120 and the third lens 130. In more detail, the refractive power of the first lens 110 may be about 3 times or more than the refractive powers of the second lens 120 and the third lens 130.

Also, the refractive power of the second lens 120 is different from that of the third lens 130. For example, the refractive power of the second lens 120 may be about 1.2 times or more than the refractive power of the third lens 130. In detail, the refractive power of the second lens 120 may be about 1.5 times or more than the refractive power of the third lens 130. In more detail, the refractive power of the second lens 120 may be about 1.7 times or more than the refractive power of the third lens 130.

In addition, the Abbe's number of the first lens 110 is different from that of the second lens 120 and the third lens 130. For example, the difference between the Abbe's number of the first lens 110 and the Abbe's numbers of the second and third lenses 120 and 130 may be 10 or less. In detail, the Abbe's number of the first lens 110 may be greater than the Abbe's numbers of the second lens 120 and the third lens 130 within the above range.

In the optical system 1000 according to the second embodiment, values of aspheric coefficients of each lens surface are shown in FIG. 38.

Also, in the optical system 1000 according to the first embodiment, the distance (first interval) between the first lens 110 and the second lens 120 is as shown in FIG. 39 at room temperature (about 22° C.). In addition, the distance (second interval) between the second lens 120 and the third lens 130 is as shown in FIG. 40 at room temperature (about 22° C.).

Referring to FIG. 39, the first interval decreases from the optical axis OA toward the first point L1, which is the end of the clear aperture of the second surface S2. The first point L1 is an approximate value of the effective radius of the second surface S2 facing each other and having a smaller clear aperture. That is, the first point L1 is an approximate value of ½ of the clear aperture of the second surface S2 described in FIG. 31.

The first interval has a maximum value at the optical axis OA. Also, the first interval has a minimum value at the first point L1. The maximum value of the first interval may be about 1.1 times to about 3 times the minimum value. For example, the maximum value of the first interval may be about 1.2 times the minimum value.

Referring to FIG. 40, the second interval increases from the optical axis OA toward the second point L2, which is the end of the clear aperture of the fourth surface S4. The second point L2 is an approximate value of the effective radius of the fifth surface S4 having a smaller clear aperture. That is, the second point L2 is an approximate value of ½ of the clear aperture of the fourth surface S4 described in FIG. 31.

The second interval has a maximum value at the second point L2. Also, the second interval has a minimum value at the optical axis OA. The maximum value of the second interval may be about 2 times to about 4 times the minimum value. For example, the maximum value of the second interval may be about 2.6 times the minimum value.

Accordingly, the optical system 1000 has improved optical characteristics. In detail, the interval between the first lens 110 and the second lens 120 and the interval between the second lens 120 and the third lens 130 are spaced at intervals (first interval, second interval) set according to positions. Accordingly, the optical system 1000 may inhibit optical characteristics from changing in a temperature range from low to high. Therefore, the optical system and the camera module according to the second embodiment may maintain improved optical characteristics in various temperature ranges.

Figure 41:
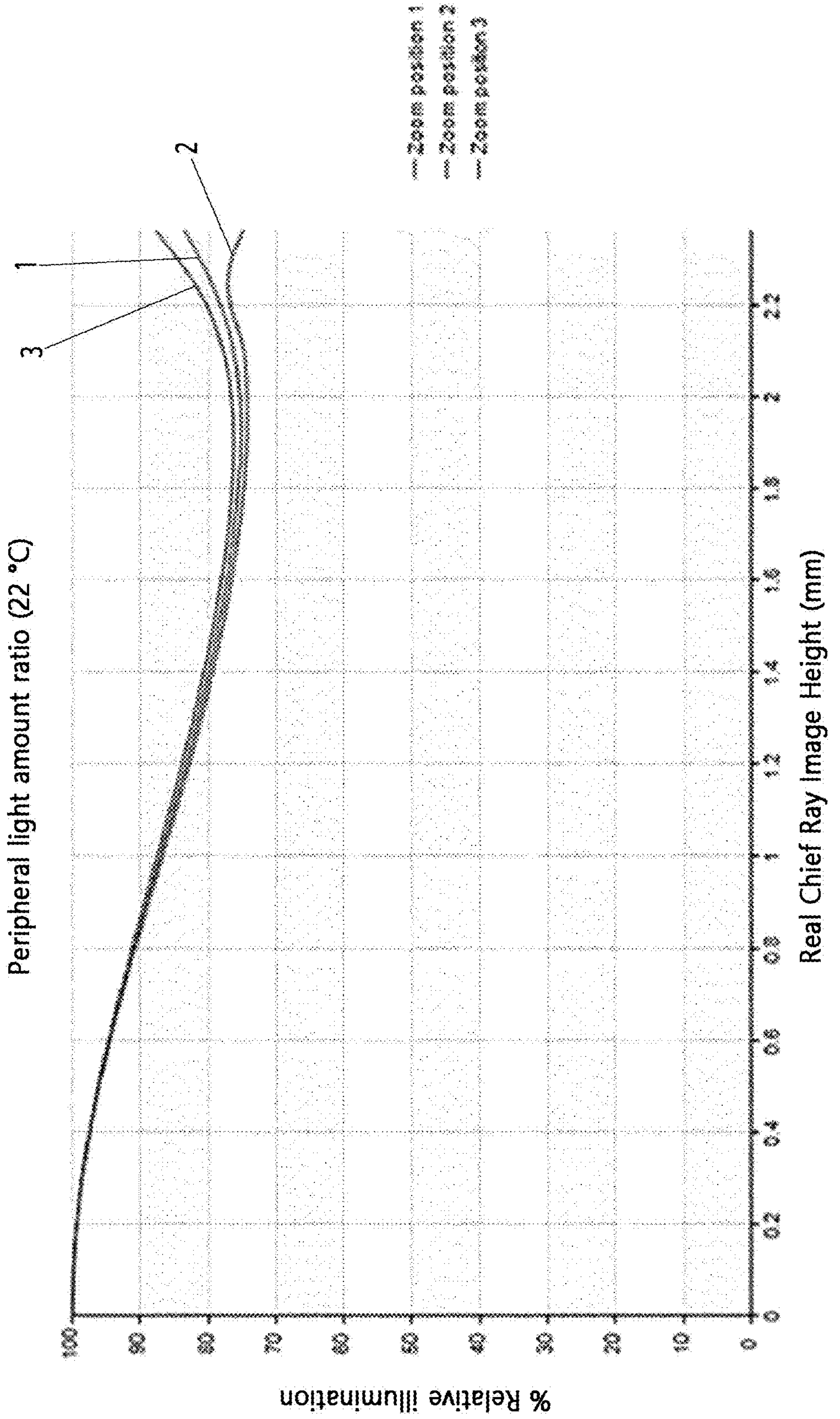
FIG. 41 is a graph of relative illumination for each field of the optical system according to the second embodiment.
Figure 42:
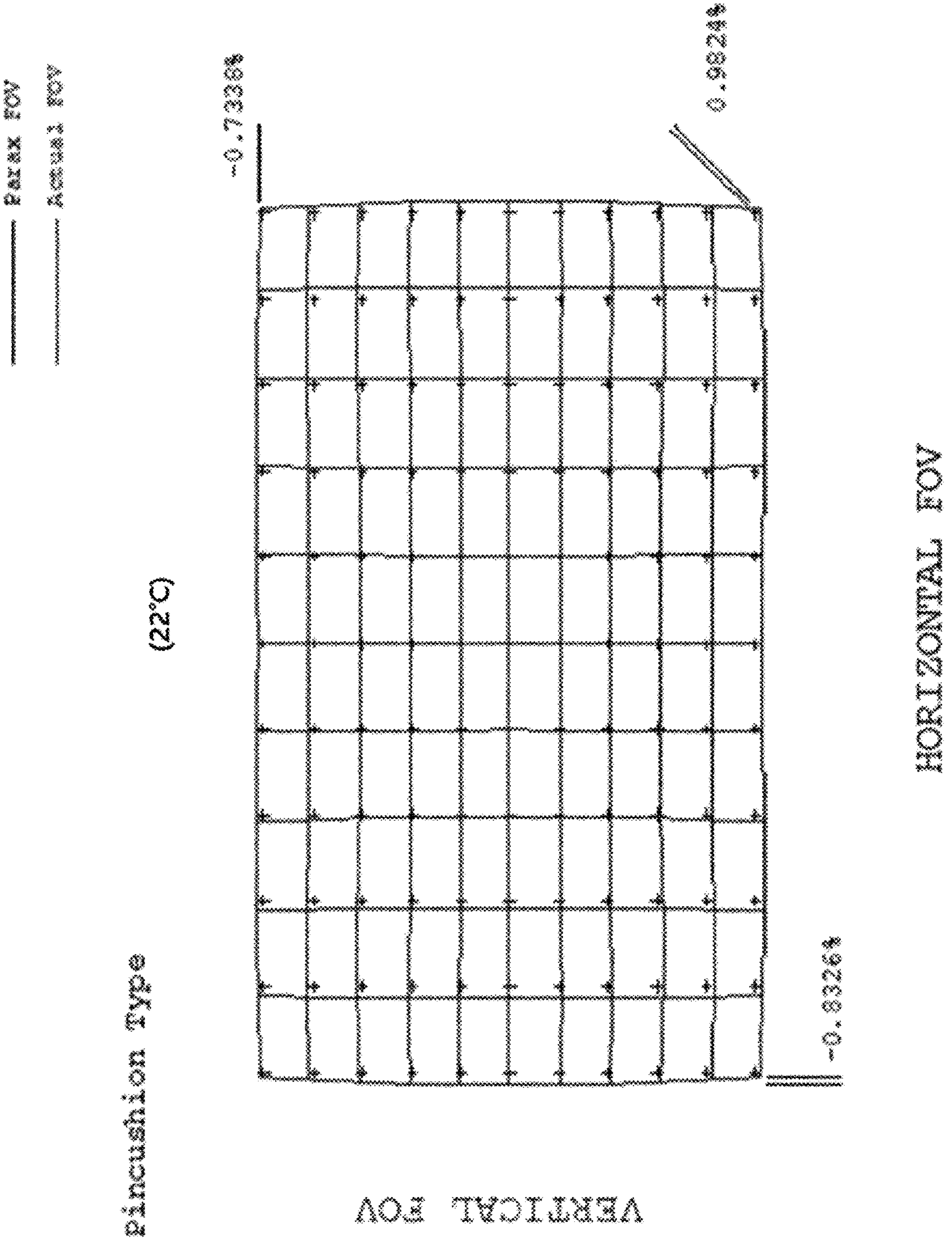
FIG. 42 is data on distortion characteristics of the optical system according to the second embodiment.

FIG. 41 is a graph of relative illumination for each field of the optical system according to the second embodiment. FIG. 42 is data on distortion characteristics of the optical system according to the second embodiment. FIGS. 41 and 42 are data at room temperature (about 22° C.).

Referring to FIG. 41, the optical system 1000 according to the second embodiment has excellent light ratio characteristics in the 0-field region (center region) to 1.0-field region (edge region) of the image sensor 300. For example, the optical system 1000 may have a peripheral light amount ratio of about 70% or more. In detail, in the optical system 1000, when the light amount ratio of the 0-field region is 100%, the light amount ratio of the 0.5 field region may be about 80% or more, and the light amount ratio of the 1.0-field region may be about 70% or more.

Also, referring to FIG. 42, the optical system 1000 according to the first embodiment may have a barrel distortion shape in which an edge portion of an image is bent outward. Also, it may have a distortion of about 0.9824% and a TV-distortion of about −0.7338%.

FIGS. 43 to 51 are graphs of diffraction MTF characteristics and aberration diagrams according to temperature of the optical system 1000.

Figure 43:
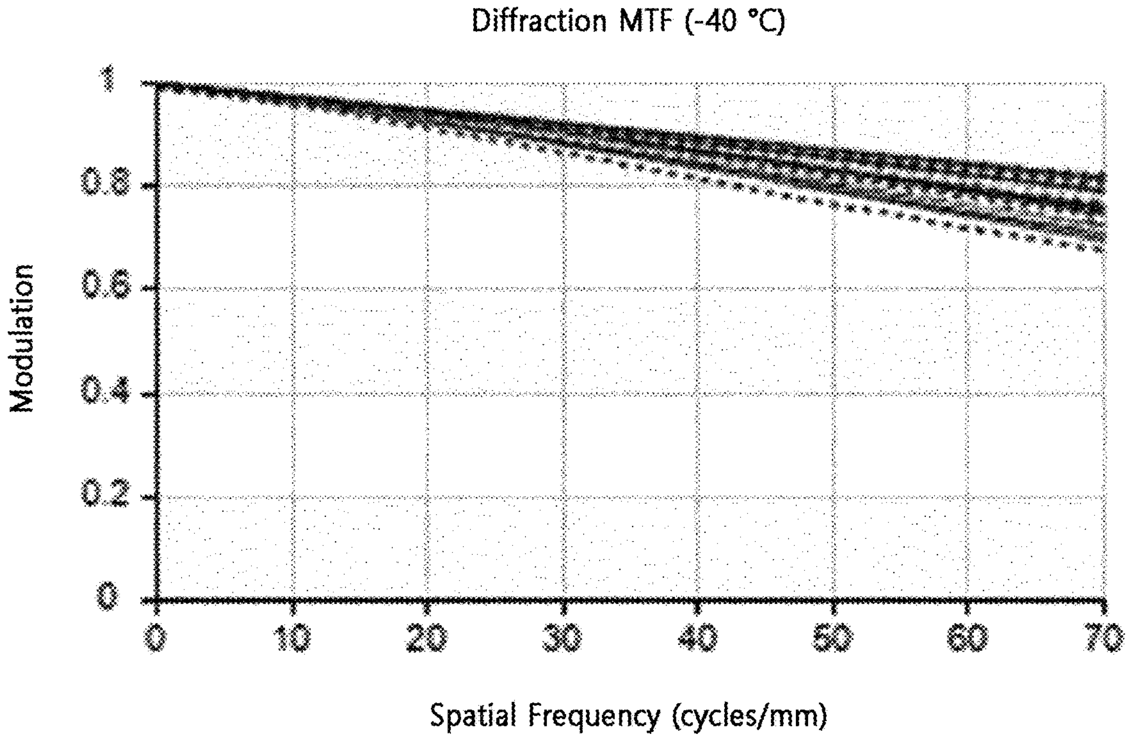
FIGS. 43 to 51 are graphs of diffraction MTF and aberration for each temperature of the optical system according to the second embodiment.
Figure 44:
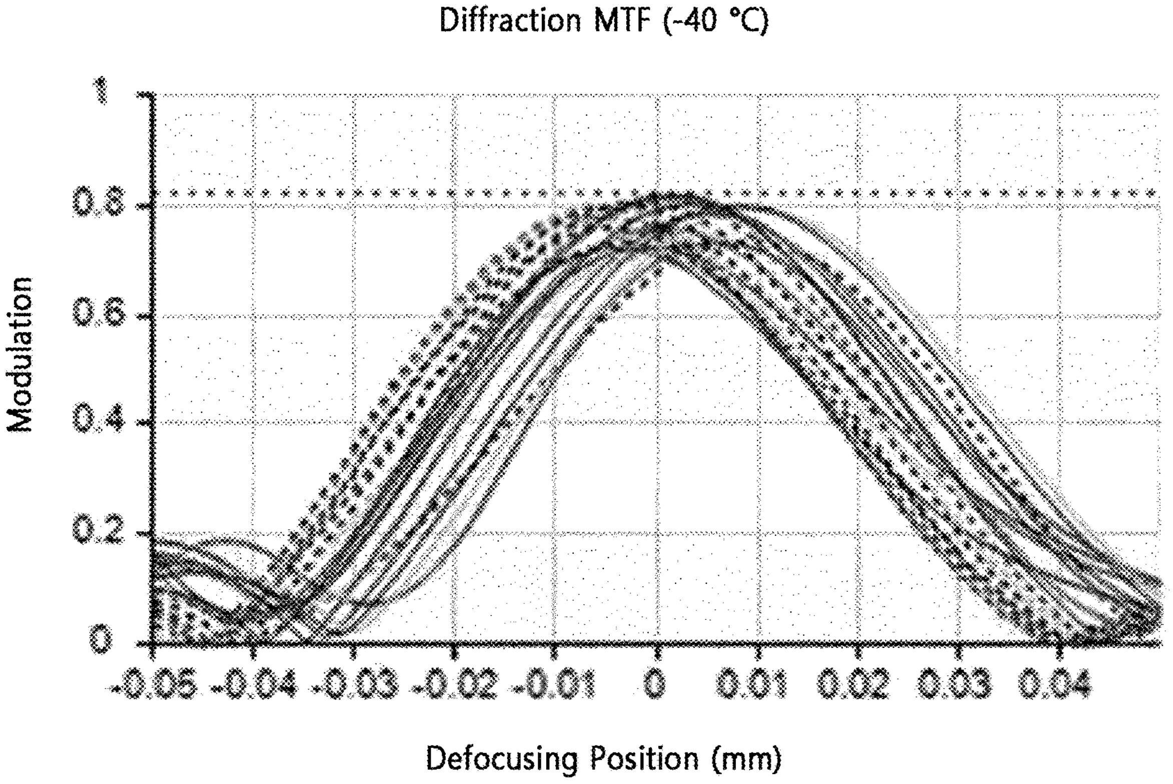
Figure 46:
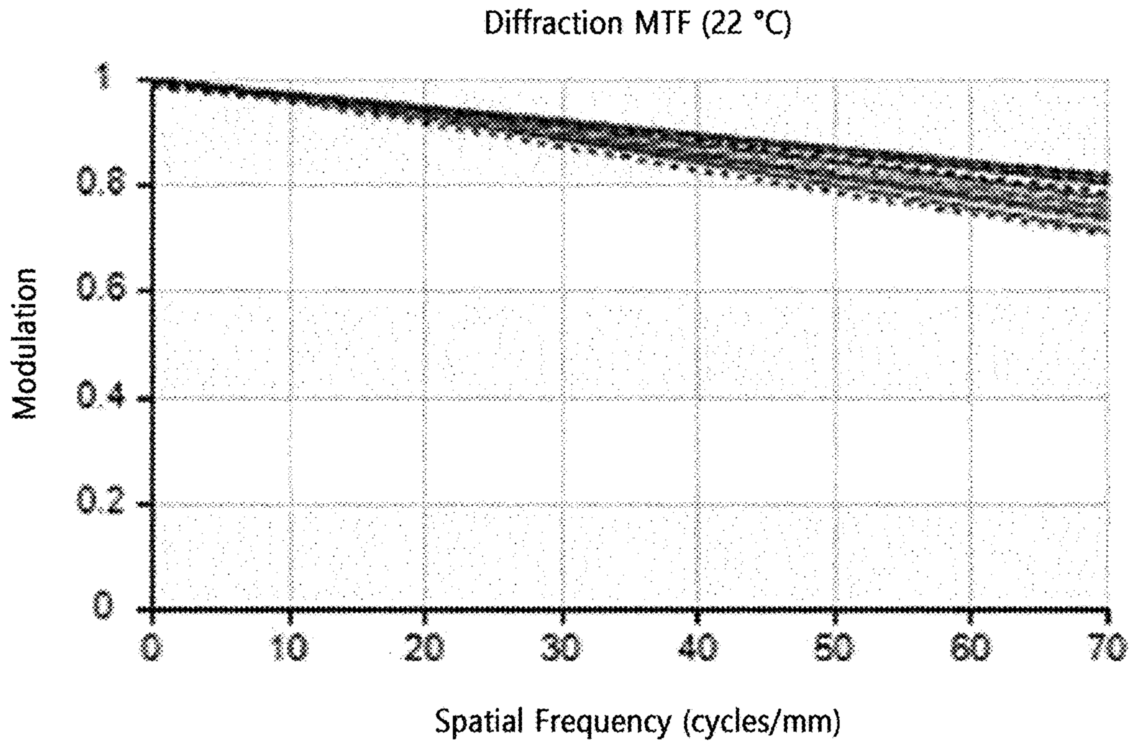
Figure 47:
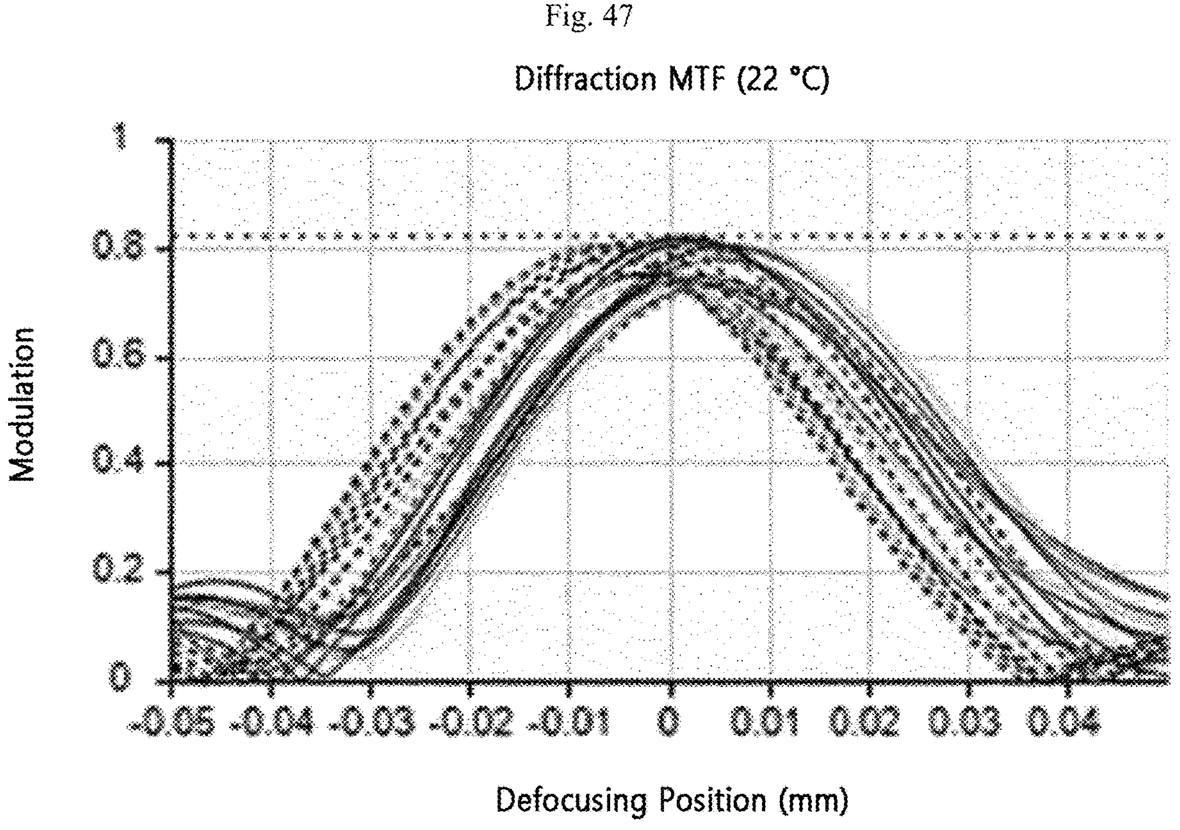
Figure 49:
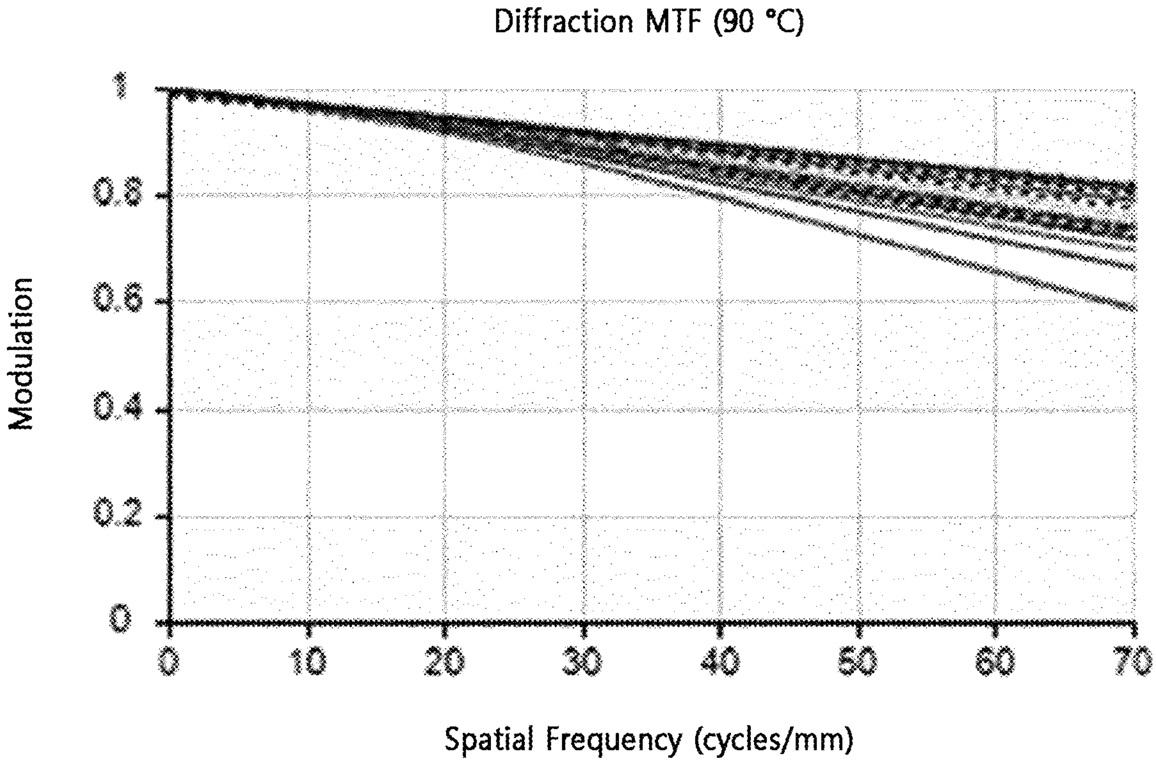
Figure 50:
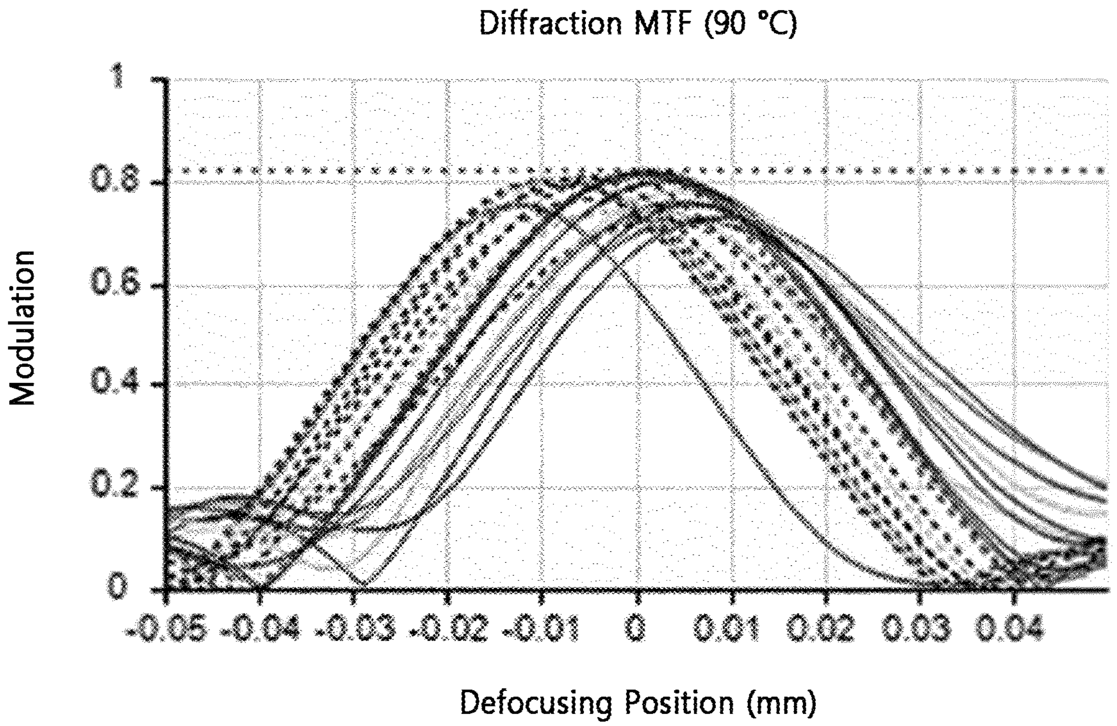

In detail, FIGS. 43 and 44 are graphs of diffraction MTF characteristics of the optical system 1000 at the low temperature (−40° C.). FIGS. 46 and 47 are graphs of diffraction MTF characteristics of the optical system 1000 at room temperature (22° C.). FIGS. 49 and 50 are graphs of diffraction MTF characteristics of the optical system 1000 at the high temperature (90° C.).

Figure 45:
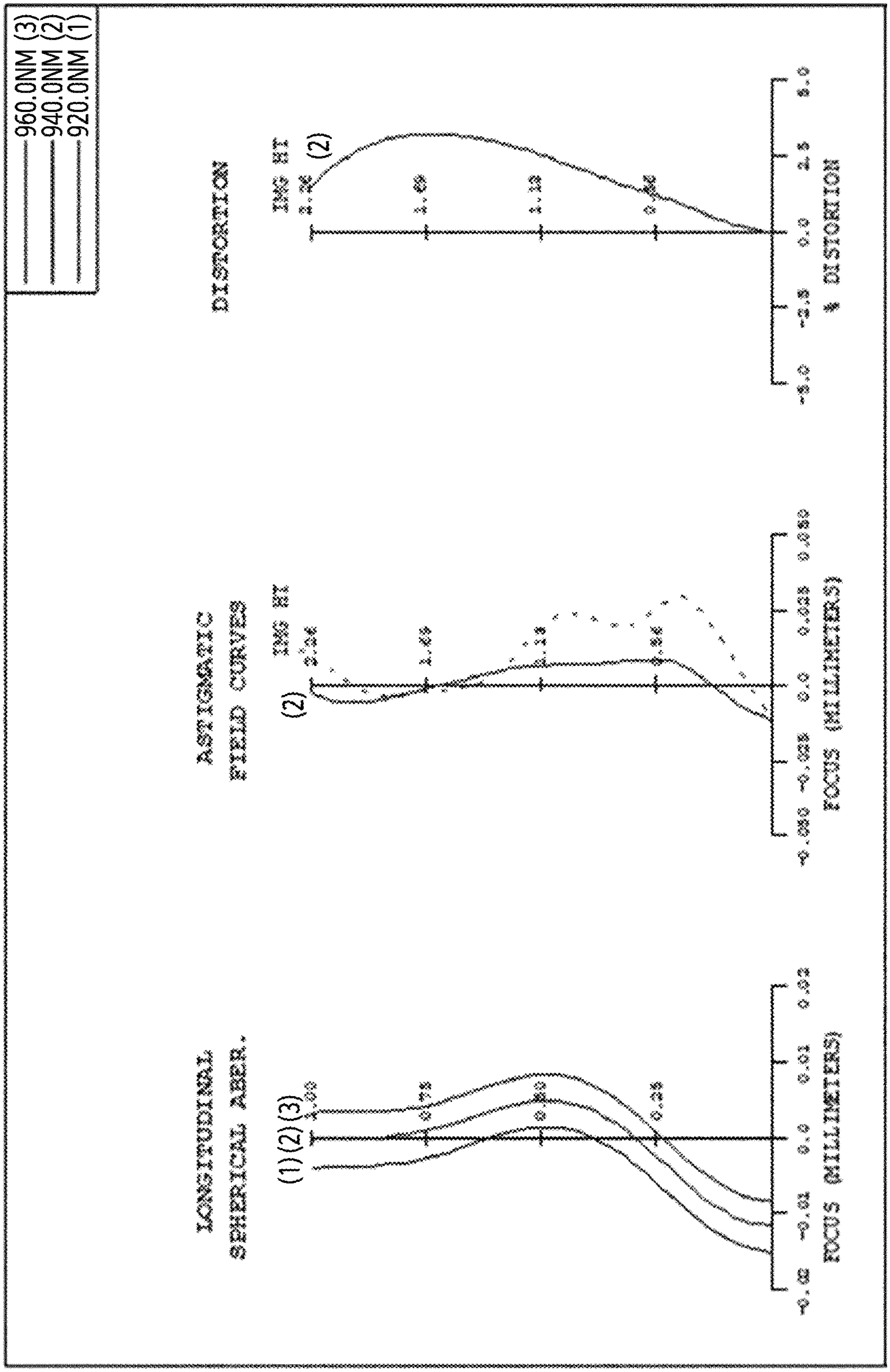
Figure 48:
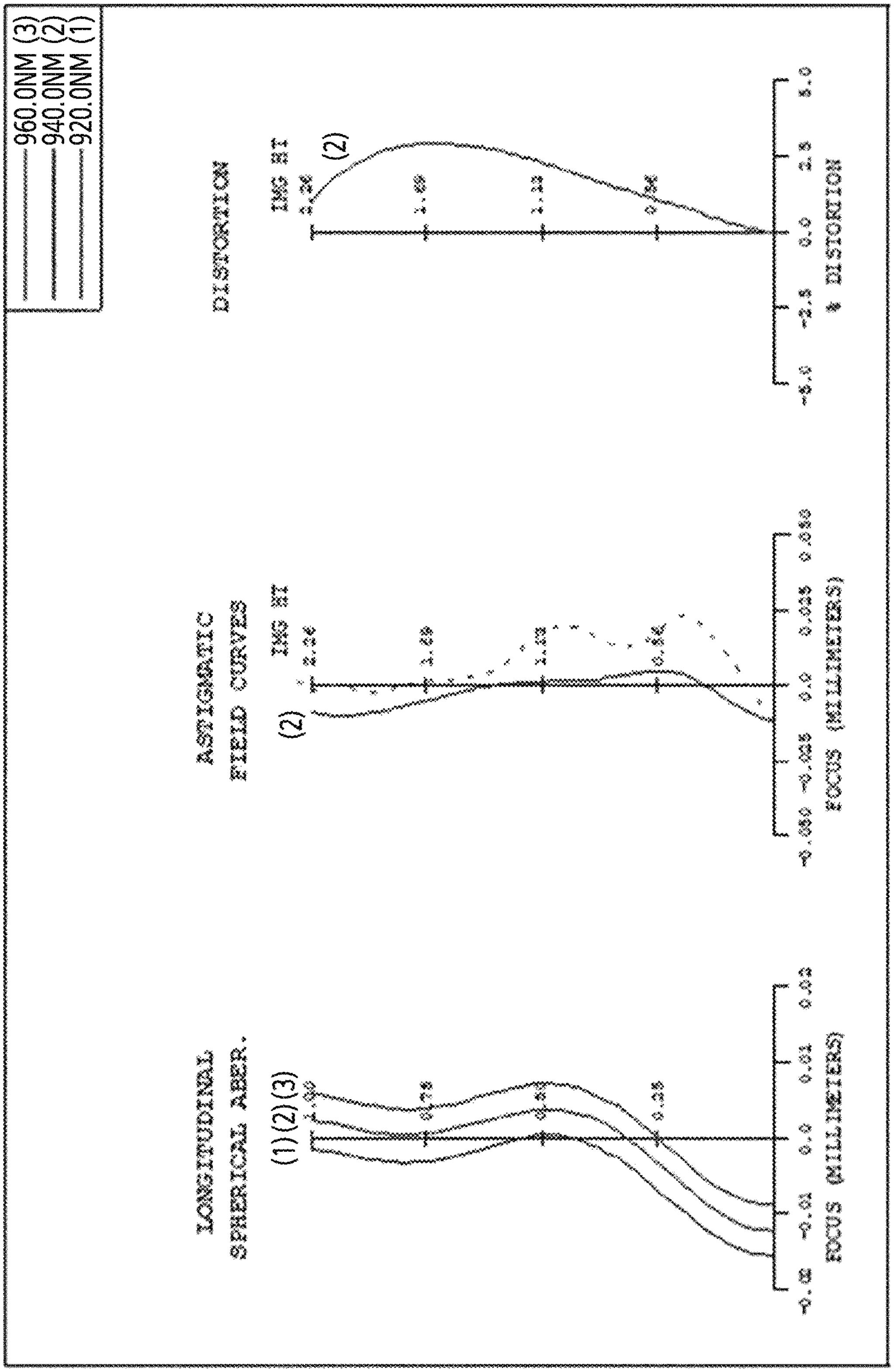
Figure 51:
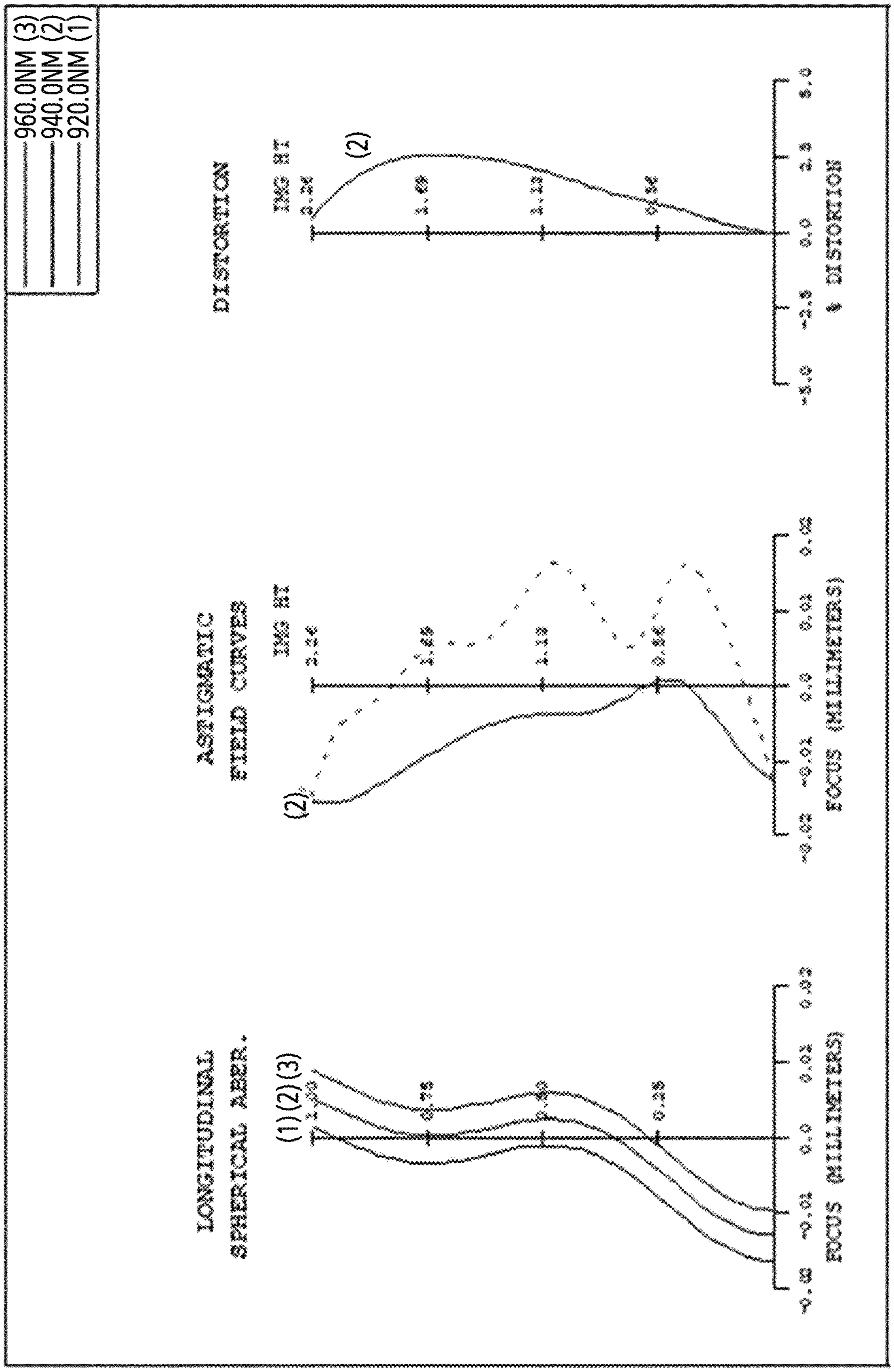

FIGS. 45, 48, and 51 are graphs of aberration diagrams of the optical system 1000 at low temperature (−40° C.), room temperature (22° C.), and high temperature (90° C.). That is, in the graphs of FIGS. 45, 48 and 51, the left graph is a longitudinal spherical aberration graph, the center graph is an astigmatic field curve graph, and the right graph is a distortion graph. In FIGS. 45, 48, and 51, the X-axis means focal length (mm) or distortion (%). Also, the Y axis means the height of the image. In addition, the spherical aberration graph is a graph for light in a wavelength band of about 920 nm, about 940 nm, and about 960 nm. Also, the astigmatic field curve graph and the distortion graph are graphs for light in a 940 nm wavelength band.

In the aberration diagram of FIGS. 45, 48, and 51, it may be interpreted that the aberration correction function is better as each curve approaches the Y axis. Referring to FIGS. 45, 48, and 51, in the optical system 1000 according to the second embodiment, measured values in most regions are adjacent to the Y axis.

Referring to FIGS. 43 to 51, the optical system according to the second embodiment has small changes in MTF characteristics and aberration characteristics even when the temperature changes in the range of low temperature (−40° C.) to high temperature (90° C.). In detail, the MTF properties at low temperature (−40° C.) and high temperature (90° C.) are less than 10% of room temperature (22° C.).

The optical system 1000 according to the second embodiment may maintain excellent optical characteristics in various temperature ranges. In detail, the first lens 110 has a material different from that of the second lens 120 and the third lens 130. For example, the first lens 110 includes a glass material. In addition, the second lens 120 and the third lens 130 include a plastic material. Accordingly, when the temperature increases, the refractive index of the first lens 110 increases. Also, the refractive indices of the second lens 120 and the third lens 130 decrease.

The lenses 110, 120, and 130 according to the second embodiment have set refractive indices, shapes, and thicknesses. Therefore, it is possible to mutually compensate for a change in focal length caused by a change in refractive index due to a change in temperature. Accordingly, the optical system 1000 may inhibit optical characteristics from changing in a temperature range from low temperature (−40° C.) to high temperature (90° C.). In addition, improved optical properties may be maintained.

The optical system 1000 according to the third embodiment will be described in detail with reference to FIGS. 52 to 73.

Referring to FIG. 52, the optical system 1000 according to the first embodiment includes a first lens 110, a second lens 120, a third lens 130, and an image sensor 300 sequentially disposed from the object side to the sensor side. The lenses 110, 120, and 130 are sequentially disposed along the optical axis OA of the optical system 1000.

In addition, an aperture stop 600 is disposed between the sensor-side surface (second surface, S2) of the first lens 110 and the object-side surface (third surface, S3) of the second lens 120.

In detail, the aperture stop 600 is spaced apart from the sensor-side surface (second surface, S2) of the first lens 110 at between the sensor-side surface (second surface, S2) of the first lens 110 and the object-side surface (third surface, S3) of the second lens 120.

For example, the aperture stop 600 may be spaced apart from the sensor-side surface (second surface, S2) of the first lens 110 as shown in Equations 50 and 51.

In addition, a filter 500 is disposed between the plurality of lenses 100 and the image sensor 300. A cover glass 400 is disposed between the filter 500 and the image sensor 300.

FIG. 53 shows data of a radius of curvature of the lenses 110, 120, and 130, a thickness of each lens at the optical axis OA, a distance between each lens at the optical axis OA, a refractive index for light in the t-line (1013.98 nm) wavelength band, Abbe's Number, a clear aperture (CA) and a focal length according to the third embodiment. In detail, FIG. 53 is data at room temperature (about 22° C.).

Referring to FIGS. 52 and 53, the first lens 110 has a glass material. Also, the first lens 110 has positive (+) refractive power on the optical axis OA. In addition, the first surface S1 of the first lens 110 is convex on the optical axis OA. Also, the second surface S2 is concave on the optical axis OA. The first lens 110 may have a meniscus shape convex from the optical axis OA toward the object side. The first surface S1 may be a sphere, and the second surface S2 may be a sphere.

FIG. 54 is Sag data according to vertical heights (0.2 mm interval) of the optical axis OA of the object-side surface (first surface, S1) and the sensor-side surface (second surface, S2) of the first lens 110 at room temperature (about 22° C.).

In addition, FIG. 55 is data of lens thickness according to heights (0.2 mm intervals) in the vertical direction of the optical axis OA at room temperature (about 22° C.). In detail, D_1 of FIG. 55 is the center thickness of the first lens 110. That is, D_1 is the thickness (mm) of the first lens 110 at the optical axis OA. Also, D_1_ET of FIG. 55 is the thickness (mm) in the optical axis OA direction at the end of the effective region of the first lens 110. In detail, D_1_ET is the distance (mm) between the end of the effective region on the object-side surface (first surface, S1) of the first lens 110 and the end of the effective region on the sensor-side surface (second surface, S2) of the first lens 110 in the direction of the optical axis OA.

Referring to FIGS. 53 to 55, the thickness in the direction of the optical axis OA of the first lens 110 increases while extending from the optical axis OA toward the end of the clear aperture of the first lens 110.

Accordingly, the first lens 110 may have improved aberration control characteristics by controlling incident light.

The second lens 120 has a plastic material. Also, the second lens 120 has positive (+) refractive power on the optical axis OA. In addition, the third surface S3 of the second lens 120 is concave on the optical axis OA. Also, the fourth surface S4 is convex on the optical axis OA. The second lens 120 may have a meniscus shape convex from the optical axis OA toward the sensor side. The third surface S3 may be aspherical, and the fourth surface S4 may be aspherical.

FIG. 56 is Sag data according to vertical heights (0.2 mm interval) of the optical axis OA of the object-side surface (third surface, S3) and the sensor-side surface (fourth surface, S4) of the second lens 120 at room temperature (about 22° C.).

In addition, FIG. 57 is data of lens thickness according to heights (0.2 mm intervals) in the vertical direction of the optical axis OA at room temperature (about 22° C.). In detail, D_2 of FIG. 57 is the center thickness of the second lens 120. That is, D_2 is the thickness (mm) of the second lens 120 at the optical axis OA. Also, D_2_ET of FIG. 57 is the thickness (mm) in the optical axis OA direction at the end of the effective region of the second lens 120. In detail, D_2_ET is the distance (mm) between the end of the effective region on the object-side surface (third surface, S3) of the second lens 120 and the end of the effective region on the sensor-side surface (fourth surface, S4) of the second lens 120 in the direction of the optical axis OA.

Referring to FIGS. 52, 56 and 57, the thickness of the second lens 120 in the direction of the optical axis OA becomes thinner while extending from the optical axis OA toward the end of the clear aperture of the second lens 120. In detail, the thickness in the direction of the optical axis OA of the second lens 120 in the range from the optical axis OA to the end of the clear aperture of the third surface S3 has a maximum value at the optical axis OA.

Accordingly, the second lens 120 may inhibit a change in optical characteristics due to temperature in a low to high temperature range.

The third lens 130 has a plastic material. Also, the third lens 130 has positive (+) refractive power on the optical axis OA. In addition, the fifth surface S5 of the third lens 130 is convex on the optical axis OA. Also, the sixth surface S6 is concave on the optical axis OA. The third lens 130 may have a meniscus shape convex from the optical axis OA toward the object side. The fifth surface S5 may be aspherical, and the sixth surface S6 may be aspherical.

FIG. 58 is Sag data according to vertical heights (0.2 mm interval) of the optical axis OA of the object-side surface (fifth surface, S5) and the sensor-side surface (sixth surface, S6) of the third lens 130 at room temperature (about 22° C.).

In addition, FIG. 59 is data of lens thickness according to heights (0.2 mm intervals) in the vertical direction of the optical axis OA at room temperature (about 22° C.). In detail, D_3 of FIG. 59 is the center thickness of the third lens 130. That is, D_3 is the thickness (mm) of the third lens 130 at the optical axis OA. Also, D_3_ET of FIG. 59 is the thickness (mm) in the optical axis OA direction at the end of the effective region of the third lens 130. In detail, D_3_ET is the distance (mm) between the end of the effective region on the object-side surface (fifth surface, S5) of the third lens 130 and the end of the effective region on the sensor-side surface (sixth surface, S6) of the third lens 130 in the direction of the optical axis OA.

Referring to FIGS. 52, 58 and 59, the thickness of the third lens 130 in the direction of the optical axis OA becomes thick while extending from the optical axis OA toward the end of the clear aperture of the third lens 130. In detail, the thickness in the direction of the optical axis OA of the third lens 130 has a minimum value at the optical axis OA.

Accordingly, the third lens 130 may inhibit a change in optical characteristics due to temperature in a low to high temperature range.

The refractive power of the first lens 110 is different from those of the second lens 120 and the third lens 130. For example, the refractive power of the first lens 110 may be about 1.3 times greater than the refractive powers of the second lens 120 and the third lens 130. In detail, the refractive power of the first lens 110 may be about 1.6 times greater than the refractive powers of the second lens 120 and the third lens 130. In more detail, the refractive power of the first lens 110 may be about 1.9 times or more than the refractive powers of the second lens 120 and the third lens 130.

Also, the refractive power of the second lens 120 is different from that of the third lens 130. For example, the refractive power of the second lens 120 may be about 1.5 times or more than the refractive power of the third lens 130. In detail, the refractive power of the second lens 120 may be about 2.5 times or more than the refractive power of the third lens 130. In more detail, the refractive power of the second lens 120 may be about 3.5 times or more than the refractive power of the third lens 130.

In addition, the Abbe's number of the first lens 110 is different from that of the second lens 120 and the third lens 130. For example, the difference between the Abbe's number of the first lens 110 and the Abbe's numbers of the second and third lenses 120 and 130 may be 10 or less. In detail, the Abbe's number of the first lens 110 may be greater than the Abbe's numbers of the second lens 120 and the third lens 130 within the above range.

In the optical system 1000 according to the third embodiment, values of aspheric coefficients of each lens surface are shown in FIG. 60.

Also, in the optical system 1000 according to the third embodiment, the distance (first interval) between the first lens 110 and the second lens 120 is as shown in FIG. 61 at room temperature (about 22° C.). In addition, the distance (second interval) between the second lens 120 and the third lens 130 is as shown in FIG. 62 at room temperature (about 22° C.).

Referring to FIG. 61, the first interval decreases from the optical axis OA toward the first point L1, which is the end of the clear aperture of the second surface S2. The first point L1 is an approximate value of the effective radius of the second surface S2 facing each other and having a smaller clear aperture. That is, the first point L1 is an approximate value of ½ of the clear aperture of the second surface S2 described in FIG. 53.

The first interval has a maximum value at the optical axis OA. Also, the first interval has a minimum value at the first point L1. The maximum value of the first interval may be about 1.1 times to about 3 times the minimum value. For example, the maximum value of the first interval may be about 1.2 times the minimum value.

Referring to FIG. 62, the second interval increases from the optical axis OA toward the second point L2, which is the end of the clear aperture of the fourth surface S4. The second point L2 is an approximate value of the effective radius of the fifth surface S4 having a smaller clear aperture. That is, the second point L2 is an approximate value of ½ of the clear aperture of the fourth surface S4 described in FIG. 53.

The second interval has a maximum value at the second point L2. Also, the second interval has a minimum value at the optical axis OA. The maximum value of the second interval may be about 2 times to about 4 times the minimum value. For example, the maximum value of the second interval may be about 2.6 times the minimum value.

Accordingly, the optical system 1000 has improved optical characteristics. In detail, the interval between the first lens 110 and the second lens 120 and the interval between the second lens 120 and the third lens 130 are spaced at intervals (first interval, second interval) set according to positions. Accordingly, the optical system 1000 may inhibit optical characteristics from changing in a temperature range from low to high. Therefore, the optical system and the camera module according to the third embodiment may maintain improved optical characteristics in various temperature ranges.

Figure 63:
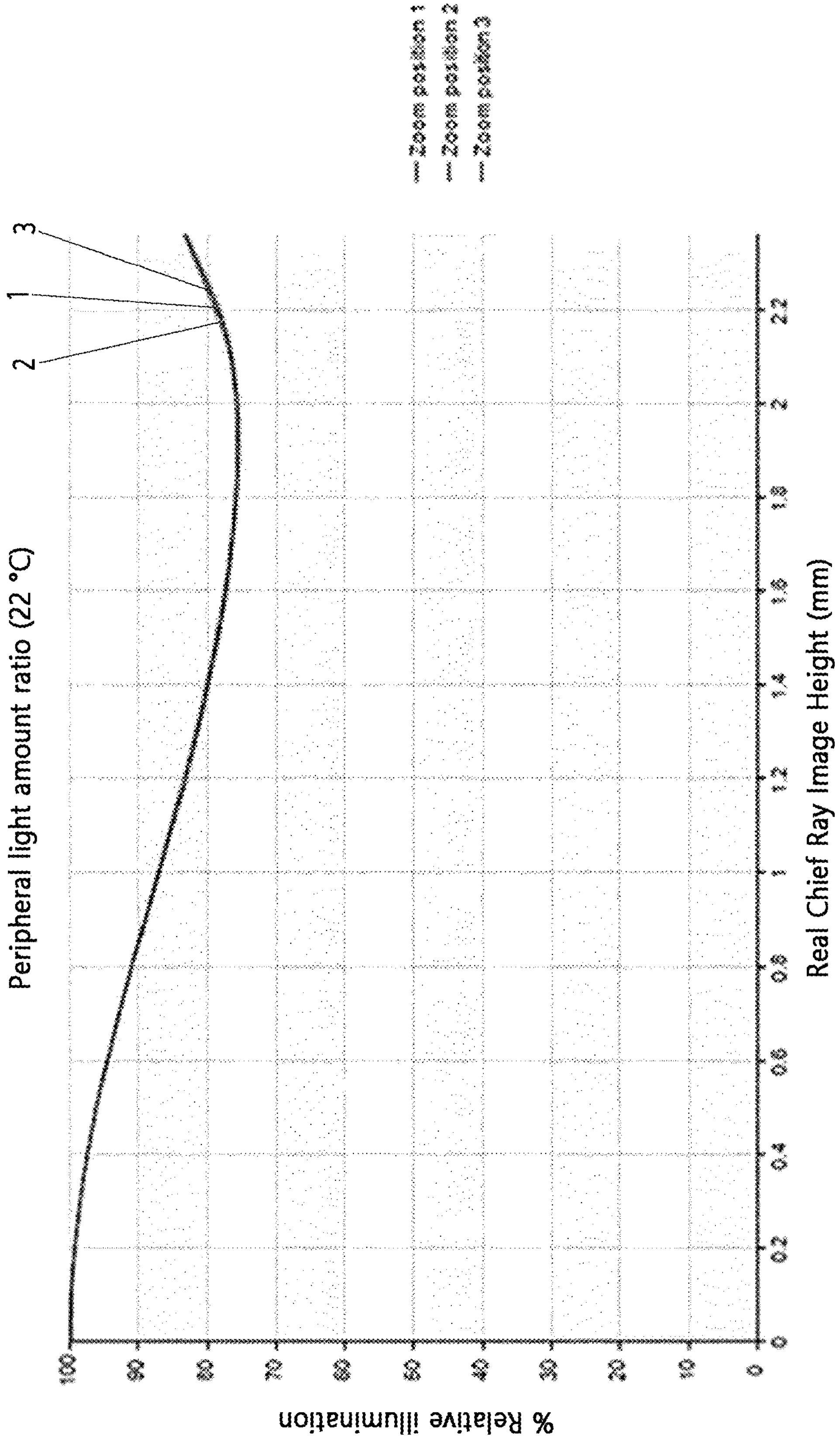
FIG. 63 is a graph of relative illumination for each field of the optical system according to the third embodiment.
Figure 64:
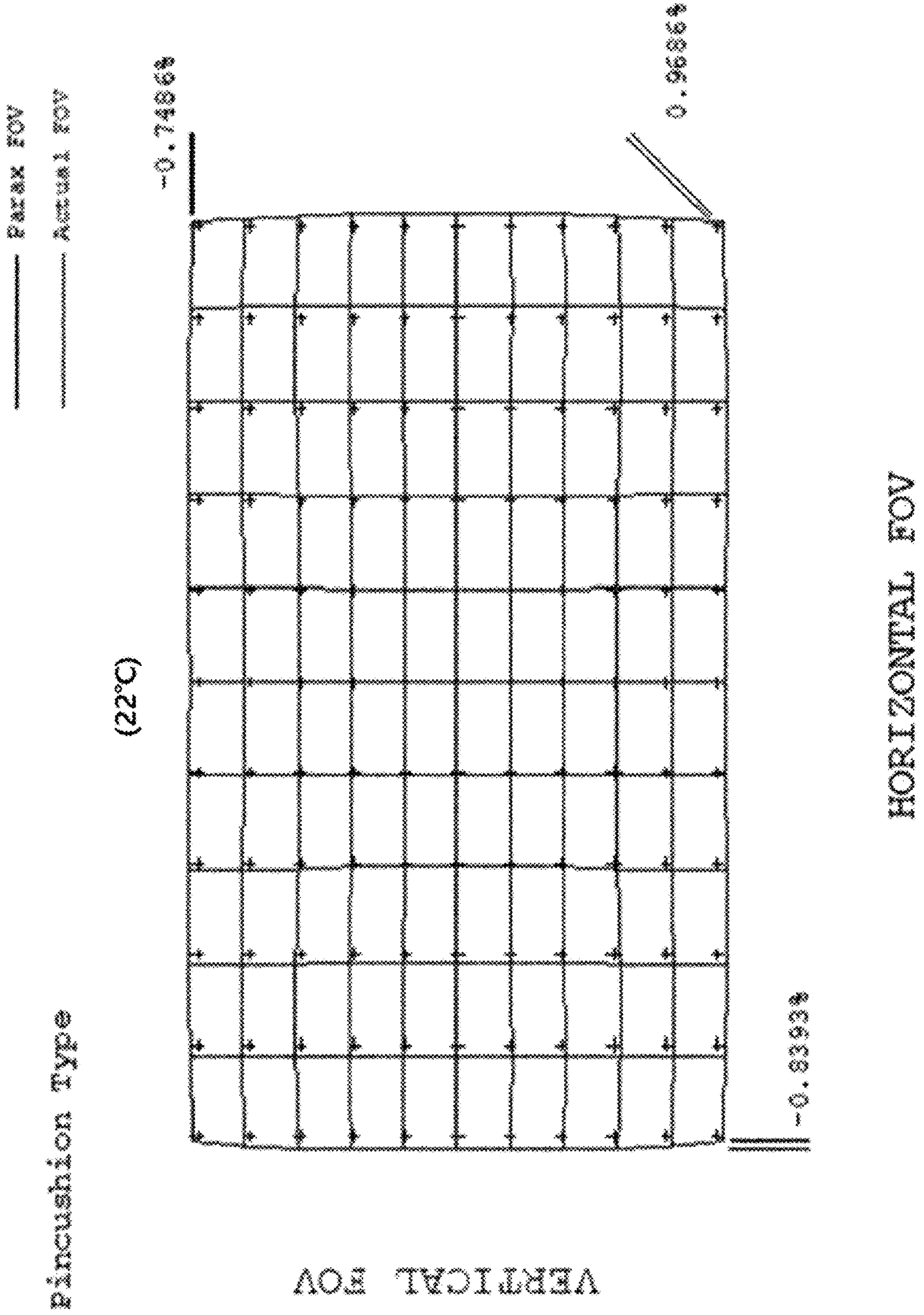
FIG. 64 is data on distortion characteristics of the optical system according to the third embodiment.

FIG. 63 is a graph of relative illumination for each field of the optical system according to the third embodiment. FIG. 64 is data on distortion characteristics of the optical system according to the third embodiment. FIGS. 63 and 64 are data at room temperature (about 22° C.).

Referring to FIG. 63, the optical system 1000 according to the third embodiment has excellent light ratio characteristics in the 0-field region (center region) to 1.0-field region (edge region) of the image sensor 300. For example, the optical system 1000 may have a peripheral light amount ratio of about 70% or more. In detail, in the optical system 1000, when the light amount ratio of the 0-field region is 100%, the light amount ratio of the 0.5 field region may be about 80% or more, and the light amount ratio of the 1.0-field region may be about 70% or more.

Also, referring to FIG. 64, the optical system 1000 according to the third embodiment may have a barrel distortion shape in which an edge portion of an image is bent outward. Also, it may have a distortion of about 0.9686% and a TV-distortion of about −0.7486%.

FIGS. 65 to 73 are graphs of diffraction MTF characteristics and aberration diagrams according to temperature of the optical system 1000.

Figure 65:
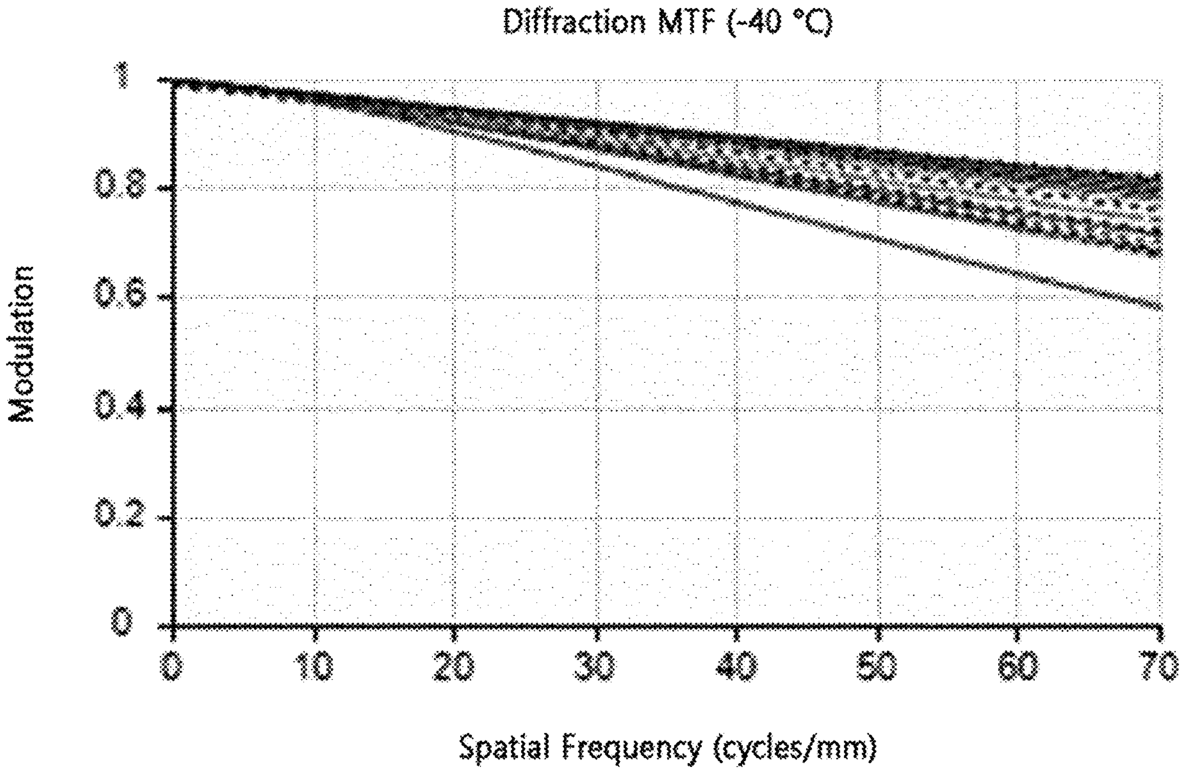
FIGS. 65 to 73 are graphs of diffraction MTF and aberration for each temperature of the optical system according to the third embodiment.
Figure 66:
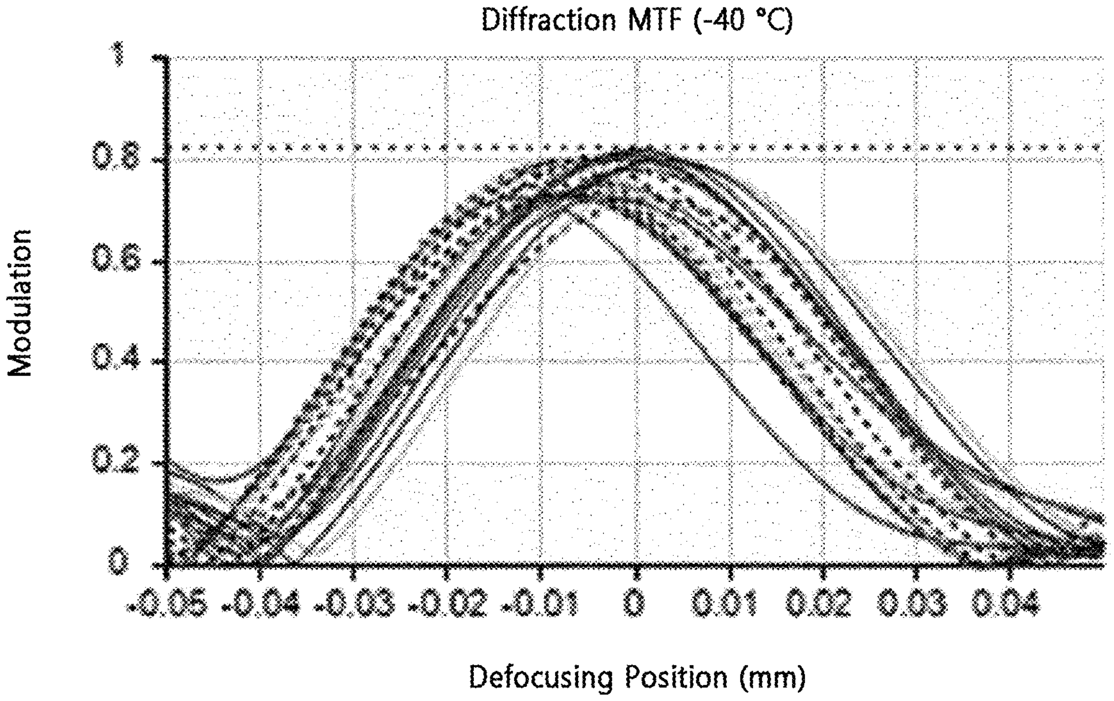
Figure 68:
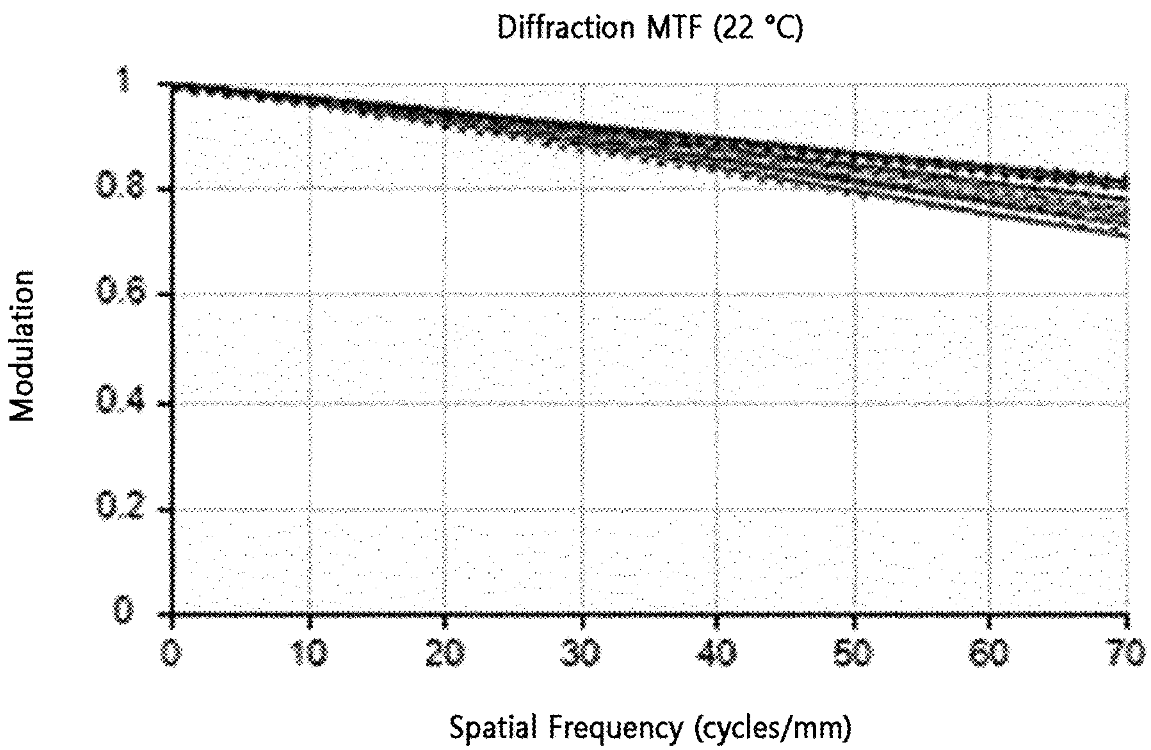
Figure 69:
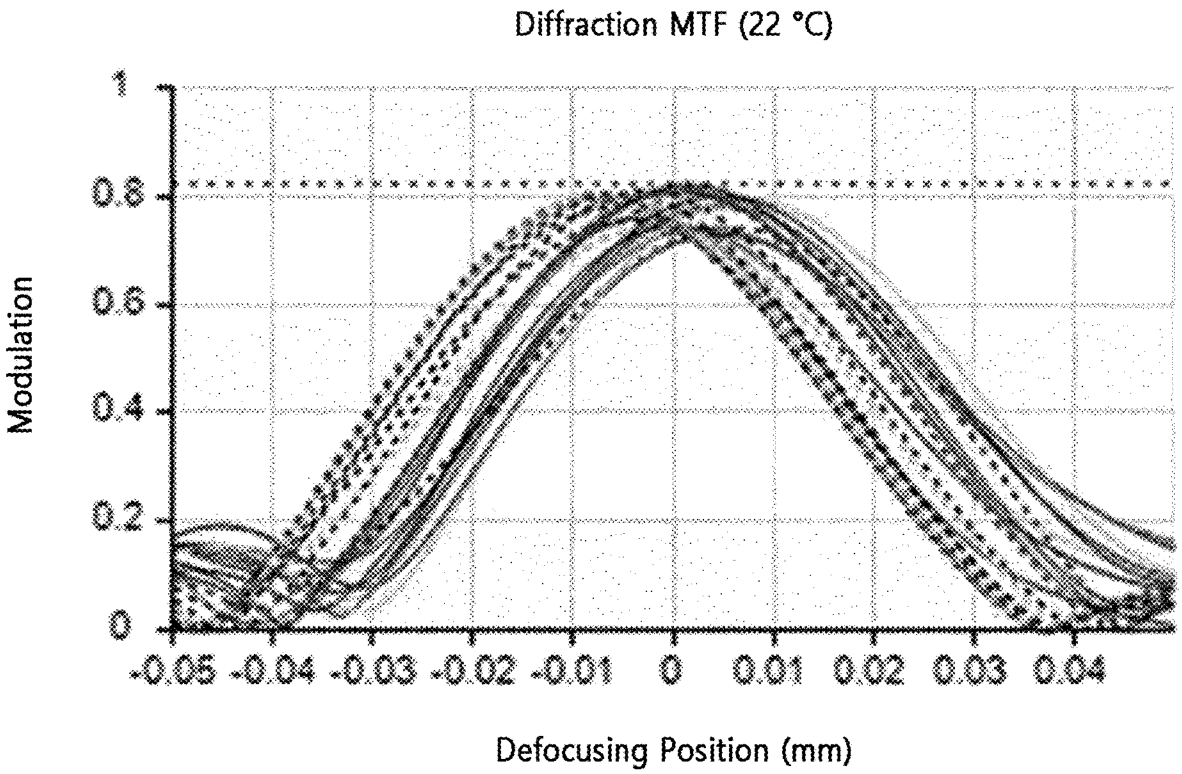
Figure 71:
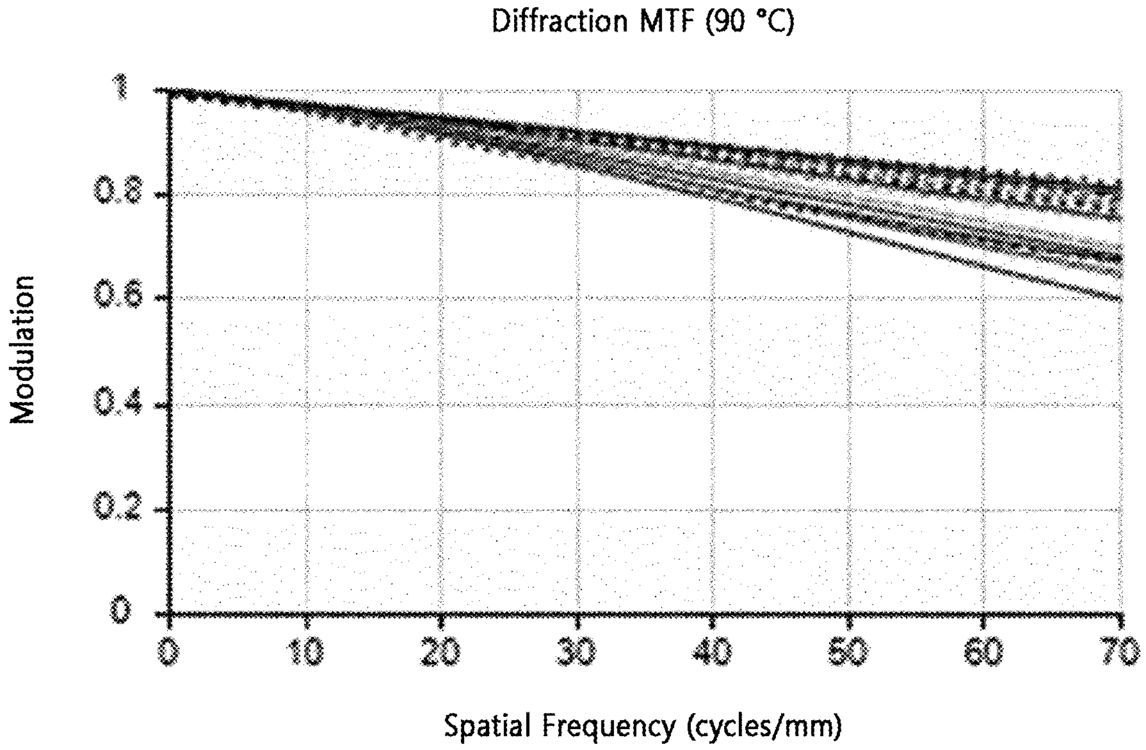
Figure 72:
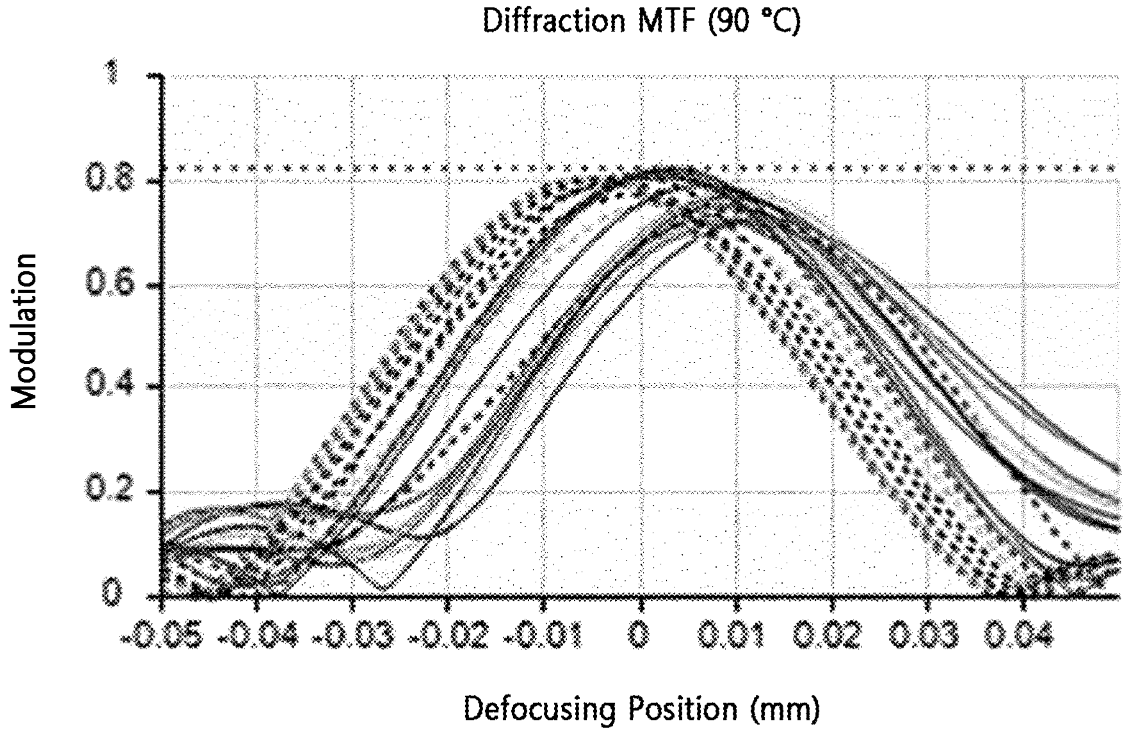

In detail, FIGS. 65 and 66 are graphs of diffraction MTF characteristics of the optical system 1000 at the low temperature (−40° C.). FIGS. 68 and 69 are graphs of diffraction MTF characteristics of the optical system 1000 at room temperature (22° C.). FIGS. 71 and 72 are graphs of diffraction MTF characteristics of the optical system 1000 at the high temperature (90° C.).

Figure 67:
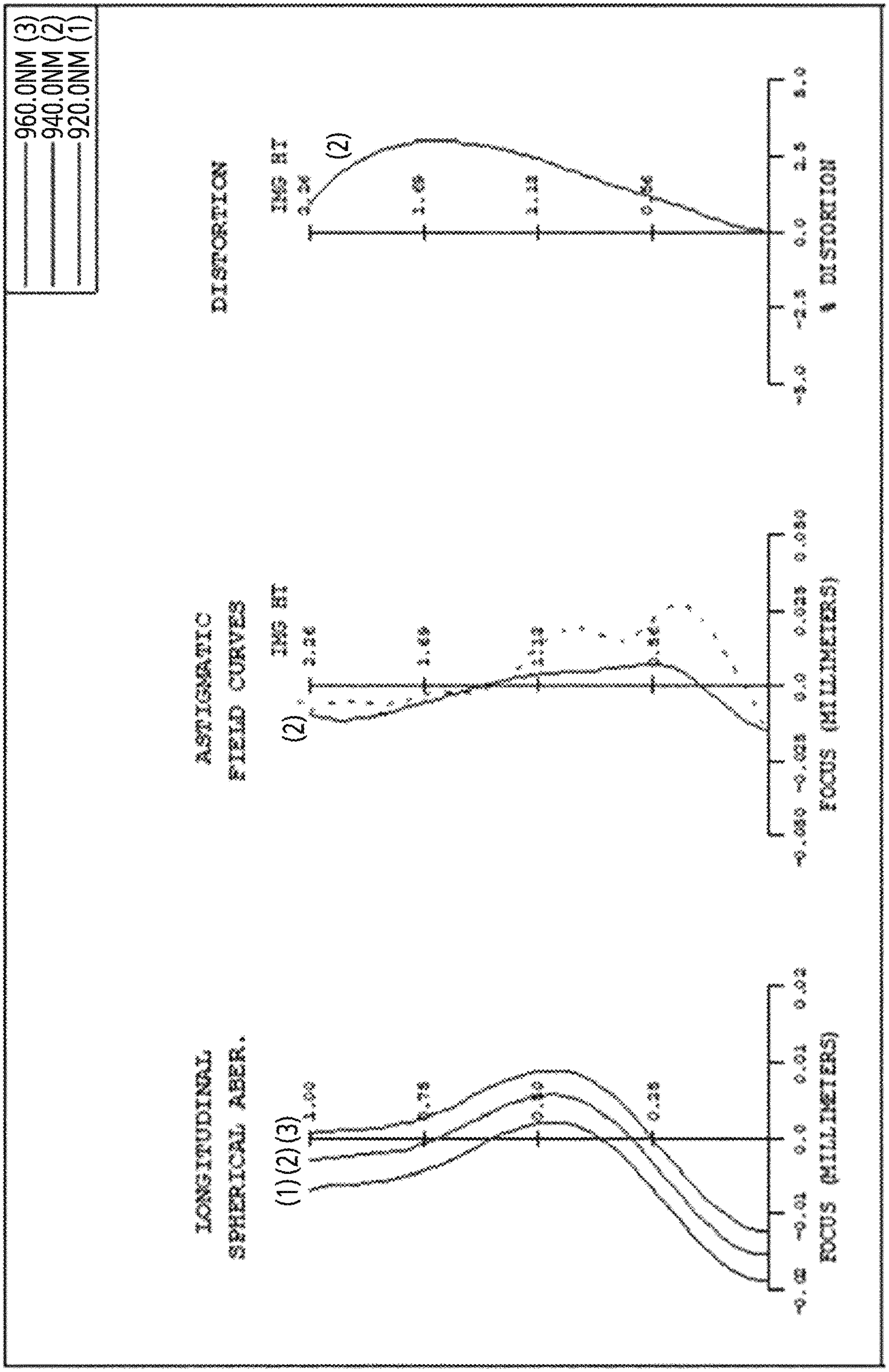
Figure 70:
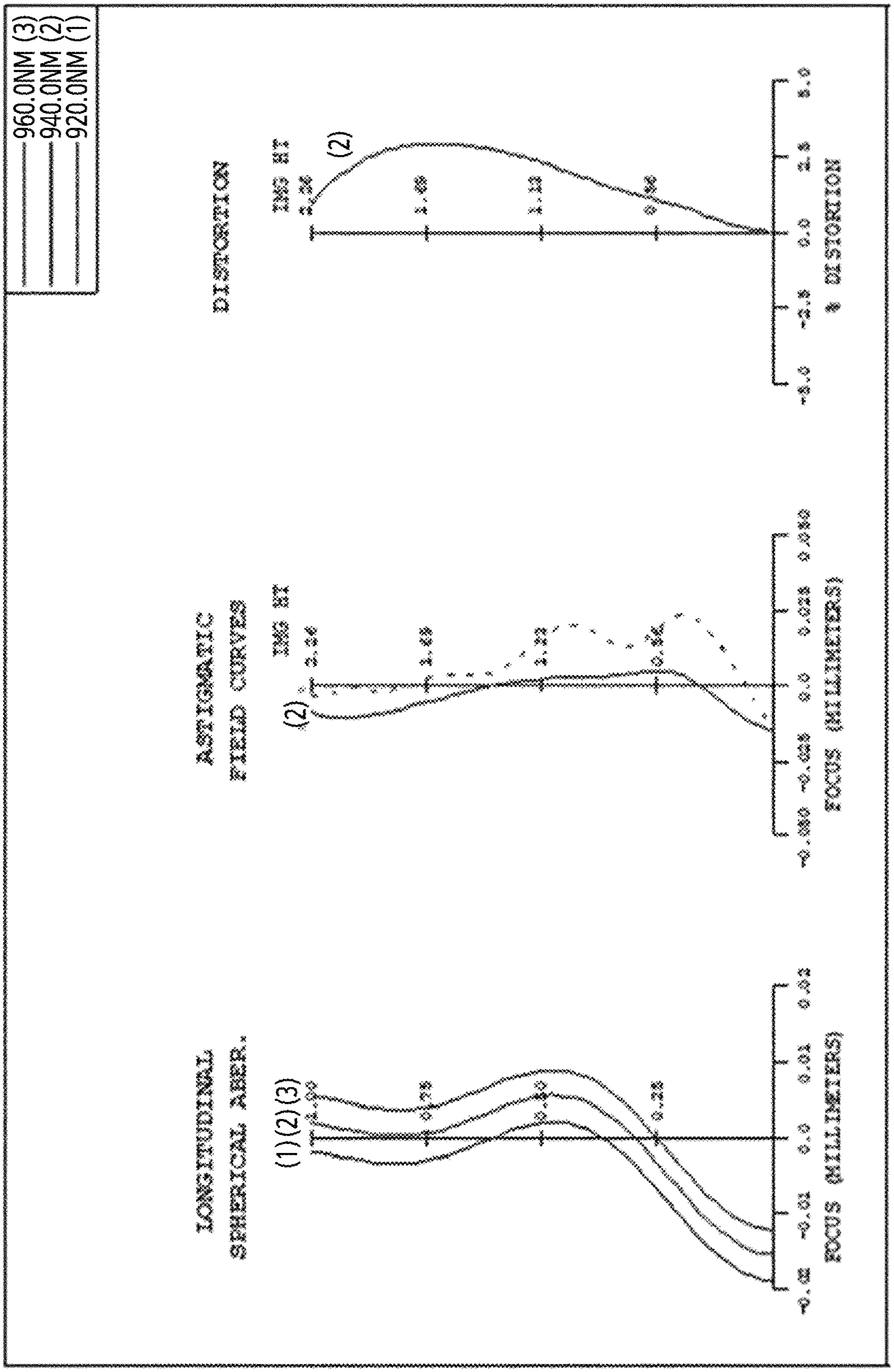
Figure 73:
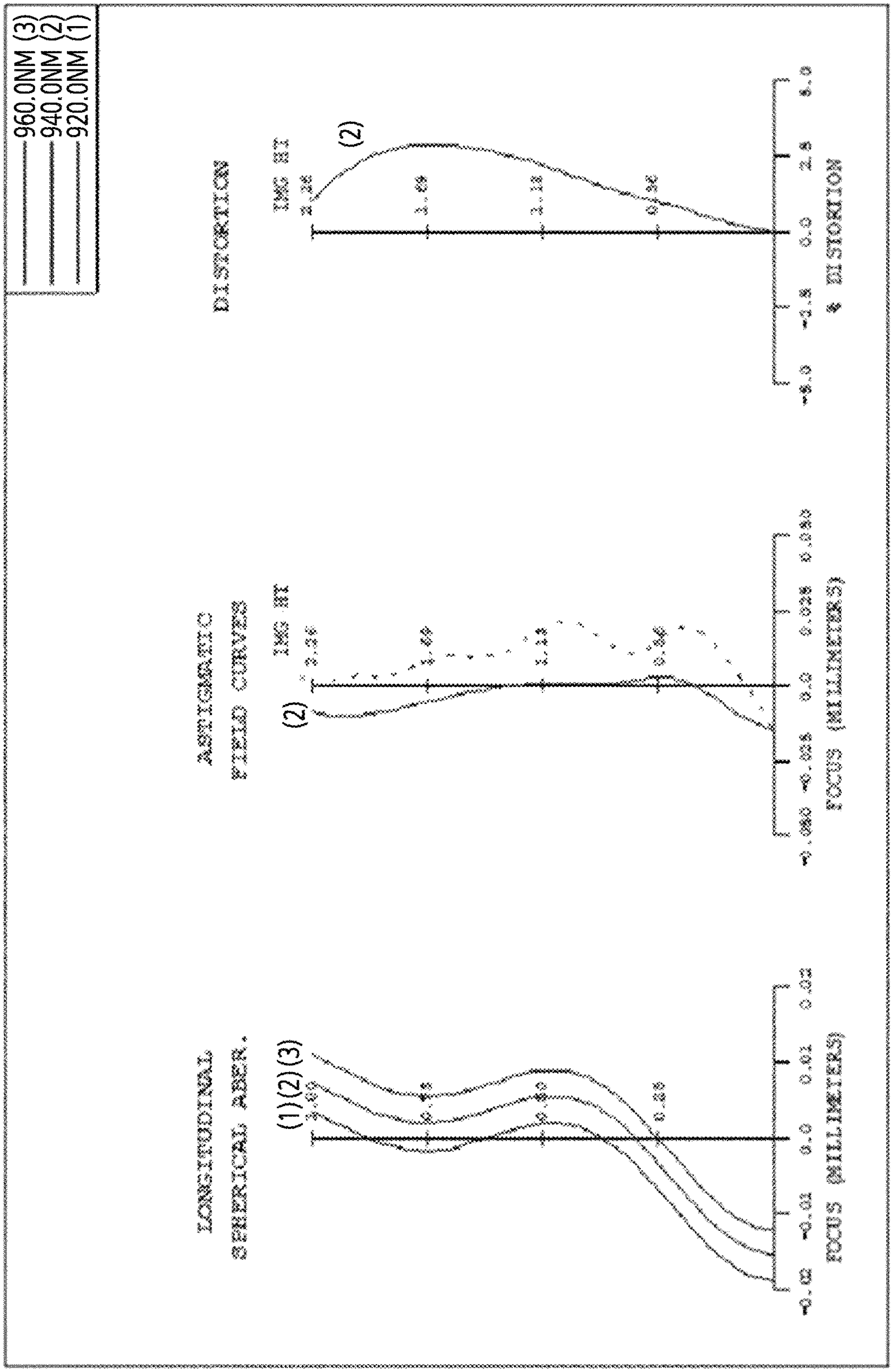

FIGS. 67, 70, and 73 are graphs of aberration diagrams of the optical system 1000 at low temperature (−40° C.), room temperature (22° C.), and high temperature (90° C.). That is, in the graphs of FIGS. 67, 70, and 73, the left graph is a longitudinal spherical aberration graph, the center graph is an astigmatic field curve graph, and the right graph is a distortion graph. In FIGS. 67, 70, and 73, the X-axis means focal length (mm) or distortion (%). Also, the Y axis means the height of the image. In addition, the spherical aberration graph is a graph for light in a wavelength band of about 920 nm, about 940 nm, and about 960 nm. Also, the astigmatic field curve graph and the distortion graph are graphs for light in a 940 nm wavelength band.

In the aberration diagram of FIGS. 67, 70, and 73, it may be interpreted that the aberration correction function is better as each curve approaches the Y axis. Referring to FIGS. 67, 70, and 73, in the optical system 1000 according to the third embodiment, measured values in most regions are adjacent to the Y axis.

Referring to FIGS. 65 to 73, the optical system according to the third embodiment has small changes in MTF characteristics and aberration characteristics even when the temperature changes in the range of low temperature (−40° C.) to high temperature (90° C.). In detail, the MTF properties at low temperature (−40° C.) and high temperature (90° C.) are less than 10% of room temperature (22° C.).

The optical system 1000 according to the third embodiment may maintain excellent optical characteristics in various temperature ranges. In detail, the first lens 110 has a material different from that of the second lens 120 and the third lens 130. For example, the first lens 110 includes a glass material. In addition, the second lens 120 and the third lens 130 include a plastic material. Accordingly, when the temperature increases, the refractive index of the first lens 110 increases. Also, the refractive indices of the second lens 120 and the third lens 130 decrease.

The lenses 110, 120, and 130 according to the third embodiment have set refractive indices, shapes, and thicknesses. Therefore, it is possible to mutually compensate for a change in focal length caused by a change in refractive index due to a change in temperature. Accordingly, the optical system 1000 may inhibit optical characteristics from changing in a temperature range from low temperature (−40° C.) to high temperature (90° C.). In addition, improved optical properties may be maintained.

The optical system 1000 according to the fourth embodiment will be described in detail with reference to FIGS. 74 to 76.

The fourth embodiment is the same as the first embodiment described above except for the first interval and the second interval. Therefore, the first interval and the second interval will be mainly described. In addition, other descriptions are the same as those of the first embodiment, so they are omitted.

Referring to FIG. 74, the first interval and the second interval of the fourth embodiment are different from the first interval and the second interval of the first embodiment. In detail, the first interval of the fourth embodiment is 0.008 mm smaller than the first interval of the first embodiment. Also, the second interval of the fourth embodiment is 0.008 mm larger than the second interval of the first embodiment.

Accordingly, the reliability of the optical system 1000 is improved.

Figure 75:
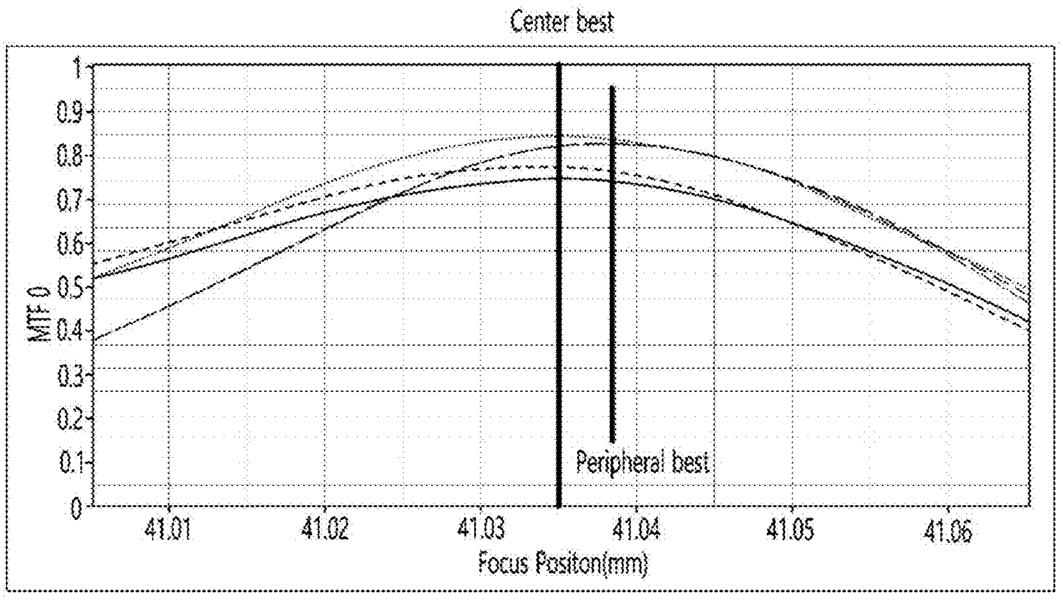
FIGS. 75 to 78 are graphs of MTF characteristics of the center and periphery of the optical system according to the first and fourth embodiments.
Figure 77:
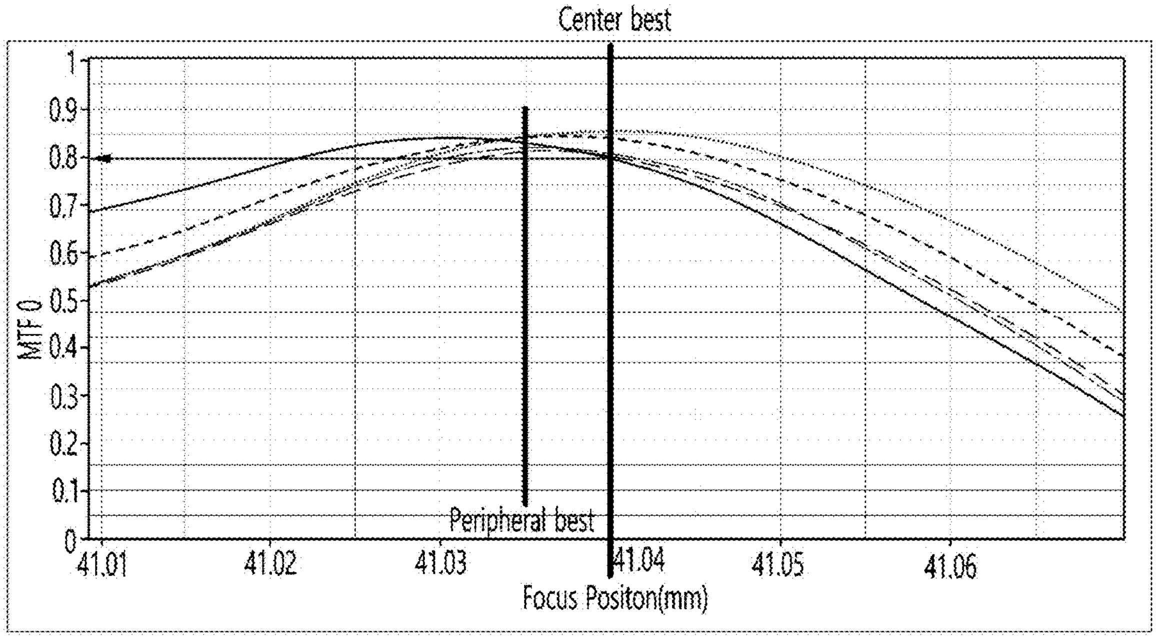
Figure 78:
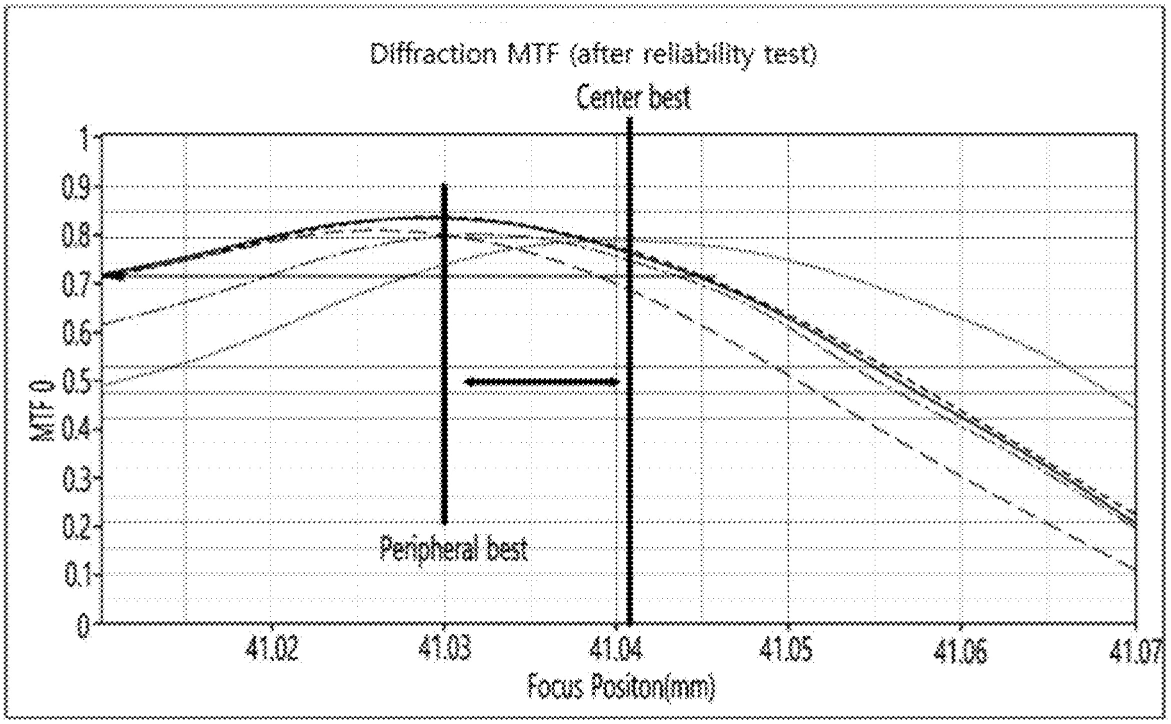

FIG. 75 is an MTF performance graph (room temperature) of the optical system according to the fourth embodiment. FIG. 76 is an MTF performance graph (high temperature) of the optical system according to the fourth embodiment. FIG. 77 is an MTF performance graph (room temperature) of the optical system according to the first embodiment. FIG. 78 is an MTF performance graph (high temperature) of the optical system according to the first embodiment.

Peripheral best shown in FIGS. 75 to 78 is an indication of peripheral MTF performance. Also, center best is an indication of MTF performance for the optical axis. The closer the indicators of Peripheral best and Center best mean, the better the MTF performance. Referring to FIGS. 75 to 78, the optical system according to the fourth embodiment has better MTF performance than the optical system according to the first embodiment at room temperature and high temperature.

Figure 76:
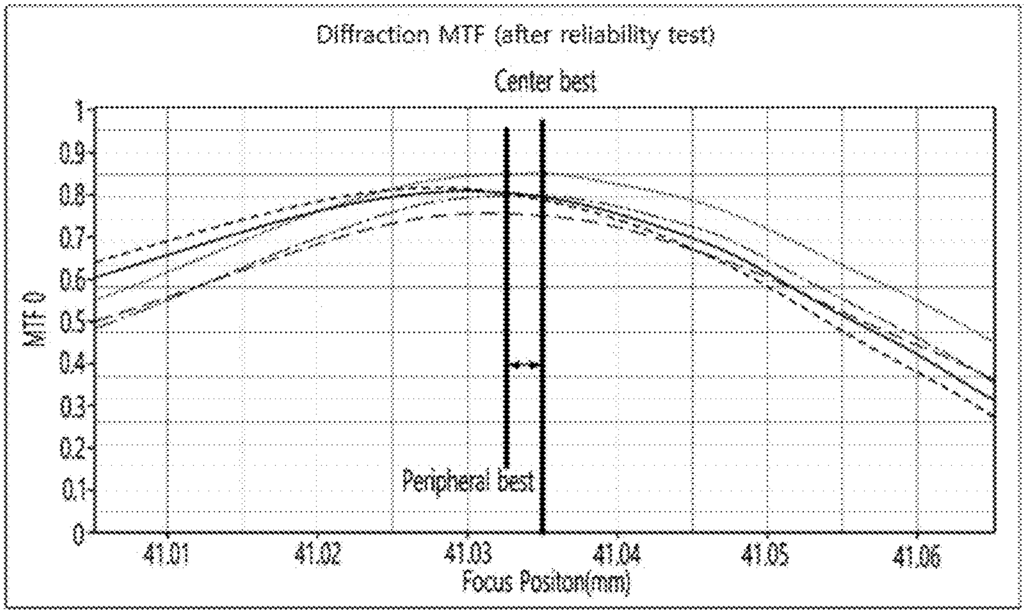

Referring to FIGS. 75 and 76, the optical system 1000 according to the fourth embodiment may minimize the decrease in resolution of the peripheral region after the reliability test. That is, in the optical system 1000 according to the fourth embodiment, the sizes of the first interval and the second interval are changed. Accordingly, the position of the periphery of each lens may be optimized when the position of the lens is changed due to a change in temperature. The peripheral region refers to a region closer to the end of the clear aperture than the optical axis. Accordingly, the optical system 1000 according to the fourth embodiment may inhibit the resolution of the periphery from being reduced. In addition, the curvature of the top surface may be minimized.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An optical system for an infrared camera comprising:

first to third lenses disposed along an optical axis in a direction from an object side toward a sensor side, wherein an object-side surface and a sensor-side surface of the first lens are spherical, wherein the first lens has a meniscus shape convex toward the object side, wherein the third lens has positive (+) refractive power wherein an object-side surface of the third lens has a convex shape on the optical axis, wherein the first lens satisfies:

$$1.7 \le nt\_1 \le 2.3$$

$$0.15 \le D1/TTL \le 0.3$$

wherein TTL satisfies: TTL≤9 mm (nt_1 is a refractive index of the first lens, TTL is a distance in the optical axis from the object-side surface of the first lens to an image surface of an image sensor, and D_1 is a thickness of the first lens at the optical axis).

2. The optical system for infrared camera of claim 1, wherein the thickness of the first lens at the optical axis satisfies the following condition:

$$1.0\text{ mm} \le D\_1 \le 1.9\text{ mm}.$$

3. The optical system for infrared camera of claim 1, comprising an infrared pass filter disposed between an image sensor and the third lens.

4. The optical system for infrared camera of claim 1, comprising an aperture stop disposed between the first lens and the second lens, wherein the aperture stop satisfies: 0<d1Ap<0.2

(d1 Ap is a distance (mm) in an optical axis direction of the aperture stop from an end of a clear aperture of the first lens).

5. The optical system for infrared camera of claim 4, wherein the first lens and the aperture stop satisfy: 0.8<CA_L1S2/CA_Ap<1.8

(CA_L1S2 is a clear aperture of a sensor-side surface of the first lens, and CA_Ap is a clear aperture of the aperture stop).

6. The optical system for infrared camera of claim 1, wherein the first lens and the third lens satisfy: 2.2<D_1/D_3<3.0

(D_1 is the thickness (mm) of the first lens at the optical axis, and D_3 is a thickness (mm) of the third lens at the optical axis).

7. The optical system for infrared camera of claim 1, wherein the first lens satisfies: 0.4<|L1R1|/|L1R2|<0.8

(L1R1 is a curvature radius of the object-side surface of the first lens, L1R2 is a curvature radius of a sensor-side surface of the first lens).

8. The optical system for infrared camera of claim 1, wherein the second lens satisfies: 1.0<|L2R1|/|L2R2|<2.0

(L2R1 is a curvature radius of the object-side surface of the second lens, L2R2 is a curvature radius of a sensor-side surface of the second lens).

9. The optical system for infrared camera of claim 1, wherein the optical system satisfies: 0.2≤CA_Smax/ImgH≤0.7

(CA_Smax is a clear aperture of a lens surface having a largest clear aperture among lens surfaces of a plurality of lenses, ImgH is an entire diagonal length (mm) of the image sensor).

10. The optical system for infrared camera of claim 1, wherein the first lens and the second lens have positive refractive power.

11. An optical system for an infrared camera comprising:

first to third lenses disposed along an optical axis from an object side toward a sensor side, wherein an object-side surface of the first lens has a convex shape on the optical axis, wherein a thickness of the second lens at the optical axis is greater than a thickness of the third lens at the optical axis, wherein an object-side surface of the third lens has a convex shape on the optical axis, wherein the third lens has positive (+) refractive power, and wherein the first lens and the third lens are made of different materials.

12. The optical system for infrared camera of claim 11, wherein the first lens is made of glass, and wherein the second lens is made of plastic.

13. The optical system for infrared camera of claim 11, wherein a thickness of the third lens at the optical axis is D_3, wherein a thickness in a direction of the optical axis at an end of an effective region of the third lens is D_3_ET, wherein the following equation satisfies: $1.0<D\_3\_ET/D\ 3<1.5$.

14. The optical system for infrared camera of claim 11, wherein a sensor-side surface of the third lens has a concave shape on the optical axis.

15. The optical system for infrared camera of claim 11, comprising:

an infrared pass filter disposed between the third lens and the image sensor, and a cover glass disposed between the infrared pass filter and the image sensor.

16. The optical system for infrared camera of claim 11, wherein a thickness of the first lens at the optical axis is D_1, wherein a thickness of the second lens at the optical axis is D_2, wherein the following equation satisfies:

$$1<D\_1/D\_2<1.6.$$

17. The optical system for infrared camera of claim 11, wherein a thickness of the first lens at the optical axis is D_1, wherein a thickness of the third lens at the optical axis is D_3, wherein the following equation satisfies:

$$2.2<D\_1/D\_3<3.0.$$

18. The optical system for infrared camera of claim 11, wherein a focal length of the first lens is f1, wherein a focal length of the second lens is f2, wherein a focal length of the third lens is f3, wherein the following equation satisfies:

$$|f1|<|f2|<|f3|.$$

19. The optical system for infrared camera of claim 18, wherein the first lens has positive refractive power, wherein the second lens has positive refractive power.

20. The optical system for infrared camera of claim 11, comprising:

an aperture stop disposed between the first lens and the second lens, wherein a thickness of the first lens at the optical axis is D_1, wherein a distance from the object-side surface of the first lens to an image surface of an image sensor in the optical axis is TTL, and wherein the following equation satisfies:

$$0.15<D\_1/TTL\leq 0.3.$$

* * * * *